(12) United States Patent
Kitamoto et al.

(10) Patent No.: US 10,632,881 B2
(45) Date of Patent: Apr. 28, 2020

(54) CUSHION STRUCTURE, CUSHION STRUCTURE COMPONENT AND CUSHION STRUCTURE MANUFACTURING METHOD

(71) Applicant: Nagase & Co., Ltd., Osaka (JP)

(72) Inventors: Hajime Kitamoto, Tokyo (JP); Takuya Nagase, Hyogo (JP)

(73) Assignee: Nagase & Co., Ltd., Osaka (JP)

( * ) Notice: Subject to any disclaimer, the term of this patent is extended or adjusted under 35 U.S.C. 154(b) by 626 days.

(21) Appl. No.: 15/306,194

(22) PCT Filed: Apr. 14, 2015

(86) PCT No.: PCT/JP2015/061444
§ 371 (c)(1),
(2) Date: Oct. 24, 2016

(87) PCT Pub. No.: WO2015/163188
PCT Pub. Date: Oct. 29, 2015

(65) Prior Publication Data
US 2017/0043695 A1 Feb. 16, 2017

(30) Foreign Application Priority Data
Apr. 22, 2014 (JP) .................. 2014-087953

(51) Int. Cl.
*B60N 2/64* (2006.01)
*B60N 2/90* (2018.01)
(Continued)

(52) U.S. Cl.
CPC .............. *B60N 2/64* (2013.01); *A47C 27/122* (2013.01); *A47C 27/127* (2013.01); *A47C 27/14* (2013.01);
(Continued)

(58) Field of Classification Search
CPC .......... B60N 2/64; B60N 2/90; B60N 2/5635; B60N 2/5642; B60N 2/5657; B60N 2/70;
(Continued)

(56) References Cited

FOREIGN PATENT DOCUMENTS

| CN | 101059198 A | 10/2007 |
|---|---|---|
| CN | 101291646 A | 10/2008 |

(Continued)

OTHER PUBLICATIONS

International Search Report issued in corresponding Application No. PCT/JP2015/061444, dated Jun. 30, 2015 (6 pages).
(Continued)

*Primary Examiner* — Anthony D Barfield
(74) *Attorney, Agent, or Firm* — Osha Liang LLP

(57) ABSTRACT

An osmosis membrane is disposed at the boundary between a three-dimensional network structure section and a foam section. The osmosis membrane allows a liquid foam material to permeate. The three-dimensional network structure section is impregnated with the foam material through the osmosis membrane, and subsequently the foam material is solidified, thereby connecting the three-dimensional network structure section and the foam section to each other. The bonded body of the three-dimensional network structure section and the foam section is completed only by disposing the cushion structure component in between the upper mold and the lower mold, and performing a foaming step.

13 Claims, 62 Drawing Sheets

(51) Int. Cl.
*A47C 27/22* (2006.01)
*B60N 2/70* (2006.01)
*B60N 2/56* (2006.01)
*B60N 2/58* (2006.01)
*A47C 27/14* (2006.01)
*B68G 11/04* (2006.01)
*A47C 27/12* (2006.01)
*B68G 7/054* (2006.01)
*B68G 11/03* (2006.01)

(52) U.S. Cl.
CPC ............ *A47C 27/22* (2013.01); *B60N 2/5635* (2013.01); *B60N 2/5642* (2013.01); *B60N 2/5657* (2013.01); *B60N 2/5825* (2013.01); *B60N 2/70* (2013.01); *B60N 2/7017* (2013.01); *B60N 2/90* (2018.02); *B68G 7/054* (2013.01); *B68G 11/03* (2013.01); *B68G 11/04* (2013.01); *B60N 2205/30* (2013.01)

(58) Field of Classification Search
CPC .. B60N 2/5825; B60N 2/7017; A47C 27/122; A47C 27/127; A47C 27/14; A47C 27/22; B68G 7/054; B68G 11/03; B68G 11/04
See application file for complete search history.

(56) References Cited

FOREIGN PATENT DOCUMENTS

| | | | |
|---|---|---|---|
| CN | 102770038 | A | 11/2012 |
| CN | 102837647 | A | 12/2012 |
| CN | 103287299 | A | 9/2013 |
| CN | 103315560 | A | 9/2013 |
| JP | S54-126270 | A | 10/1979 |
| JP | S56-166885 | A | 12/1981 |
| JP | S63-120610 | A | 5/1988 |
| JP | H10-296939 | A | 11/1998 |
| JP | 2000-313081 | A | 11/2000 |
| JP | 2012-115515 | A | 6/2012 |
| JP | 2012-228333 | A | 11/2012 |
| JP | 2013-512068 | A | 4/2013 |
| WO | 2011/067720 | A1 | 6/2011 |

OTHER PUBLICATIONS

Office Action issued in Chinese Application No. 201580020651.X, dated Mar. 2, 2018 (12 pages).

English Translation of International Preliminary Report on Patentability in corresponding International Application No. PCT/JP2015/061444, dated Nov. 3, 2016 (10 pages).

CUSHION STRUCTURE, CUSHION STRUCTURE COMPONENT AND CUSHION STRUCTURE MANUFACTURING METHOD

TECHNICAL FIELD

One or more embodiments of the present invention relate to a cushion structure, a cushion structure component, and a cushion structure manufacturing method.

BACKGROUND ART

As to a cushion structure of a seat and the like of an automobile, a proposal has been made that improves breathability from a lower part to an upper part or from the upper part to the lower part of the cushion structure. For example, Patent Literature 1 discloses a seat of an automobile, the seat including a three-dimensional network structure section formed of resin wires having elasticity. The three-dimensional network structure section processed to have a cylindrical duct shape is caused to adhere with adhesive or double-sided adhesive tape in a foam section formed of foam for a seat.

CITATION LIST

Patent Literature

[Patent Literature 1] Japanese Unexamined Patent Publication No. 2012-228333

SUMMARY OF INVENTION

Incidentally, a three-dimensional network structure section has properties excellent for a cushioning material, and is excellent in breathability. However, adhesion through use of adhesive or double-sided adhesive tape is insufficient in connection strength between the three-dimensional network structure section and the foam section. It is thus desired to provide a cushion structure that has an improved connection strength between the three-dimensional network structure section and the foam section. Meanwhile, in production of a cushion structure, the processing cost due to adhesion and the like increases. Consequently, it is also desired to improve productivity.

One or more embodiments of the present invention provide a cushion structure that has an improved connection strength between the three-dimensional network structure section and the foam section.

One or more embodiments of the present invention is a cushion structure, comprising: a three-dimensional network structure section formed by causing resin wires having elasticity to adhere to each other at adhesion points, the wires being curved and entangled with each other; and a foam section that is disposed to surround side surfaces of the three-dimensional network structure section, and is formed by foaming and solidifying a liquid foam material, wherein the three-dimensional network structure section and the foam section are connected to each other by impregnating the three-dimensional network structure section with the liquid foam material and subsequently solidifying the foam material.

According to this configuration, the three-dimensional network structure section is impregnated with the foam material, and subsequently the foam material is solidified, which connects the three-dimensional network structure section and the foam section to each other. The foam material with which the three-dimensional network structure section is impregnated is in contact with the wires of the three-dimensional network structure section on a wide area and is solidified. Consequently, the cushion structure that has an improved connection strength between the three-dimensional network structure section and the foam section can be provided.

In this case, the structure can further comprise an osmosis membrane disposed at a boundary between the three-dimensional network structure section and the foam section, the osmosis membrane allows the liquid foam material to permeate, and the three-dimensional network structure section is impregnated with the liquid foam material through the osmosis membrane, and subsequently the foam material is solidified to connect the three-dimensional network structure section and the foam section to each other.

According to this configuration, the osmosis membrane is disposed at the boundary between the three-dimensional network structure section and the foam section. The osmosis membrane allows the liquid foam material to permeate therethrough. The three-dimensional network structure section is impregnated with the foam material through the osmosis membrane, and subsequently the foam material is solidified, thereby connecting the three-dimensional network structure section and the foam section to each other. Consequently, adjustment of the permeable amount of the foam material through the osmosis membrane can adjust the width of the impregnated section formed by impregnating the three-dimensional network structure section with the foam material and subsequently solidifying the foam material. For example, the three-dimensional network structure section whose surface as the bonded section with the foam covered with the osmosis membrane is disposed in a mold where the foam material is caused to foam, and subsequently, a normal foaming step of causing the foam material to foam in the mold, thereby completing a product of the cushion structure. Thus, the productivity can be improved.

In this case, the osmosis membrane can be cloth formed of fibers, and the fibers forming the cloth can be covered with resin not to expose surfaces of the fibers.

According to this configuration, the osmosis membrane is cloth formed of fibers. The fibers forming the cloth are covered with resin not to expose the surface of the fibers. Thus, when the three-dimensional network structure section is impregnated with the foam material through the osmosis membrane, it is difficult to eliminate the bubbles of the foam material because of the unevenness of the fibers. Consequently, elimination of the bubbles of the foam material can prevent a portion of the three-dimensional network structure section impregnated with the foam material from being hardened in comparison with the other portions.

The osmosis membrane can be nonwoven fabric formed of monofilament fibers.

According to this configuration, the osmosis membrane is nonwoven fabric formed of monofilament fibers. The monofilament fibers do not have unevenness on the surface the multifilaments have. The nonwoven fabric has a smaller amount of unevenness at portions into which the foam material permeates than woven fabric. Thus, when the three-dimensional network structure section is impregnated with the foam material through the osmosis membrane, it is difficult to eliminate the bubbles of the foam material because of the unevenness of the fibers. Consequently, elimination of the bubbles of the foam material can prevent a portion of the three-dimensional network structure section impregnated with the foam material from being hardened in comparison with the other portions.

The osmosis membrane can be a resin film having any of pores or slits.

According to this configuration, the osmosis membrane is a resin film having any of pores or slits. The resin film does not have unevenness due to fibers as in the case of woven fabric. Thus, when the three-dimensional network structure section is impregnated with the foam material through the osmosis membrane, the bubbles of the foam material is not eliminated because of the unevenness of the fibers. Consequently, elimination of the bubbles of the foam material can prevent a portion of the three-dimensional network structure section impregnated with the foam material from being hardened in comparison with the other portions.

The osmosis membrane can be a resin film having a plurality of slits bent at respective tops, and a pair of the slits among the plurality of the slits can be bent in directions opposite to each other, and are disposed to cause the tops to face each other.

According to this configuration, the slits whose tops are bent at the pair of tops facing each other allows the foam material to permeate in the directions toward the other slits. Consequently, even if the amount of foam material permeating from the pair of slits having the tops facing each other is small, the material tends to be bonded to the foam material permeating from other slits. Consequently, a higher connection strength can be achieved by a smaller amount of impregnation.

The osmosis membrane can be a resin film having a plurality of slits bent at respective tops, and a pair of the slits among the plurality of the slits can be bent in an identical direction, and can be disposed to cause the tops to be oriented in an identical direction.

According to this configuration, the slits whose tops are bent at the pair of tops oriented in the same direction allows the foam material to permeate in the same direction. Consequently, the foam material permeating from the slits with the pair of tops oriented in the same direction tends to be solidified at a smaller distance from the osmosis membrane. Consequently, a higher connection strength can be achieved by a smaller amount of impregnation.

The structure can further comprise an impregnation prevention membrane disposed in the three-dimensional network structure section, the impregnation prevention membrane can make the liquid foam material impermeable, and a site of the three-dimensional network structure section that is not made impermeable by the impregnation prevention membrane can be impregnated with the foam material, and subsequently the foam material can be solidified to thereby connect the three-dimensional network structure section and the foam section to each other.

According to this configuration, the impregnation prevention membrane makes the liquid foam material impermeable, and a site of the three-dimensional network structure section that is not made impermeable by the impregnation prevention membrane is impregnated with the foam material, and subsequently the foam material is solidified to thereby connect the three-dimensional network structure section and the foam section to each other. Consequently, adjusting the arrangement of the impregnation prevention membrane can adjust the width of the impregnated section formed by impregnating the three-dimensional network structure section with the foam material and subsequently solidifying the foam material. For example, the three-dimensional network structure section in which the impregnation prevention membrane is disposed in a mold where the foam material is caused to foam, and subsequently, a normal foaming step of causing the foam material to foam in the mold, thereby completing a product of the cushion structure. Thus, the productivity can be improved.

An upper surface of the three-dimensional network structure section can be covered with a membraneless foam from which membranes of bubbles of foam are removed.

According to this configuration, the upper surface of the three-dimensional network structure section is covered with the membraneless foam from which the membrane of bubbles of foam is removed. Consequently, the flexibility of the upper surface of the three-dimensional network structure section can be improved while the breathability is maintained.

An upper surface of the three-dimensional network structure section can be covered with foam where ventilation pores allowing air to flow therethrough is formed.

According to this configuration, the upper surface of the three-dimensional network structure section is covered with foam; ventilation pores that allow air to flow therethrough are formed in the foam. Consequently, the flexibility of the upper surface of the three-dimensional network structure section can be improved while the breathability is maintained.

An air blowing section that can blow air in any of the directions from a lower part to an upper part and from the upper part to the lower part of the three-dimensional network structure section can be further provided below three-dimensional network structure section.

This configuration further provides the air blowing section that can blow air in any of the directions from a lower part to an upper part and from the upper part to the lower part of the three-dimensional network structure section below the three-dimensional network structure section. The breathability can thus be further improved.

Meanwhile, one or more embodiments of the present invention is a cushion structure component, comprising: a three-dimensional network structure section formed by causing resin wires having elasticity to adhere to each other at adhesion points, the wires being curved and entangled with each other; and an osmosis membrane which is disposed to surround side surfaces of the three-dimensional network structure section and through which a liquid foam material to be formed into foam by foaming and being solidified is permeable.

According to this configuration, the cushion structure component includes: the aforementioned three-dimensional network structure section; and the osmosis membrane which is disposed to surround the side surfaces of the three-dimensional network structure section and through which the liquid foam material to be formed into the foam by foaming and being solidified is permeable. Consequently, the cushion structure where the three-dimensional network structure section and the foam section are connected to each other with a higher connection strength can be easily manufactured by arranging the liquid foam material to be in contact with the osmosis membrane of the cushion structure component, impregnating the three-dimensional network structure section with the foam material through the osmosis membrane, and solidifying the foam material. Consequently, the productivity of the cushion structure can be improved.

In this case, the osmosis membrane can be cloth formed of fibers, and the fibers forming the cloth can be covered with resin not to expose surfaces of the fibers. The osmosis membrane can be nonwoven fabric formed of monofilament fibers. The osmosis membrane can be a resin film having any of pores or slits. The osmosis membrane can be a resin film having a plurality of slits bent at respective tops, and a pair of the slits among the plurality of the slits can be bent in directions opposite to each other, and can be disposed to cause the tops to face each other. The osmosis membrane can be a resin film having a plurality of slits bent at respective tops, and a pair of the slits among the plurality of the slits can be bent in an identical direction, and can be disposed to cause the tops to be oriented in an identical direction.

Meanwhile, one or more embodiments of the present invention is a cushion structure component, comprising: a three-dimensional network structure section formed by causing resin wires having elasticity to adhere to each other at adhesion points, the wires being curved and entangled with each other; and an impregnation prevention membrane which is disposed in the three-dimensional network structure section and where a liquid foam material to be formed into foam by foaming and being solidified is impermeable.

One or more embodiments of the present invention is a cushion structure manufacturing method, comprising: a step of disposing the liquid foam material to be in contact with the cushion structure component according to the second aspect or the third aspect, and; a step of impregnating the three-dimensional network structure section with the foam material; and a step of solidifying the foam material.

The cushion structure according to one or more embodiments of the present invention, the cushion structure component according to one or more embodiments of the present invention, and the cushion structure manufacturing method according to one or more embodiments of the present invention can provide cushion structure that improves the connection strength between the three-dimensional network structure section and the foam section.

DESCRIPTION OF EMBODIMENTS

First Embodiment

Figure 1:
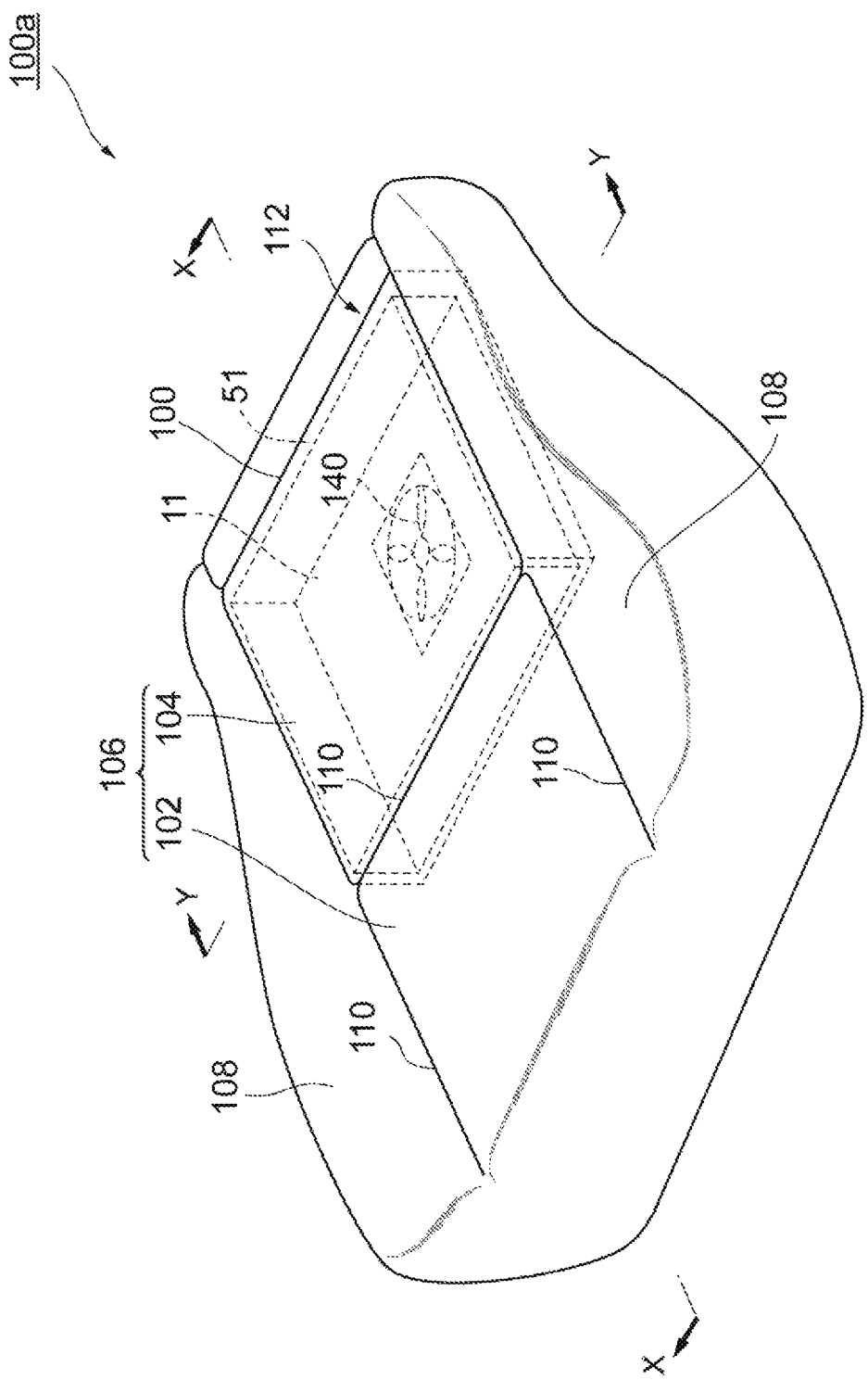
FIG. 1 is a perspective view showing a cushion structure of a first embodiment.

Hereinafter, referring to the drawings, a cushion structure, a cushion structure component, and a cushion structure manufacturing method according to one or more embodiments of the present invention are described in detail. The cushion structure according to one or more embodiments of the present invention is applied to articles that use elasticity. As shown in FIG. 1, a cushion structure 100a according to a first embodiment of the present invention is applied to a seat of an automobile. The cushion structure 100a supports the buttocks and thighs of a passenger of an automobile. The cushion structure 100a includes a cushion front section 102 that mainly supports the thighs of the passenger, and a cushion rear section 104 that mainly supports the buttocks of the passenger; these sections serve as a cushion center section 106. The cushion structure 100a includes cushion side sections 108 at the right and left ends of the cushion center section 106.

Figure 2:
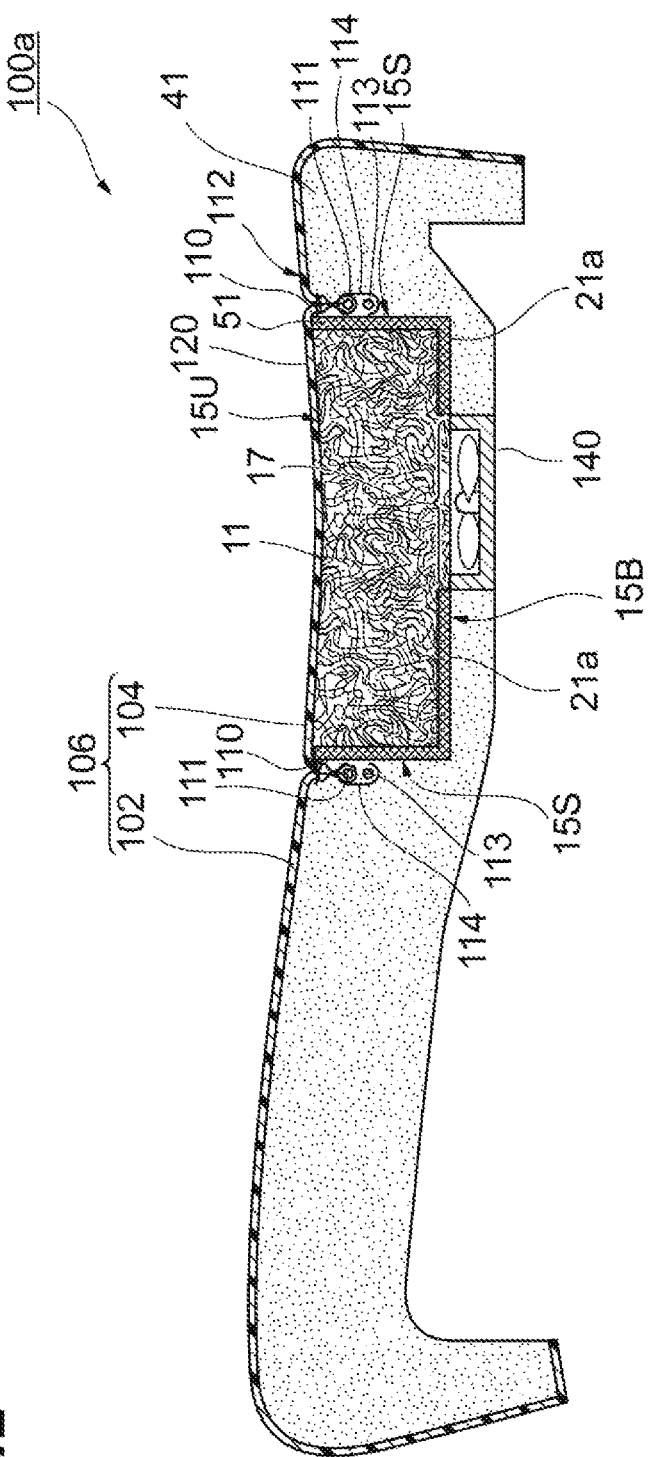
FIG. 2 is a sectional view taken along line X-X of FIG. 1.
Figure 3:
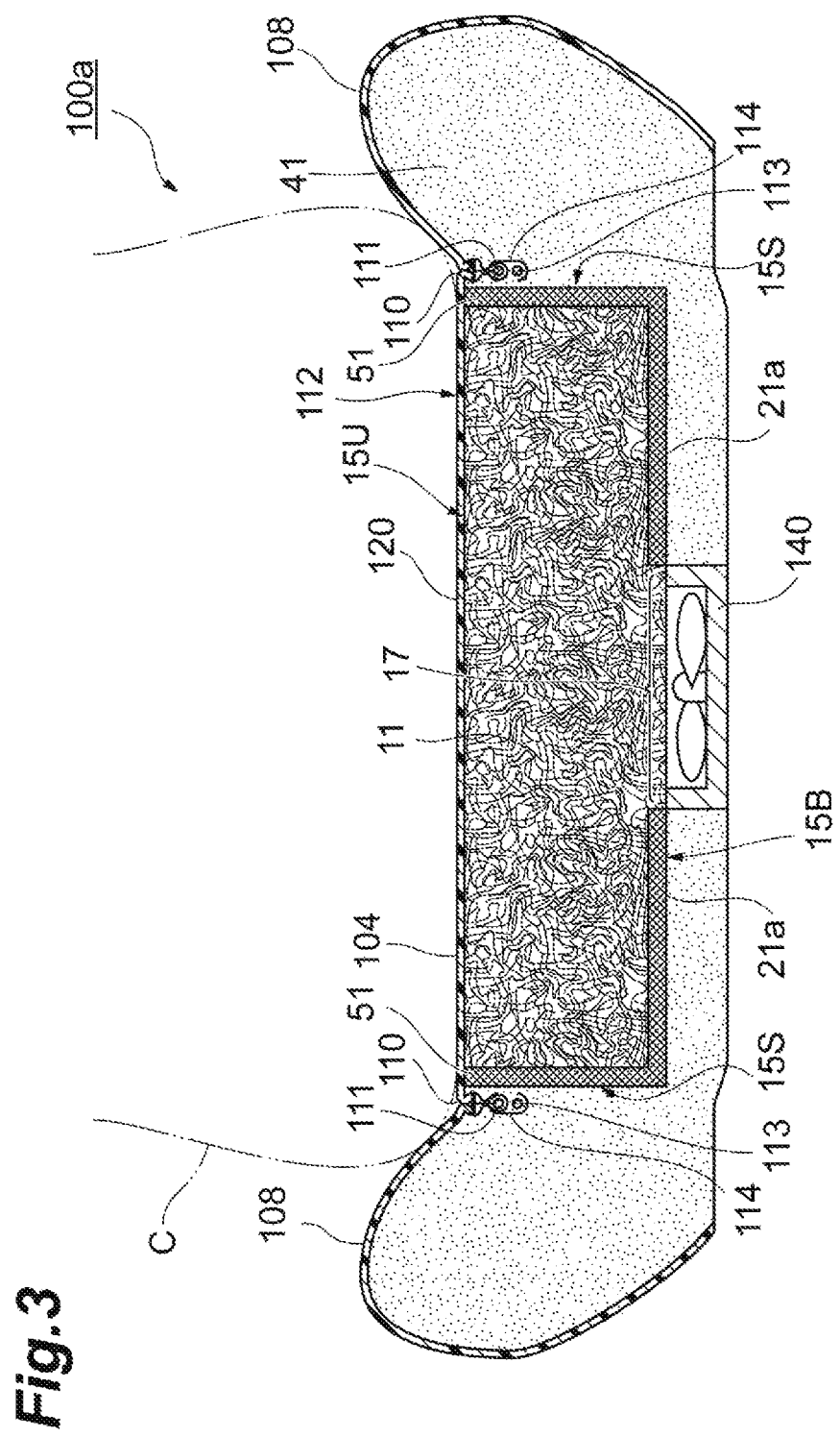
FIG. 3 is a sectional view taken along line Y-Y of FIG. 1.

As shown in FIG. 1, FIG. 2 that is a sectional view taken along line X-X of FIG. 1 and FIG. 3 that is a sectional view taken along line Y-Y of FIG. 1, the cushion structure 100a includes a three-dimensional network structure section 11 in the cushion rear section 104; the three-dimensional network structure section 11 is formed by causing resin wires having elasticity to adhere to each other at adhesion points, the wires being curved and entangled with each other. The cushion structure 100a includes foam sections 41 that are disposed to surround the side surfaces 15S of the three-dimensional network structure section 11, and is formed by foaming and solidifying a liquid foam material, in the cushion front section 102 and the cushion side sections 108. The cushion structure 100a includes a foam section 41 disposed to surround an undersurface 15B, except an opening 17, of the three-dimensional network structure section 11.

The cushion structure 100a includes an osmosis membrane 21a disposed at the boundary between the three-dimensional network structure section 11 and the foam section 41. The osmosis membrane 21a is disposed on the side surfaces 15S and the undersurface 15B, except the opening 17, of the three-dimensional network structure section 11. As described later, the osmosis membrane 21a allows the foam material for the foam section 41 to permeate therethrough. The three-dimensional network structure section 11 is impregnated with the liquid foam material through the osmosis membrane 21a, and subsequently the foam material is solidified, thereby connecting the three-dimensional network structure section 11 and the foam section 41 to each other. Impregnated sections 51 are formed at sites of impregnation with the liquid foam material for the foam section 41 through the osmosis membrane 21a and subsequent solidification of the material.

The surface of the cushion structure 100a is covered with surface leather 112. The surface leather 112 is made of a material having breathability. As shown in FIGS. 1, 2 and 3, tensions are applied by wires 111 and 113, such as metal wires, enclosed in wire introducers 110, and by C-rings 114 that bundle the wires 111 and 113, to the surface leather 112 not to be wrinkled.

The wire introducer 110 is disposed in proximity to the impregnated sections 51. As shown in FIG. 3, a pair of sets of the wire introducer 110 and the impregnated section 51 are disposed at sites which are apart from the center by approximately 150 mm and on which a passenger C is hardly annoyed with the hardness at the buttocks. The hardness of the impregnated section 51 is higher than a hardness that is the sum of the hardness of the three-dimensional network structure section 11 and the hardness of the foam section 41. However, the wire introducers 110 and the impregnated sections 51 that have high hardnesses are disposed together at sites on which the passenger C is hardly annoyed with the hardness at the buttocks, thereby allowing the feeling of the passenger C upon being seated to be improved.

On the undersurface of the surface leather 112, sheet-shaped membraneless foam 120 from which the membranes of bubbles of foam are removed is stacked by frame laminate for pasting on the undersurface of the surface leather 112 after being melt. Thus, the upper surface 15U of the three-dimensional network structure section 11 is covered with the membraneless foam 120 from which the membranes of bubbles of foam are removed.

The cushion structure 100a further includes a blowing section 140 that can blow air in any of the directions from the lower part to the upper part and from the upper part to the lower part of the three-dimensional network structure section 11, below the opening 17 on the undersurface 15B of the three-dimensional network structure section 11. According to this embodiment, the three-dimensional network structure section 11 is excellent in breathability. Consequently, a propeller-type air blower that blows air by propellers having a thickness of approximately 10 mm and is used in a personal computer or the like, is applicable to the air blowing section 140.

Figure 4:
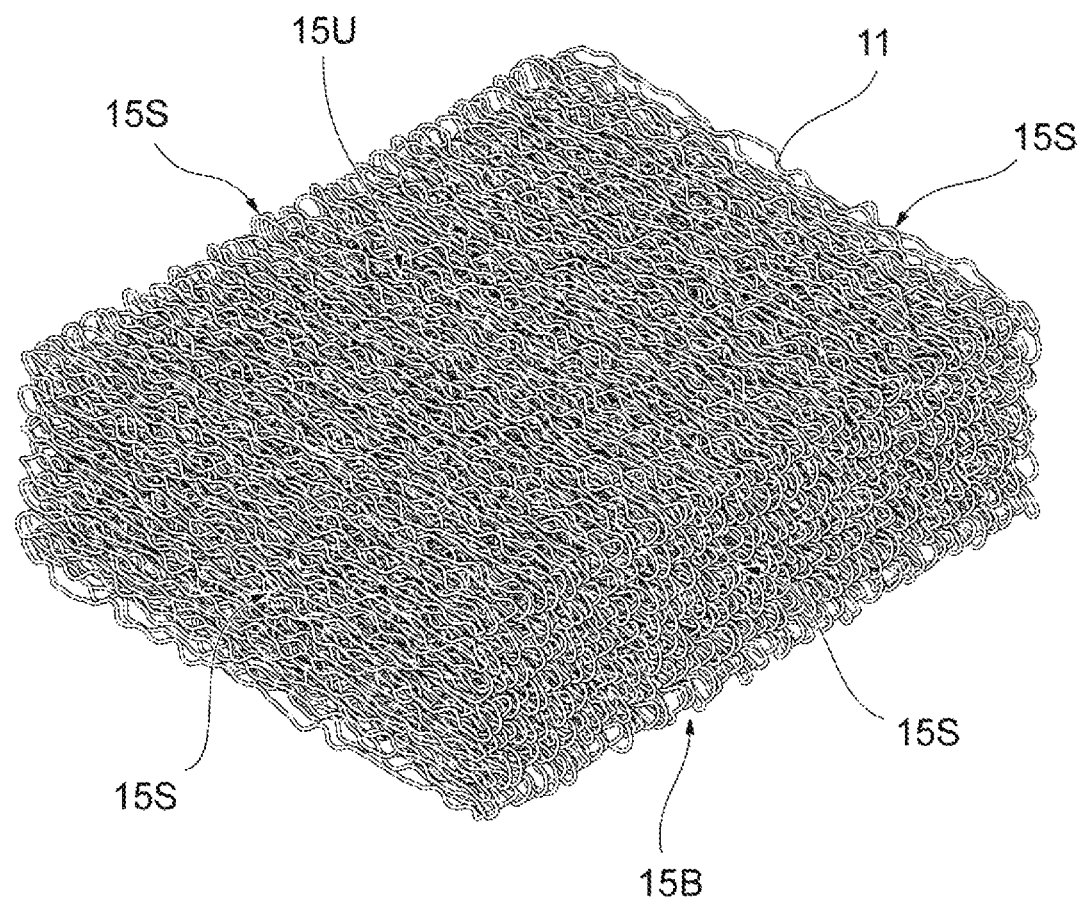
FIG. 4 is a perspective view showing a three-dimensional network structure section of the first embodiment.
Figure 5:
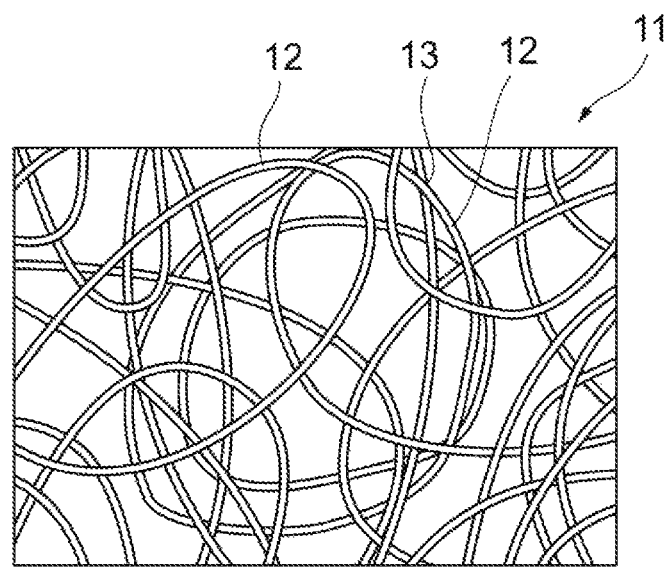
FIG. 5 is an enlarged view of the three-dimensional network structure section of FIG. 4.

A method of manufacturing the cushion structure 100a of this embodiment is hereinafter described. As shown in FIG. 4, the three-dimensional network structure section 11 of this embodiment has a rectangular-parallelepiped shape. The three-dimensional network structure section 11 of this embodiment has the upper surface 15U, side surfaces 15S and undersurface 15B. As shown in FIGS. 4 and 5, the three-dimensional network structure section 11 of this embodiment is formed by causing resin wires 12 having elasticity to adhere to each other at adhesion points 13, the wires being curved and entangled with each other. The resin wires 12 are formed of a thermoplastic resin. The thermoplastic resin may be any of polyolefins, such as polyethylene and polypropylene, polyester polymer, polyester elastomer, and polyurethane polymer.

The outer diameter of the resin wire 12 may range from 0.1 to 7 mm. The resin wire 12 may be a hollow wire with an empty inside. The rate of hollowness of the resin wire 12 may range from 5 to 80%. When the three-dimensional network structure section 11 is formed of the resin wires 12, thermoplastic resin is melt by an extruder. The melt thermoplastic resin is ejected as the resin wires 12 from nozzles and freely falls. The resin wires 12 that are still in a melt state are caused to adhere to each other at adhesion points 13. The adhering resin wires 12 are solidified, which can manufacture the three-dimensional network structure section 11.

Figure 6:
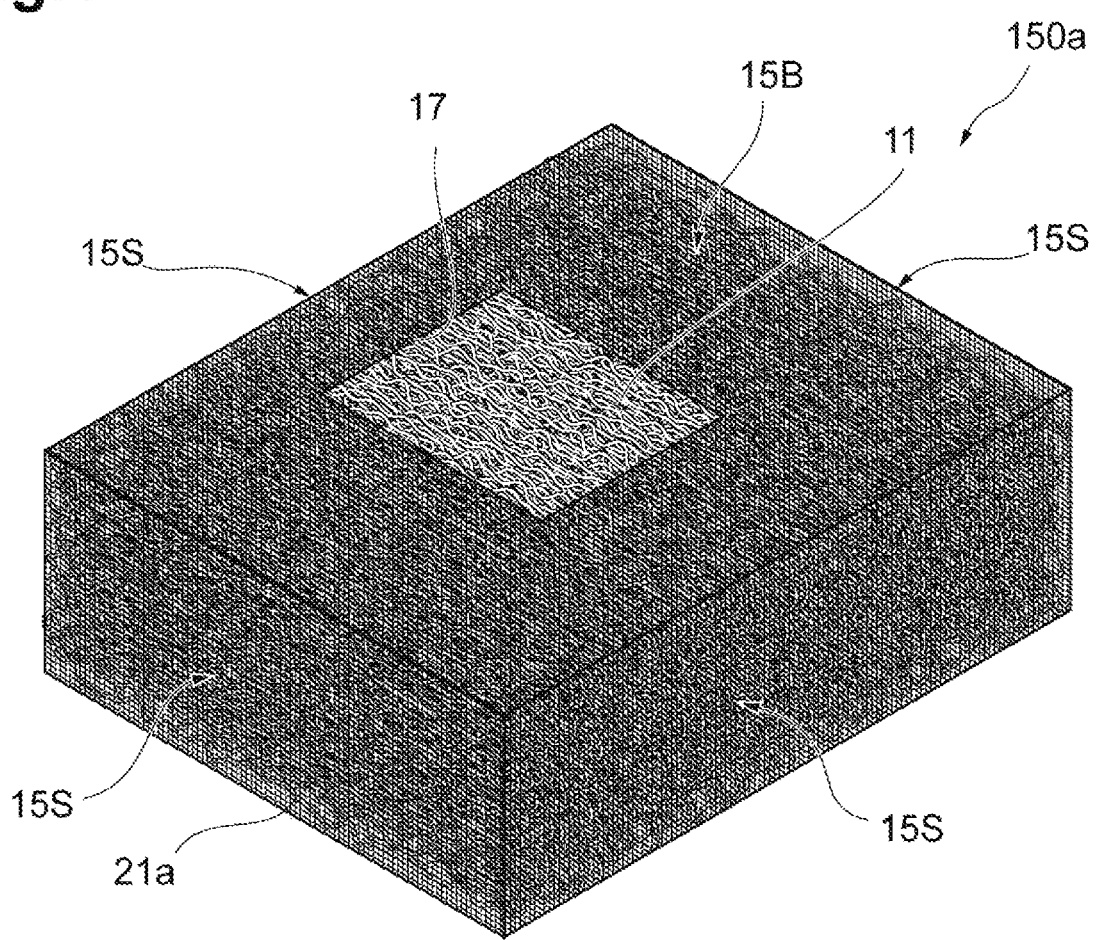
FIG. 6 is a perspective view showing the cushion structure component of the first embodiment where osmosis membranes are provided on the side surfaces and bottom surface of the three-dimensional network structure section of FIG. 4.

According to this embodiment, the cushion structure 100a is manufactured using a cushion structure component 150a as shown in FIG. 6. The cushion structure component 150a includes: the aforementioned three-dimensional network structure section 11; and the osmosis membrane 21a which is disposed to surround the side surfaces 15S of the three-dimensional network structure section 11 and through which the liquid foam material to be formed into the foam by foaming and being solidified is permeable. The osmosis membrane 21a is also disposed on the undersurface 15B, except the opening 17, of the three-dimensional network structure section 11.

Figure 7:
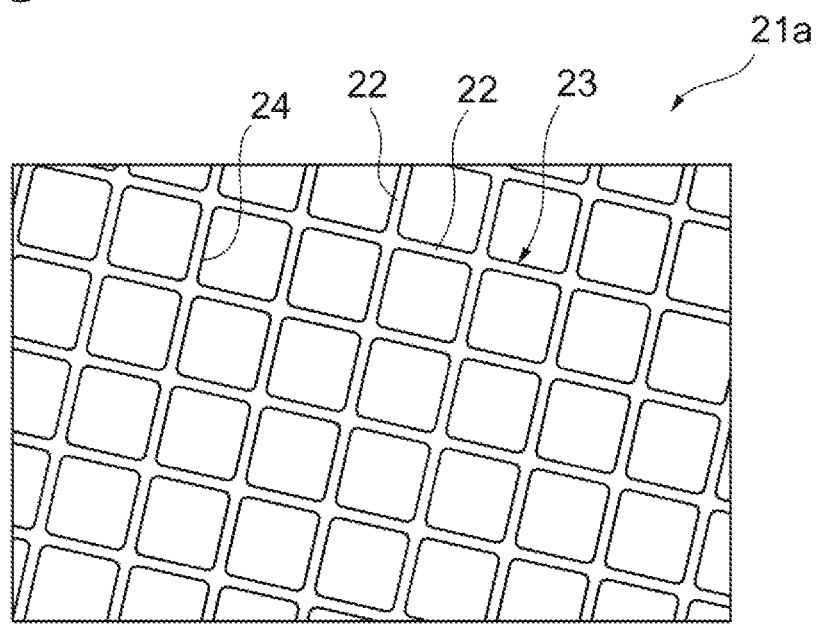
FIG. 7 is an enlarged view of the osmosis membrane in FIG. 6.

As shown in FIG. 7, the osmosis membrane 21a is cloth formed by being woven with fibers 22. The fibers 22 of the osmosis membrane 21a are covered with a resin cover 23 made of resin, such as vinyl chloride, not to expose the surface. Cavities 24 through which the foam material is permeable reside between the fibers 22 and the fibers 22. For example, a nonslip sheet or the like made of foaming vinyl chloride or the like is applicable to the osmosis membrane 22a.

Figure 8:
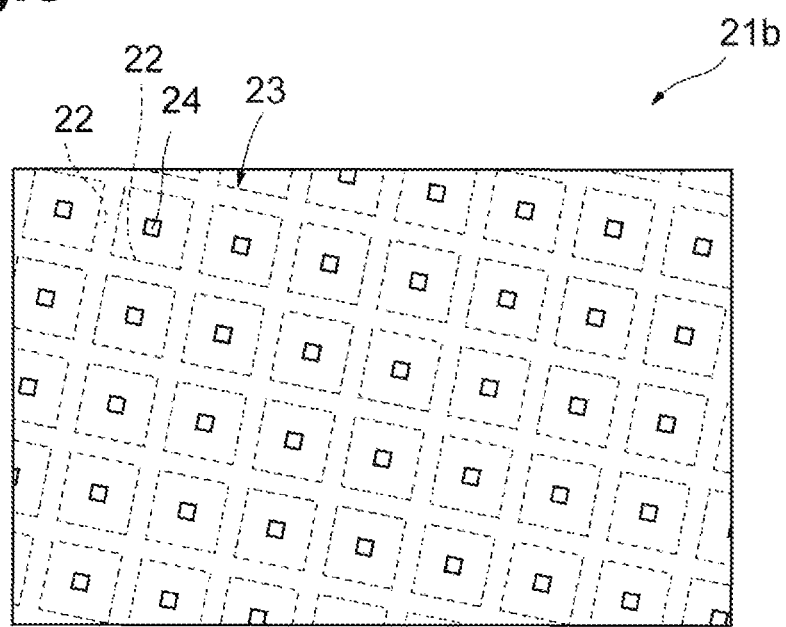
FIG. 8 is an enlarged view showing an example of osmosis membrane having smaller cavities than the osmosis membrane in FIG. 7 has.

To adjust the amount of impregnation with the foam material into the three-dimensional network structure section 11, the amount of foam material with which the osmosis membrane 21a is impregnated per unit time is appropriately adjusted. For example, to adjust the amount of impregnation with the foam material into the three-dimensional network structure section 11, multiple osmosis membranes 21a may be disposed in a stacked manner on the sides 15S and the undersurface 15B of the three-dimensional network structure section 11. By changing the sizes of the cavities 24 of the osmosis membrane 22a, the amount of foam material passing through the osmosis membrane 21a per unit time can be adjusted. For example, as with an osmosis membrane 21b shown in FIG. 8, increase in the amount of resin cover 23 that covers the fibers 22 can manufacture the osmosis membrane 21b having smaller sizes of the cavities 24.

Figure 9:
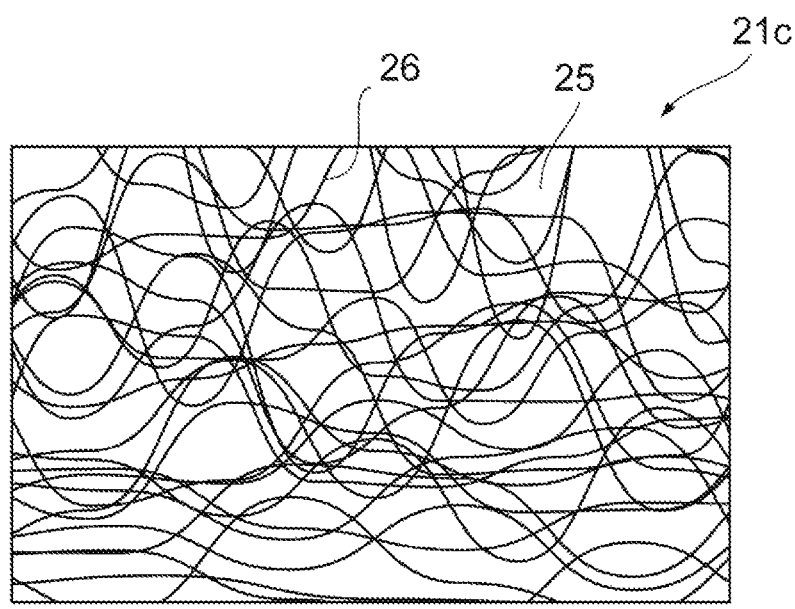
FIG. 9 is an enlarged view showing an example of osmosis membrane made of nonwoven fabric formed of monofilament fibers.
Figure 10:
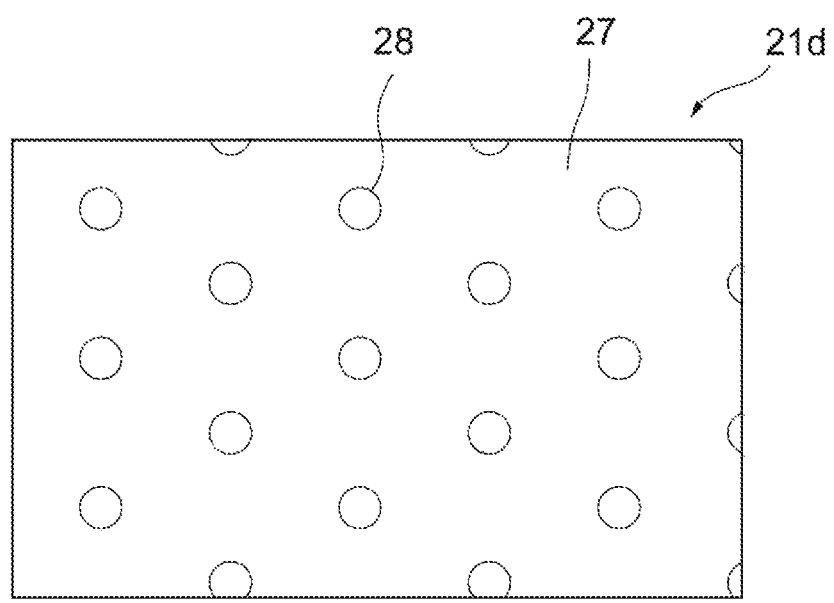
FIG. 10 is an enlarged view showing an example of osmosis membrane made of a resin film that has foam-material permeable pores.
Figure 11:
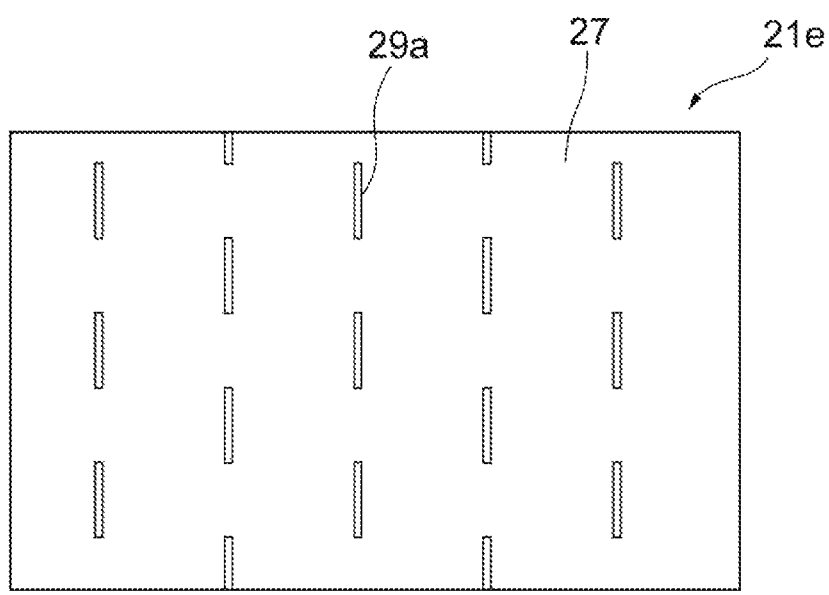
FIG. 11 is an enlarged view showing an example of osmosis membrane made of a resin film that has foam-material permeable slits.

In this embodiment, as shown in FIG. 9, instead of the osmosis membrane 21a, an osmosis membrane 21c that is nonwoven fabric 25 formed of monofilament fibers 26 is applicable. In this embodiment, as shown in FIG. 10, instead of the osmosis membrane 21a, an osmosis membrane 21d that is a resin film 27 having foam-material permeable pores 28 is applicable. In this embodiment, as shown in FIG. 11, instead of the osmosis membrane 21a, an osmosis membrane 21e that is a resin film 27 having foam-material permeable slits 29a is applicable.

Figure 12:
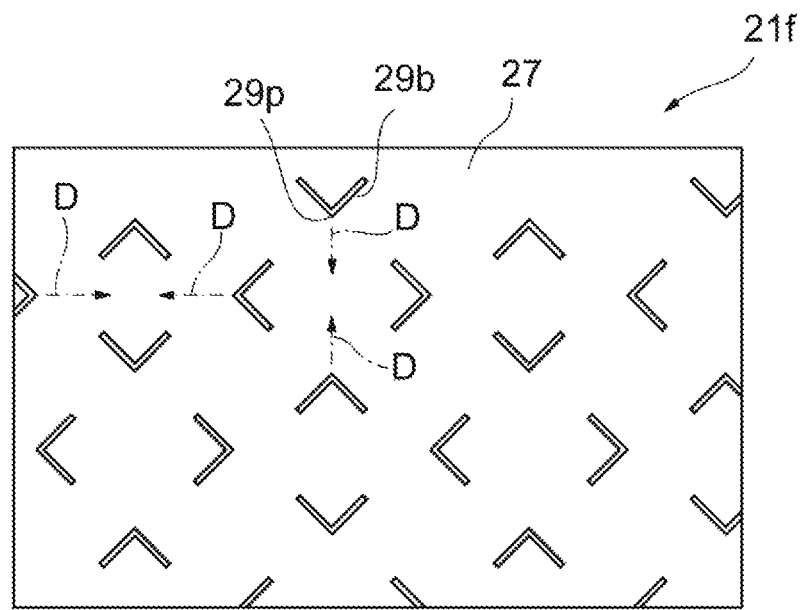
FIG. 12 is an enlarged view showing an example of osmosis membrane made of a resin film that has a plurality of bent slits allowing the foam material to permeate in directions of facing each other.

As shown in FIG. 12, instead of the osmosis membrane 21a, an osmosis membrane 21f that is a resin film 27 with slits 29b each being bent at a top 29p on the surface of the resin film 27 is applicable. Each pair of slits 29b bent in directions opposite to each other on the resin film 27 are disposed so that the tops 29p face each other. As described later, the pair of slits 29b with the tops 29p facing each other allows the foam material to permeate in directions D. Thus, even if the amount of foam material permeating from the pair of slits 29b having the tops 29p facing each other is small, the material tends to be bonded to the foam material permeating from other slits 29b.

Figure 13:
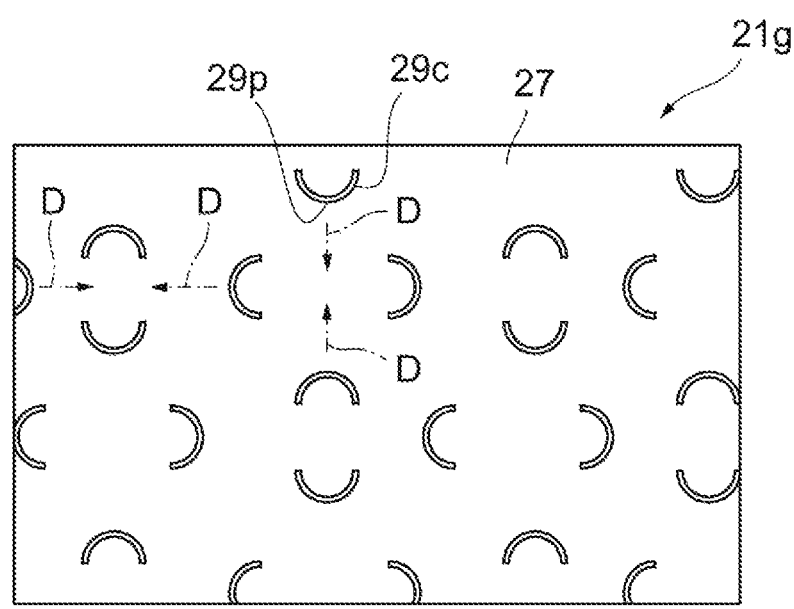
FIG. 13 is an enlarged view showing an example of osmosis membrane made of a resin film that has a plurality of curved slits allowing the foam material to permeate in directions of facing each other.

Alternatively, as shown in FIG. 13, instead of the osmosis membrane 21a, an osmosis membrane 21g that is a resin film 27 with slits 29c each being curved at a top 29p on the surface of the resin film 27 is applicable. Each pair of slits 29c curved in directions opposite to each other on the resin film 27 are disposed so that the tops 29p face each other. The osmosis membrane 21g having the curved slits 29c operates in a manner analogous to that of the osmosis membrane 21f.

Figure 14:
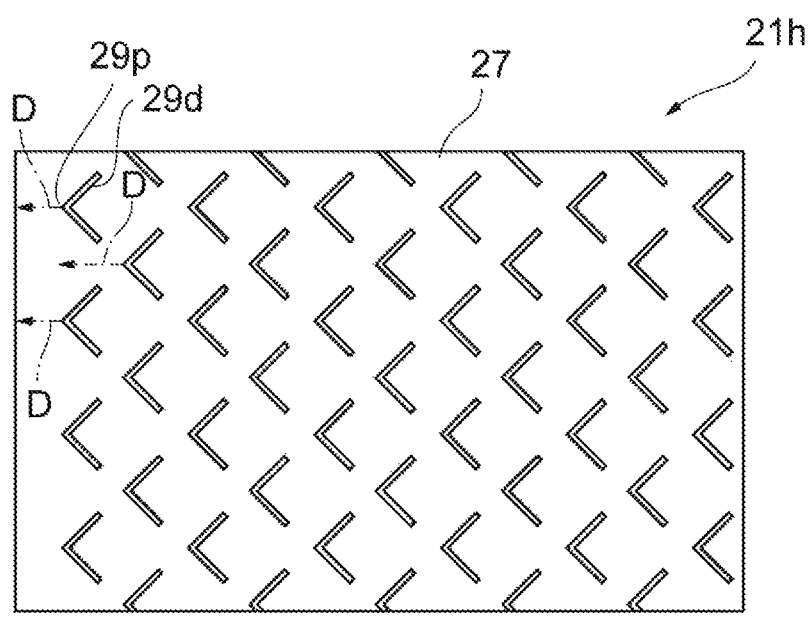
FIG. 14 is an enlarged view showing an example of osmosis membrane made of a resin film that has a plurality of bent slits allowing the foam material to permeate in the same direction.

As shown in FIG. 14, instead of the osmosis membrane 21a, an osmosis membrane 21h that is a resin film 27 with slits 29*d* each being bent at a top 29*p* on the surface of the resin film 27 is applicable. Each pair of slits 29*d* bent in the same direction on the resin film 27 are disposed to orient tops 29*p* in the same direction. As described later, the pair of slits 29*d* with the tops 29*p* oriented in the same direction allows the foam material to permeate in the same direction D. Consequently, the foam material permeating from the slits 29*d* with the pair of tops 29*p* oriented in the same direction tends to be solidified at a smaller distance from the osmosis membrane 21*h*.

Figure 15:
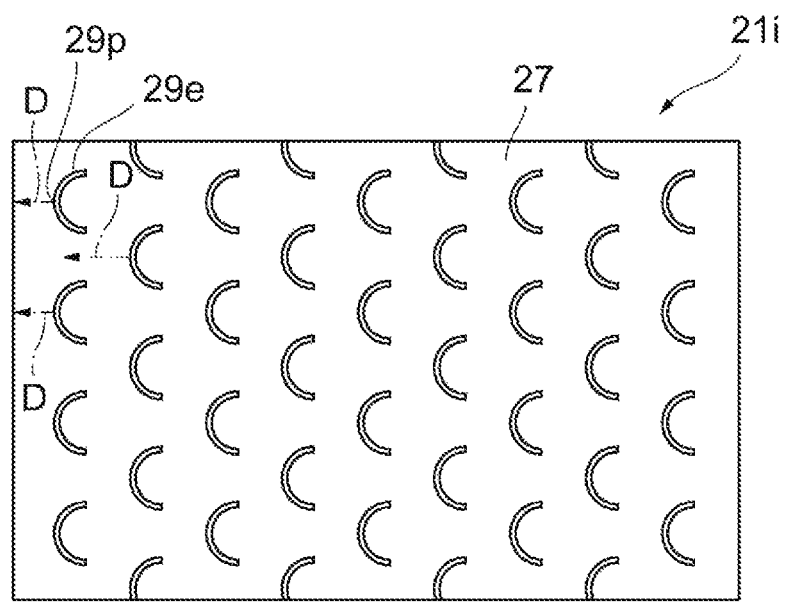
FIG. 15 is an enlarged view showing an example of osmosis membrane made of a resin film that has a plurality of curved slits allowing the foam material to permeate in the same direction.

Alternatively, as shown in FIG. 15, instead of the osmosis membrane 21*a*, an osmosis membrane 21*i* that is a resin film 27 with slits 29*e* each being curved at a top 29*p* on the surface of the resin film 27 is applicable. Each pair of slits 29*e* curved in the same direction on the resin film 27 are disposed to orient tops 29*p* in the same direction. The osmosis membrane 21*i* having the curved slits 29*e* operates in a manner analogous to that of the osmosis membrane 21*h*.

Figure 16:
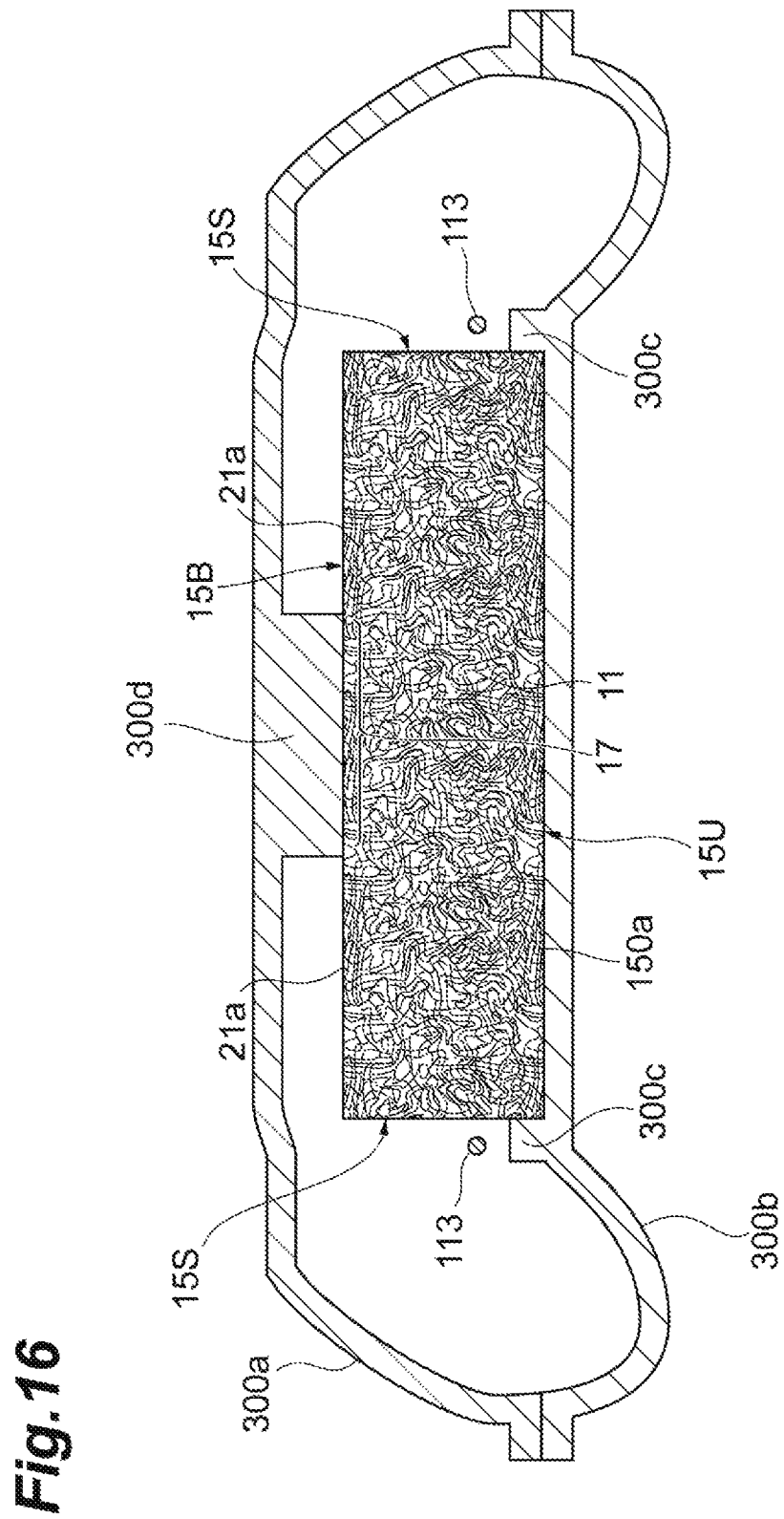
FIG. 16 is a sectional view showing a state where the cushion structure component in FIG. 6 is put in molds.

In the case of manufacturing the cushion structure 100*a* using the cushion structure component 150*a*, as shown in FIG. 16, the cushion structure component 150*a* inverted so that the upper surface 15U is oriented downward and the undersurface 15B is oriented upward is disposed in an upper mold 300*a* and a lower mold 300*b* that conform to the shape of the cushion structure 100*a*. The lower edges of the side surfaces 15S of the cushion structure component 150*a* are fitted into the inner surfaces of protrusions 300*c* provided on the lower mold 300*b*. The wires 113 are disposed directly above the protrusions 300*c*. The opening 17 of the cushion structure component 150 is blocked with a protrusion 300*d* provided for the upper mold 300*a* to prevent the foam material from entering. In this embodiment, besides the cushion structure component 150*a*, the upper mold 300*a* and the lower mold 300*b* that are used to manufacture an existing cushion structure can be used to manufacture the cushion structure 100*a*.

Figure 17:
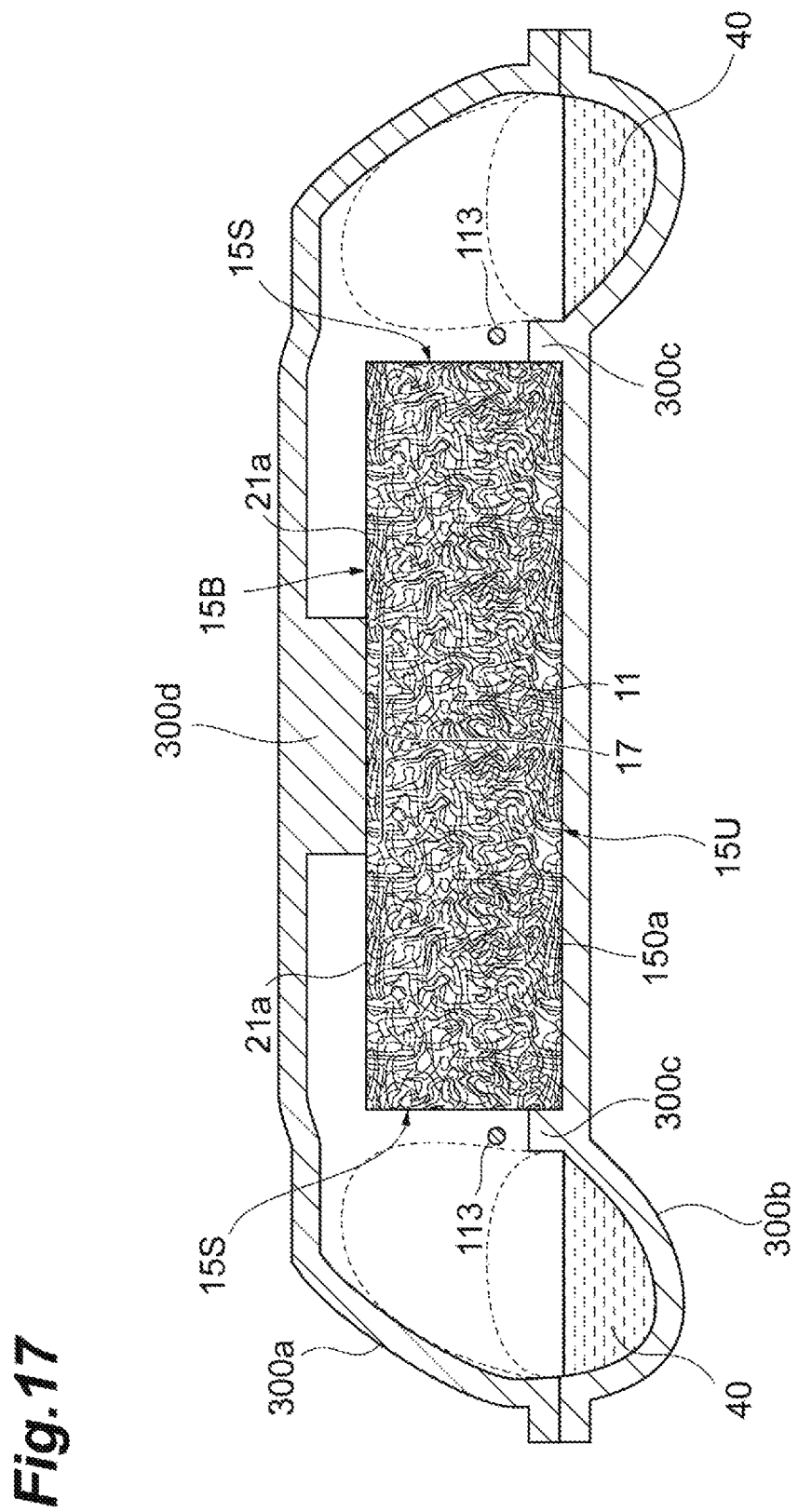
FIG. 17 is a sectional view showing a state where a liquid foam material is put in molds.

As shown in FIG. 17, a liquid foam material 40 that is to be formed into the foam section 41 through foaming and being solidified is put into the lower mold 300*b*. As indicated by broken lines in FIG. 17, the foam material 40 foams and expands to the upper mold 300*a*. During foaming of the foam material 40, the protrusions 300*c* on the lower mold 300*b* function as weirs that prevent the foam material 40 having not sufficiently foamed yet from spreading over a wide range on the upper surface 15U along the lower edge of the side surfaces 15S of the cushion structure component 150*a*.

Figure 18:
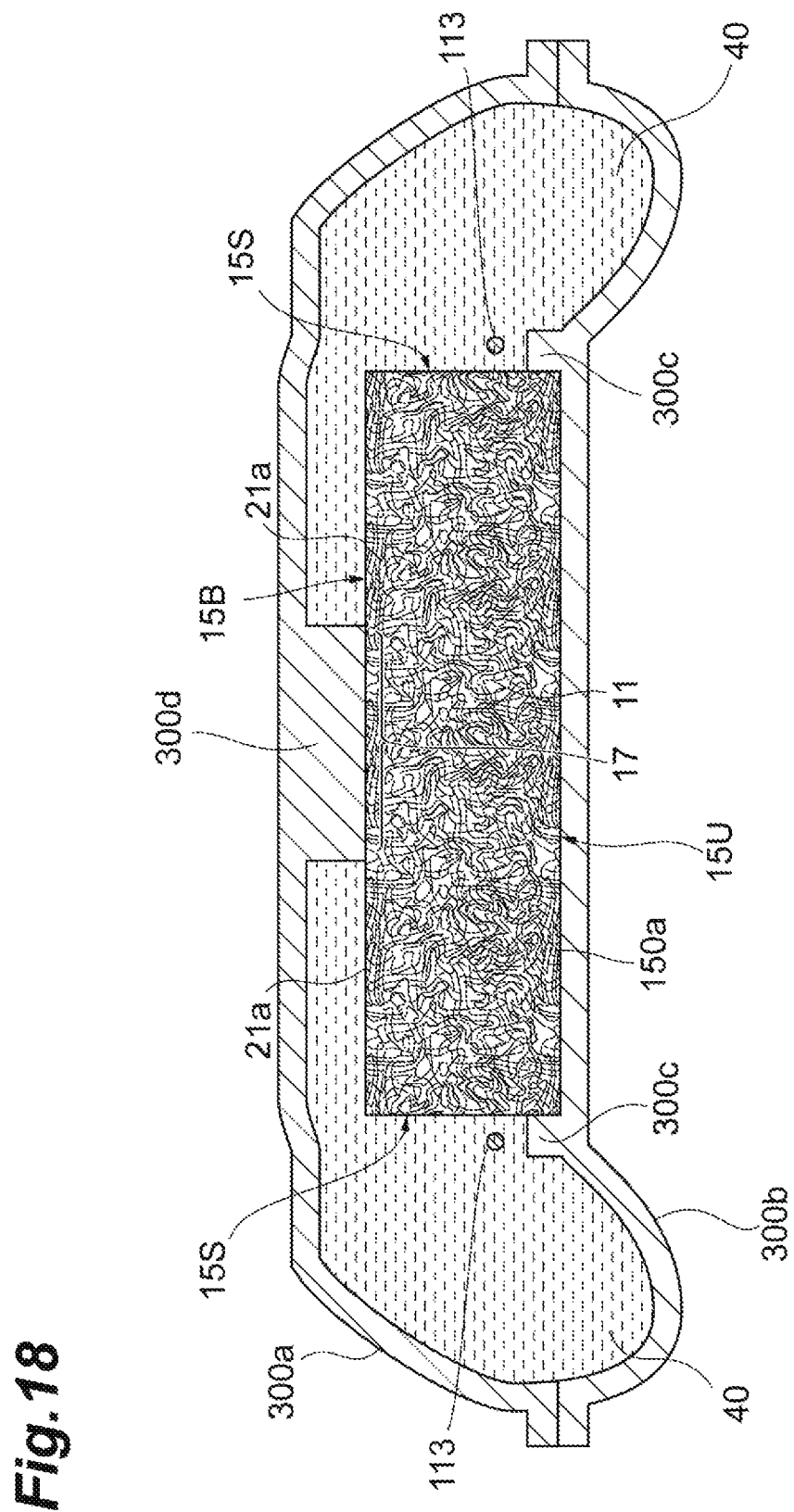
FIG. 18 is a sectional view showing a state where the foam material in FIG. 17 foams and is in contact with the osmosis membrane of the cushion structure component.
Figure 19:
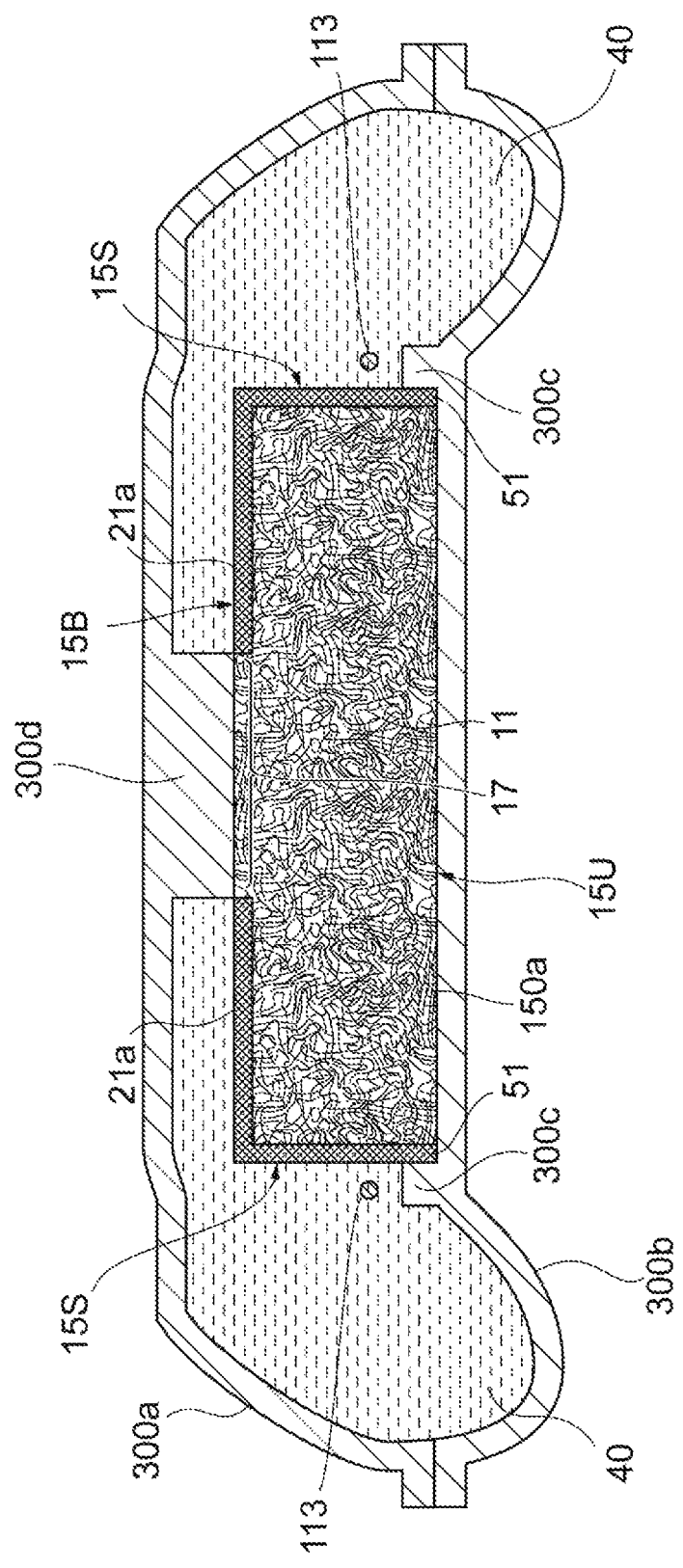
FIG. 19 is a sectional view showing a state where the three-dimensional network structure section is impregnated with the foam material through the osmosis membrane in FIG. 18.

As shown in FIG. 18, the foam material 40 foams and expands to fill the inner surface of the upper mold 300*a*. Thus, the liquid foam material 40 is disposed to be in contact with the osmosis membrane 21*a*. As shown in FIG. 19, the three-dimensional network structure section 11 is impregnated with a part of the foam material 40 through the osmosis membrane 21*a*. The impregnated section 51 having a thickness according to the number of stacks of the osmosis membranes 21*a* or the sizes of the cavities 24 is formed. In this embodiment, the three-dimensional network structure section 11 may be impregnated with the entire foam material 40 according to the required elasticity of the cushion structure 100*a*.

Figure 20:
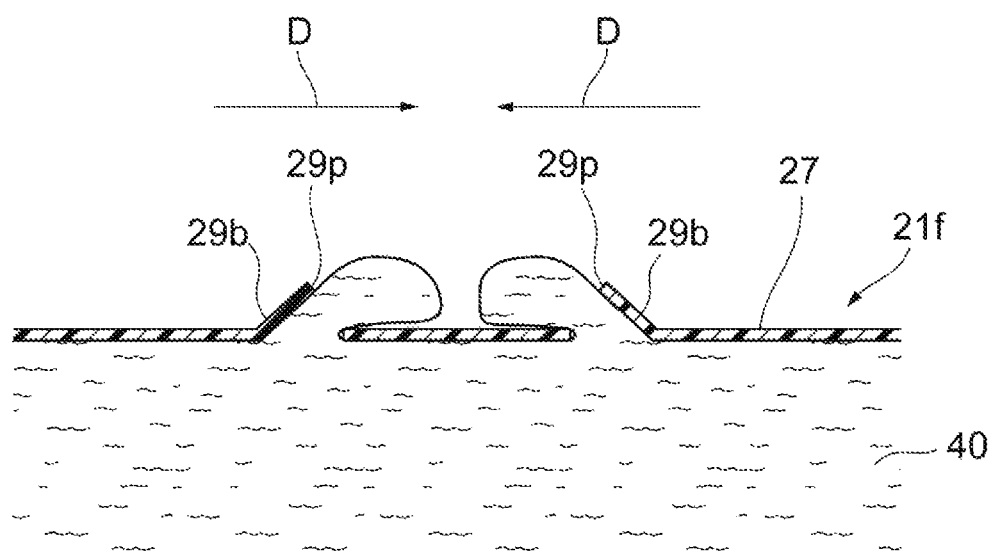
FIG. 20 is a diagram showing a state where the foam material permeates the osmosis membrane made of the resin film having the slits shown in FIG. 12.

Here, in the case of use of the resin film 27 having the slits 29*b* bent at the tops 29*p* as the osmosis membrane 21*f* as shown in FIG. 12, the slits 29*b* facing each other at the tops 29*p* causes the foam material to permeate in the direction D as shown in FIG. 20. Thus, even if the amount of foam material permeating from the pair of slits 29*b* having the tops 29*p* facing each other is small, the material tends to be bonded to the foam material permeating from other slits 29*b*. Consequently, a higher connection strength can be achieved by a smaller amount of impregnation.

Figure 21:
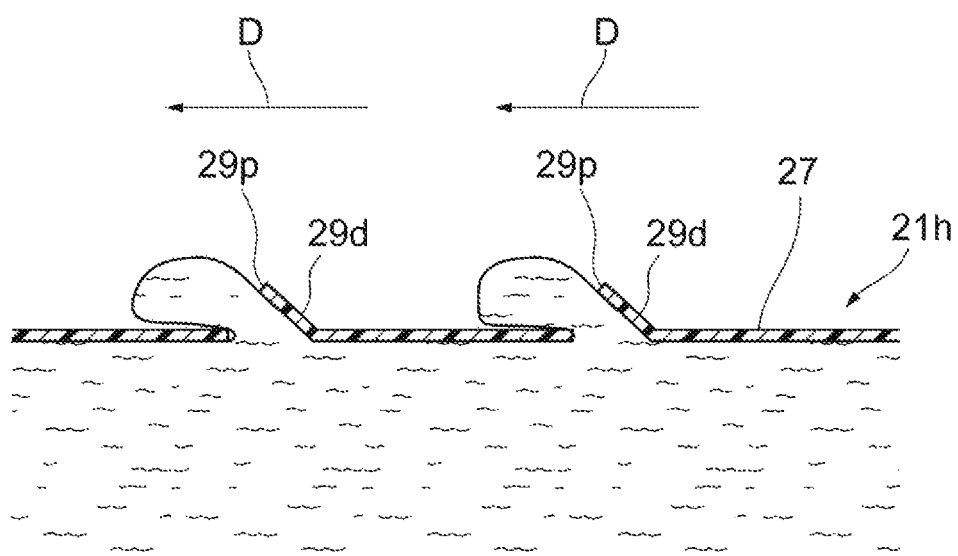
FIG. 21 is a diagram showing a state where the foam material permeates the osmosis membrane made of the resin film having the slits shown in FIG. 14.

Alternatively, in the case of use of the osmosis membrane 21*h* of the resin film 27 having the slits 29*d* bent at the tops 29*p* as shown in FIG. 14 instead of the osmosis membrane 21*a*, the slits 29*d* oriented in the same direction at the tops 29*p* causes the foam material to permeate in the same direction D as shown in FIG. 21. Consequently, the foam material permeating from the slits 29*d* with the pair of tops 29*p* oriented in the same direction tends to be solidified at a smaller distance from the osmosis membrane 21*h*. Consequently, a higher connection strength can be achieved by the impregnated section 51 with a smaller amount of impregnation.

Figure 22:
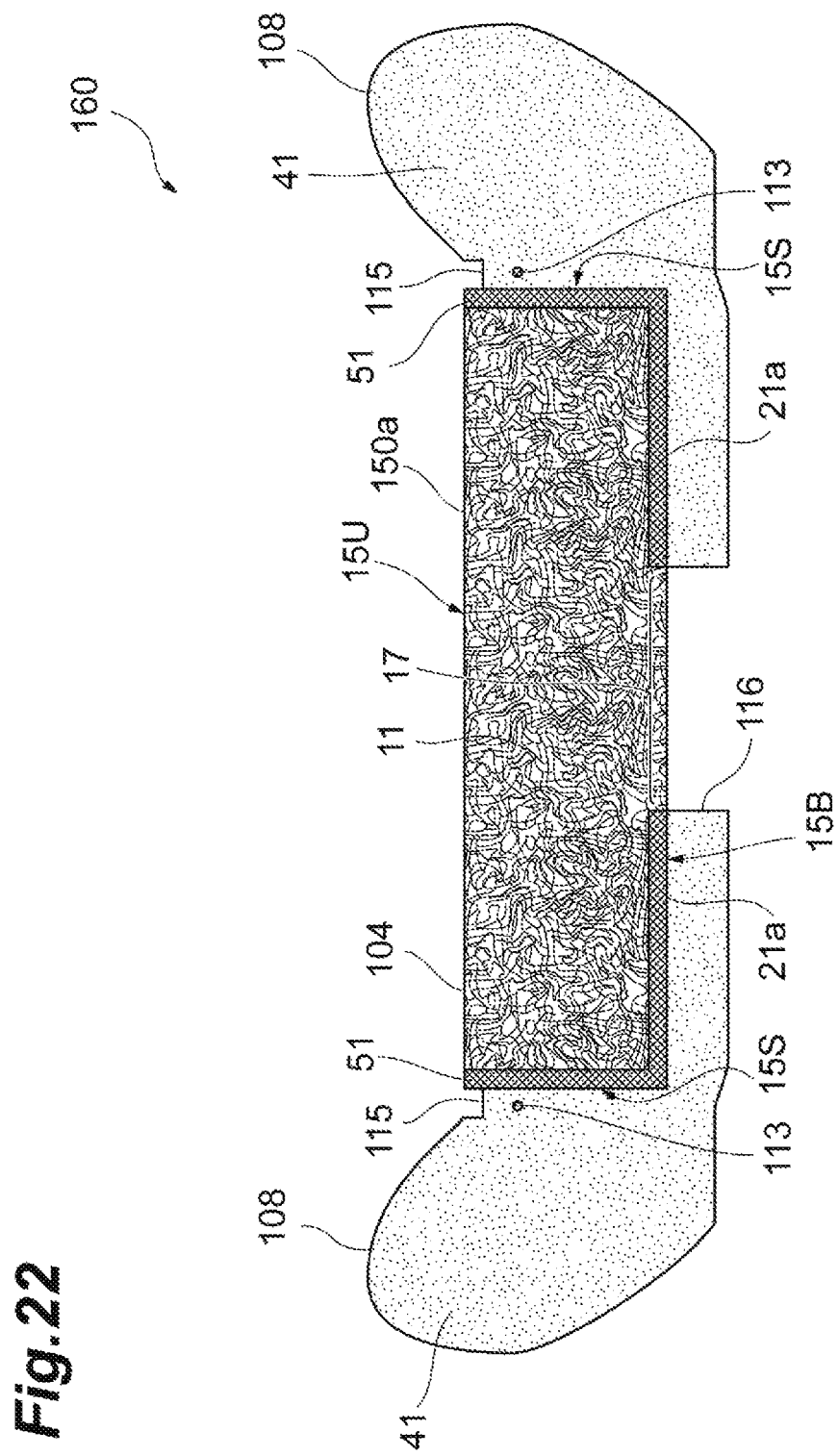
FIG. 22 is a sectional view showing the bonded body of the three-dimensional network structure section and the foam section after the foam material in FIG. 19 is solidified.

As shown in FIG. 22, the foam material 40 is solidified to form the foam section 41. The foam material 40 with which the impregnated section 51 of the three-dimensional network structure section 11 is impregnated is solidified to thereby connect the three-dimensional network structure section 11 and the foam section 41 to each other. A bonded body 160 where the three-dimensional network structure section 11 and the foam section 41 are connected to each other is taken out from the upper mold 300*a* and the lower mold 300*b*. Concaves 115 for forming the wire introducers 110 are formed at positions of the bonded body 160 that correspond to the protrusions 300*c* on the lower mold 300*b*. The wires 113 are enclosed in the foam section 41 beneath the concaves 115. A concave 116 in which the air blowing section 140 is to be disposed is formed at a position corresponding to the protrusion 300*d* of the upper mold 300*a* of the bonded body 160.

Figure 23:
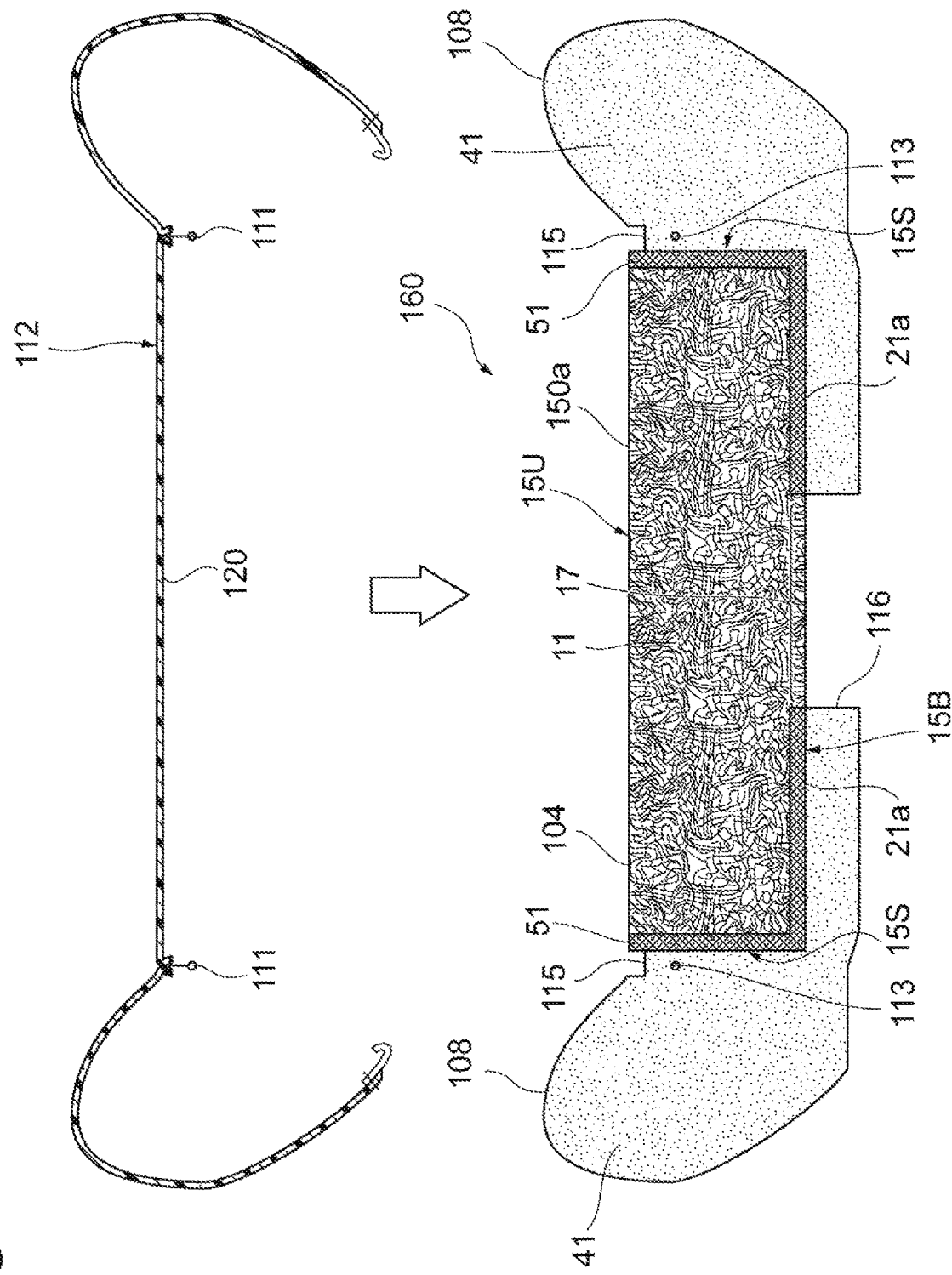
FIG. 23 is a sectional view showing a step of covering the bonded body in FIG. 22 with a stacked surface leather and membraneless foam.
Figure 24:
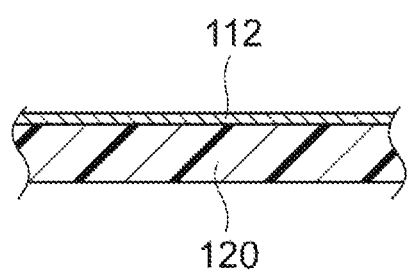
FIG. 24 is an enlarged view of the stacked surface leather and membraneless foam in FIG. 23.
Figure 25:
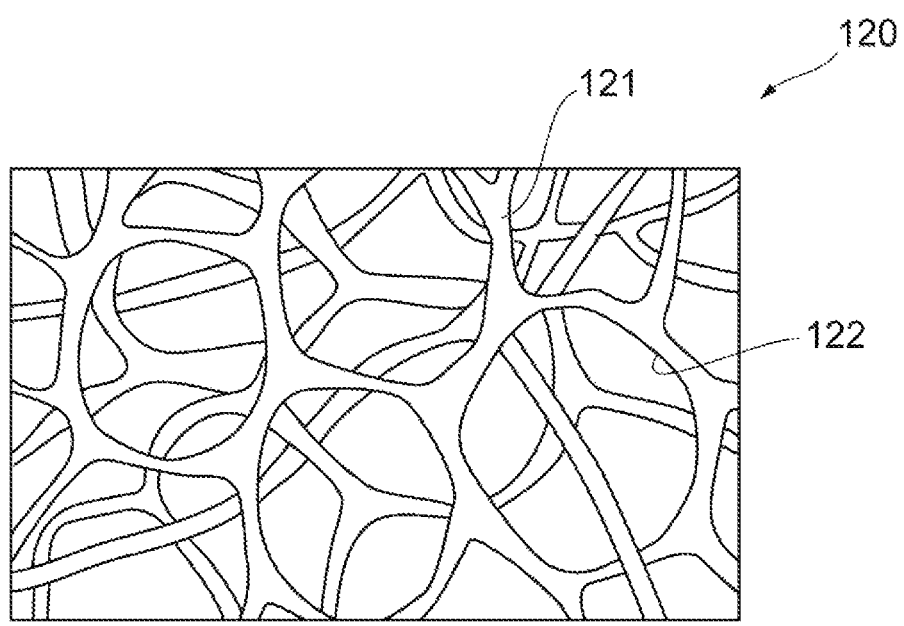
FIG. 25 is an enlarged view of the membraneless foam in FIG. 24.

As shown in FIGS. 23 and 24, the surface leather 112 provided with the membraneless foam 120 made of stacks of the membraneless foam 120 by frame laminate on the undersurface is attached onto the surface of the bonded body 160. The wires 111 droop from the positions on the undersurface on the surface leather 112 that correspond to the respective concaves 115. As shown in FIG. 25, in the membraneless foam 120, the membranes of bubbles of the foam are removed at cell membrane removal sections 122. Each of the bubbles of the foam is connected only at a cell wall 121. For example, the membraneless foam 120 is manufactured by foaming the material of polyurethane foam to obtain the polyurethane foam and subsequently applying a membrane removing process to the membranes of bubbles of the polyurethane foam. The membrane removing process can be achieved by a blast process of injecting oxygen into the polyurethane foam and igniting the foam to thereby blast the membranes of bubbles.

Figure 26:
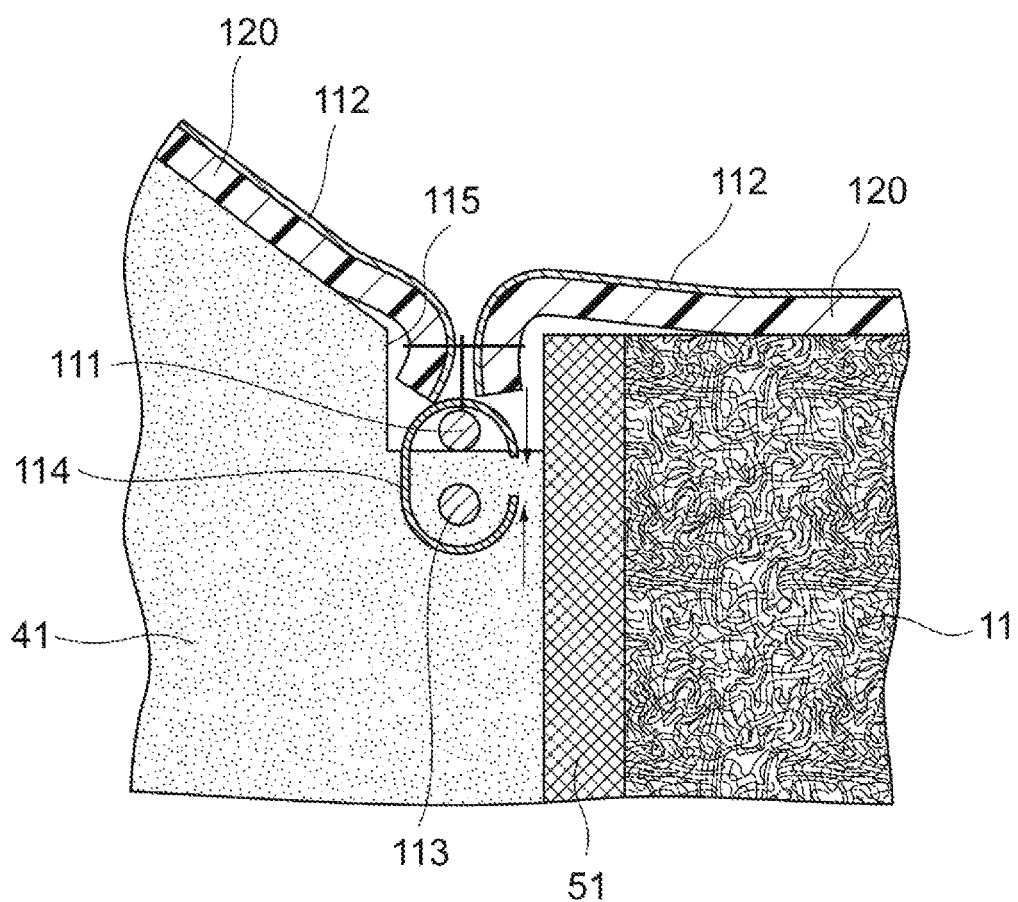
FIG. 26 is a sectional view showing a step of fixing the surface leather and membraneless foam to the bonded body by clamping wires with C-rings at the concave in FIG. 23.

As shown in FIG. 26, when the surface leather 112 is attached onto the surface of the bonded body 160, the wires 111 below the surface leathers 112 are inserted into the respective concaves 115 of the bonded body 160. The C-rings 114 are inserted from the outside of the foam section 41 having flexibility. The C-ring 114 is clamped to bundle the wire 113 enclosed beneath the concave 115 of the foam section 41 and the wire 111. Thus, the tensions are applied by the wires 111 and 113 enclosed in the wire introducers 110 and by C-rings 114 to the surface leather 112 not to be wrinkled. The air blowing section 140 is attached to the concave 116.

According to this embodiment, the osmosis membrane 21*a* is disposed at the boundary between the three-dimensional network structure section 11 and the foam section 41. The osmosis membrane 21*a* allows the liquid foam material 40 to permeate. The three-dimensional network structure section 11 is impregnated with the foam material 40 through the osmosis membrane 21a, and subsequently the foam material is solidified, thereby connecting the three-dimensional network structure section 11 and the foam section 41 to each other. The foam material 40 with which the three-dimensional network structure section 11 is impregnated is in contact with the resin wires 12 of the three-dimensional network structure section 11 on a wide area and is solidified. The cushion structure 100a that has an improved connection strength between the three-dimensional network structure section 11 and the foam section 41 can be provided. That is, according to this embodiment, the connection strength between the three-dimensional network structure section 11 and the foam section 41 is higher than the strength of the foam section 41 that is a base material. Consequently, the durability required for a seat for a vehicle can be secured.

According to this embodiment, the osmosis membranes 21a and 21b are cloth formed of fibers 22. The fibers 22 forming the cloth are covered with the resin cover 23 not to expose the surfaces of the fibers 22. Thus, when the three-dimensional network structure section 11 is impregnated with the foam material 40 through the osmosis membranes 21a and 21b, it is difficult to eliminate the bubbles of the foam material 40 because of the unevenness of the fibers 22. Consequently, elimination of the bubbles of the foam material 40 can prevent the impregnated section 51 of the three-dimensional network structure section 11 impregnated with the foam material 40 from being hardened in comparison with the other portions. Consequently, the cushion structure 100a can have a small variation in hardness over the entire structure, thereby allowing the feeling at the cushion structure 100a to be improved.

Alternatively, in this embodiment, the osmosis membrane 21c is nonwoven fabric 25 formed of monofilament fibers 26. The monofilament fibers 26 do not have unevenness on the surface the multifilaments have. The nonwoven fabric 25 has a smaller amount of unevenness at portions into which the foam material 40 permeates than woven fabric. Thus, when the three-dimensional network structure section 11 is impregnated with the foam material 40 through the osmosis membrane 21c, it is difficult to eliminate the bubbles of the foam material 40 because of the unevenness of the fibers. Consequently, elimination of the bubbles of the foam material 40 can prevent the impregnated section 51 of the three-dimensional network structure section 11 impregnated with the foam material 40 from being hardened in comparison with the other portions.

Alternatively, in this embodiment, the osmosis membrane 21d is a resin film 27 having pores 28. Osmosis membranes 21e to 21i are resin films 27 having slits 29. The resin film 27 does not have unevenness due to fibers as in the case of woven fabric. Thus, when the three-dimensional network structure section 11 is impregnated with the foam material 40 through the osmosis membranes 21d to 21i, the bubbles of the foam material 40 are not eliminated owing to the unevenness of the fibers. Consequently, elimination of the bubbles of the foam material 40 can prevent the impregnated section 51 of the three-dimensional network structure section 11 impregnated with the foam material 40 from being hardened in comparison with the other portions.

As described above, in the case of application of the osmosis membrane 21f that is the resin film 27 having the bent slits 29b or the osmosis membrane 21g that is the resin film 27 having the curved slits 29c, even a small amount of the foam material 40 permeating from the pair of the slits 29b and 29c facing each other tends to be easily bond to the foam material 40 permeating from the other slits 29b and 29c. Consequently, a higher connection strength can be achieved by the impregnated section 51 with a smaller amount of impregnation. Consequently, the width of the impregnated section 51 can be reduced. Consequently, parts of the cushion structure 100a with high hardnesses are reduced, which can improve the seating feeling of the passenger C.

Alternatively, as described above, in the case of application of the osmosis membrane 21h that is the resin film 27 having the bent slits 29d or the osmosis membrane 21i that is the resin film 27 having the curved slits 29e, the foam material 40 permeating from the pair of the slits 29b and 29c oriented in the same direction tends to be easily solidified at a smaller distance from the osmosis membranes 21h and 21i. Consequently, a higher connection strength can be achieved by the impregnated section 51 with a smaller amount of impregnation. Consequently, parts of the cushion structure 100a with high hardnesses are reduced, which can improve the seating feeling of the passenger C.

In this embodiment, a mode may be adopted where the upper surface 15U of the three-dimensional network structure section 11 is covered with the membraneless foam 120 from which the membrane of bubbles of foam is removed. Consequently, the flexibility of the upper surface 15U of the three-dimensional network structure section 11 can be improved while the breathability is maintained.

In this embodiment, the air blowing section 140 that can blow air in any of the directions from a lower part to an upper part and from the upper part to the lower part of the three-dimensional network structure section 11 is further provided below three-dimensional network structure section 11. The breathability can thus be further improved. Conventional air conditioning seat structures include a structure where grooves are engraved on a pad of foam for a seat to blow air into the grooves. Such a structure has a high pressure loss during air blowing. Consequently, it is difficult for a propeller-type air blower that blows air with typical propellers to blow air. Thus, with such a structure, a centrifugal fan type air blower typified by a sirocco fan is used. However, the centrifugal fan type air blower has a larger structure than a propeller-type air blower, and is heavy, makes a large noise and is expensive. In the case of use of such a centrifugal fan type air blower, the air blower largely protrudes from the undersurface of the pad. Consequently, the air blower is required to be covered with a resin cover or the like. Furthermore, there is a need to add many parts, such as fixtures and a ventilation duct.

In recent years, according to increase in concerns on the environment and the like, engine stop at stopping of an automobile has been proposed as a low fuel consumption technique for automobiles. When the engine is stopped at stopping of an automobile, an air conditioner is also stopped on the stopping. It is thus required to address the stuffiness of the passenger. In this embodiment, a propeller-type air blower that can be driven with a low power consumption can be used as the air blowing section 140. Consequently, even if the engine is stopped on stopping of the automobile, the stuffiness of the passenger can be sufficiently removed by means of an inexpensive configuration. Furthermore, the noise can be reduced. The propeller-type air blower is small in size. Consequently, the cushion structure 100a of this embodiment can be disposed in a space analogous to that of a typical seat for a vehicle on which air conditioning is not considered.

In this embodiment, even if the air blowing section 140 is not provided, the three-dimensional network structure section 11 is excellent in breathability. Consequently, even when the engine is stopped on stopping of the automobile, the stuffiness of the passenger can be removed by means of a more inexpensive configuration. Furthermore, in this embodiment, even if the cushion structure 100a with no air blowing section 140 being provided for the automobile is initially mounted, the air blowing section 140 can be easily added according to user's preference.

According to this embodiment, a propeller-type air blower that blows air by propellers having a thickness of approximately 10 mm and is used in a personal computer or the like, can be used as the air blowing section 140. Consequently, the concave 116 made by hollowing the foam section 41 to dispose the air blowing section 140 is allowed to be small. Consequently, both of the cushion structure 100a that is not provided with the air blowing section 140 and the cushion structure 100a that is not provided with the air blowing section 140 can be manufactured with an upper mold 300a and a lower mold 300b. In the three-dimensional network structure section 11, the resin wires 12 are welded to each other. Consequently, this section has a high rigidity. Consequently, even in the case where the cushion structure 100a without the air blowing section 140 has the concave 116 made by hollowing the foam section 41 to arrange the air blowing section 140 later, the passenger C is allowed not to feel the presence of the concave 116.

In this embodiment, the impregnated section 51 is formed up to the undersurface 15B, except the opening 17, of the three-dimensional network structure section 11. The impregnated section 51 has higher rigidity than the three-dimensional network structure section 11 has. Consequently, the uncomfortableness due to the concave 116 of the undersurface 15B of the three-dimensional network structure section 11 can be eliminated. Furthermore, the impregnated section 51 on the undersurface 15B can prevent the air blown from the lower side to the upper side by the air blowing section 140 from escaping downward and sideward. Consequently, the air blowing efficiency of the air blowing section 140 can be improved.

Furthermore, in this embodiment, the cushion structure component 150a includes: the three-dimensional network structure section 11; and the osmosis membrane 21a which is disposed to surround the side surfaces 15S of the three-dimensional network structure section 11 and through which the liquid foam material 40 to be formed into the foam section 41 by foaming and being solidified is permeable. Consequently, the cushion structure 100a where the three-dimensional network structure section 11 and the foam section 41 are connected to each other with a higher connection strength can be easily manufactured by arranging the liquid foam material 40 to be in contact with the osmosis membrane 21a of the cushion structure component 150a, impregnating the three-dimensional network structure section 11 with the foam material 40 through the osmosis membrane 21a, and solidifying the foam material 40. In this embodiment, use of the cushion structure component 150a allows existing production facilities to manufacture the cushion structure 100a. Since the three-dimensional network structure section 11 is difficult to be processed, it is difficult to process the three-dimensional network structure section 11 to have any shape as in the case of Patent Literature 1 described above. However, this embodiment negates the need to process the three-dimensional network structure section 11 to have a complicated shape, and is excellent in productivity.

That is, in this embodiment, the bonded body 160 of the three-dimensional network structure section 11 and the foam section 41 is completed only by a normal foaming step after disposing the cushion structure component 150a in the upper mold 300a and the lower mold 300b. Consequently, no additional step is required, and the three-dimensional network structure section 11 excellent in air permeability only at required portions can be provided. The productivity of the cushion structure 100a can therefore be improved.

Second Embodiment

Figure 27:
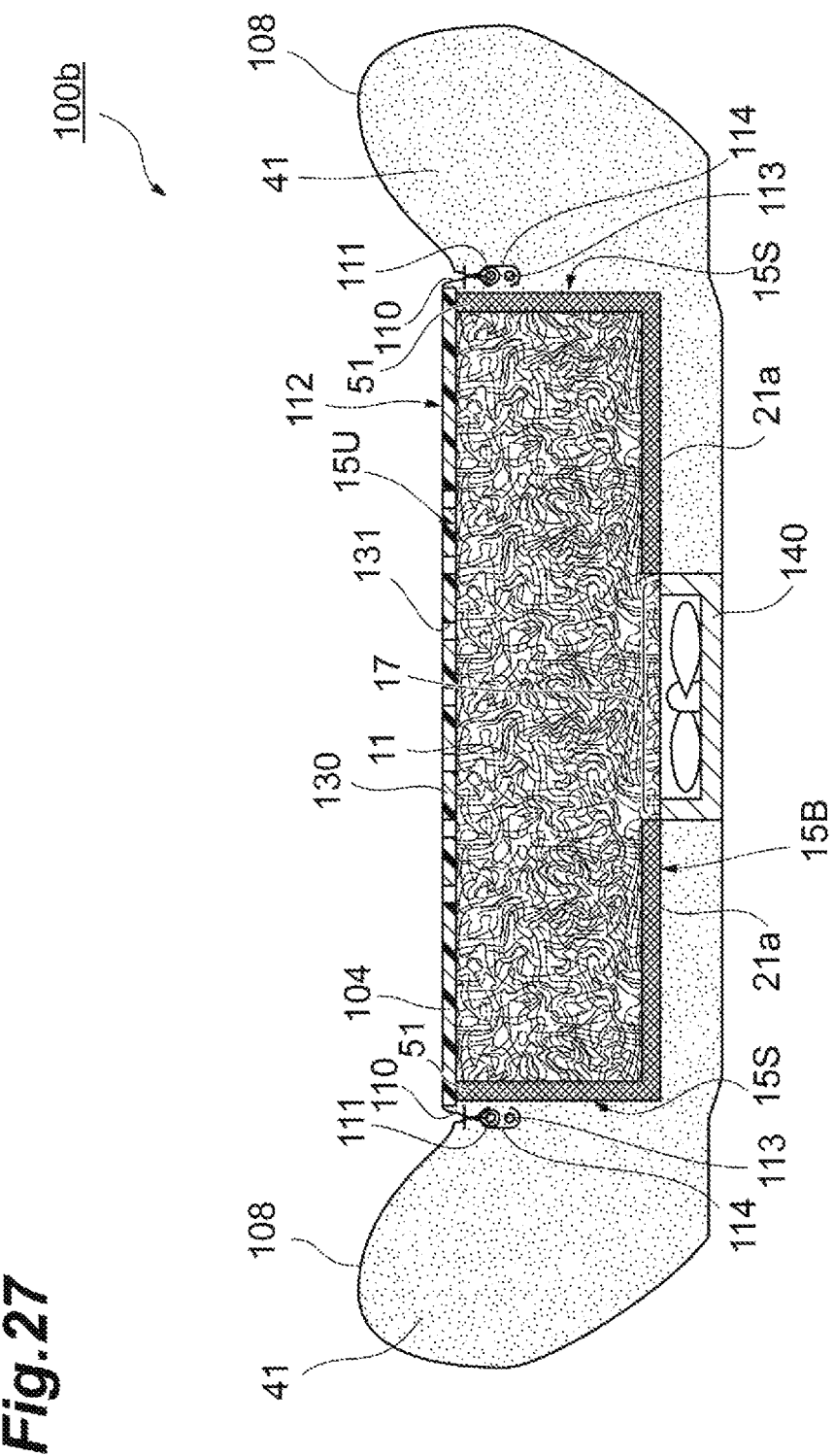
FIG. 27 is a diagram corresponding to a sectional view taken along line y-y of FIG. 1 showing the cushion structure of the second embodiment.

A second embodiment of the present invention is hereinafter described. As shown in FIG. 27, in a cushion structure 100b of this embodiment, the membraneless foam 120 is not stacked on the undersurface of the surface leather 112. In the cushion structure 100b, the upper surface 15U of the three-dimensional network structure section 11 is covered with foam 130 instead of the membraneless foam 120; ventilation pores 131 that allow air to flow therethrough are formed in the foam 130. The foam 130 may be a plate-shaped polyurethane foam that has, for example, a thickness of approximately 10 mm and is provided with the ventilation pores 131 allowing air to pass therethrough.

Figure 28:
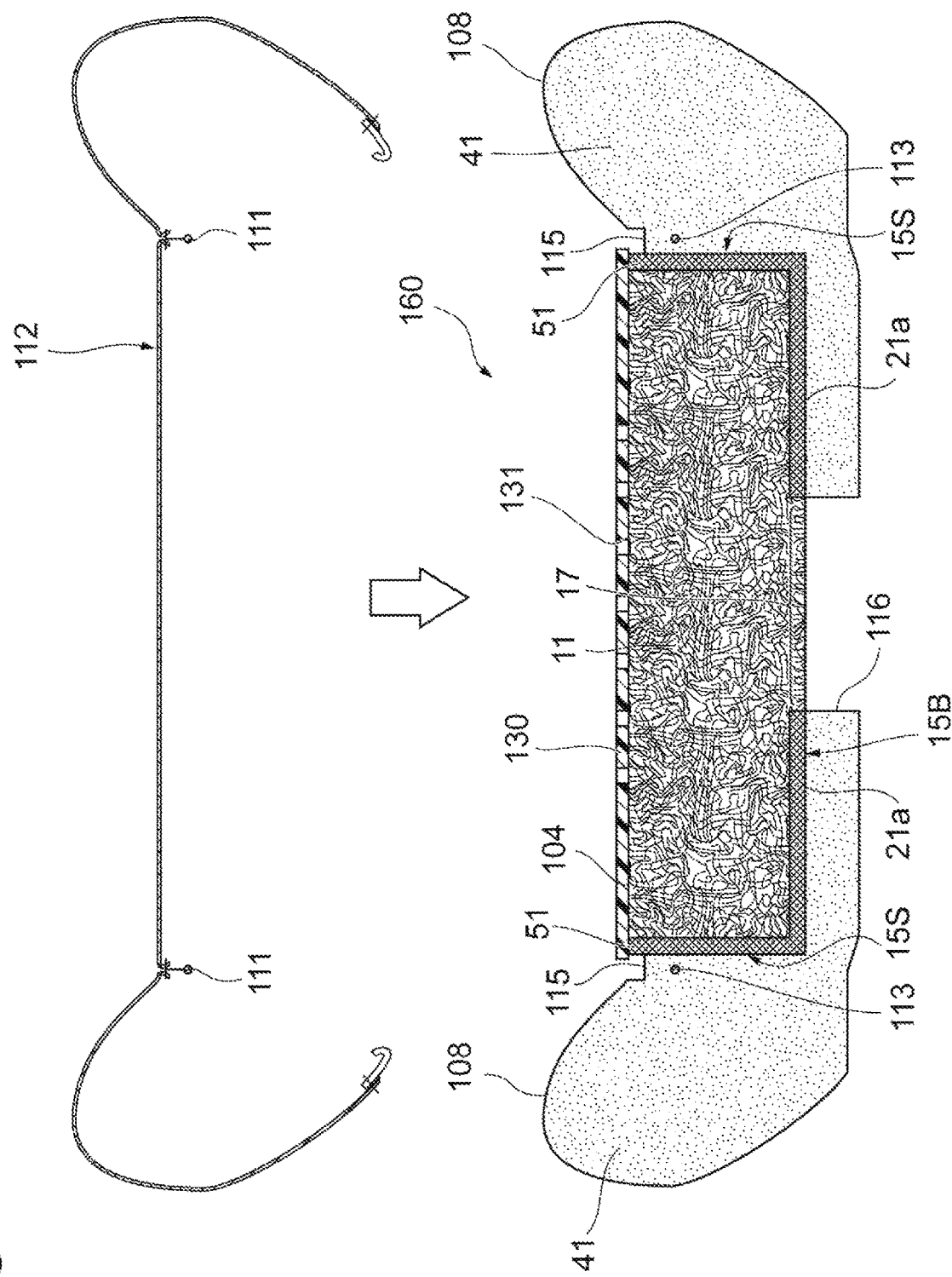
FIG. 28 is a sectional view showing a step of covering the bonded body in FIG. 22 with foam where ventilation pores are formed and subsequently of covering with the surface leather and membraneless foam when manufacturing the cushion structure according to FIG. 27.

As shown in FIG. 28, during manufacture of the cushion structure 100b, the foam 130 is disposed on the upper surface 15U of the three-dimensional network structure section 11 of the bonded body 160 manufactured in a manner analogous to that in the first embodiment. After the foam 130 is disposed, the surface leather 112 with no membraneless foam 120 being stacked on the undersurface of this leather is attached onto the surface of the bonded body 160. As with the first embodiment, the wires 111 droop from the positions on the undersurface of the surface leather 112 that correspond to the respective concaves 115.

Figure 29:
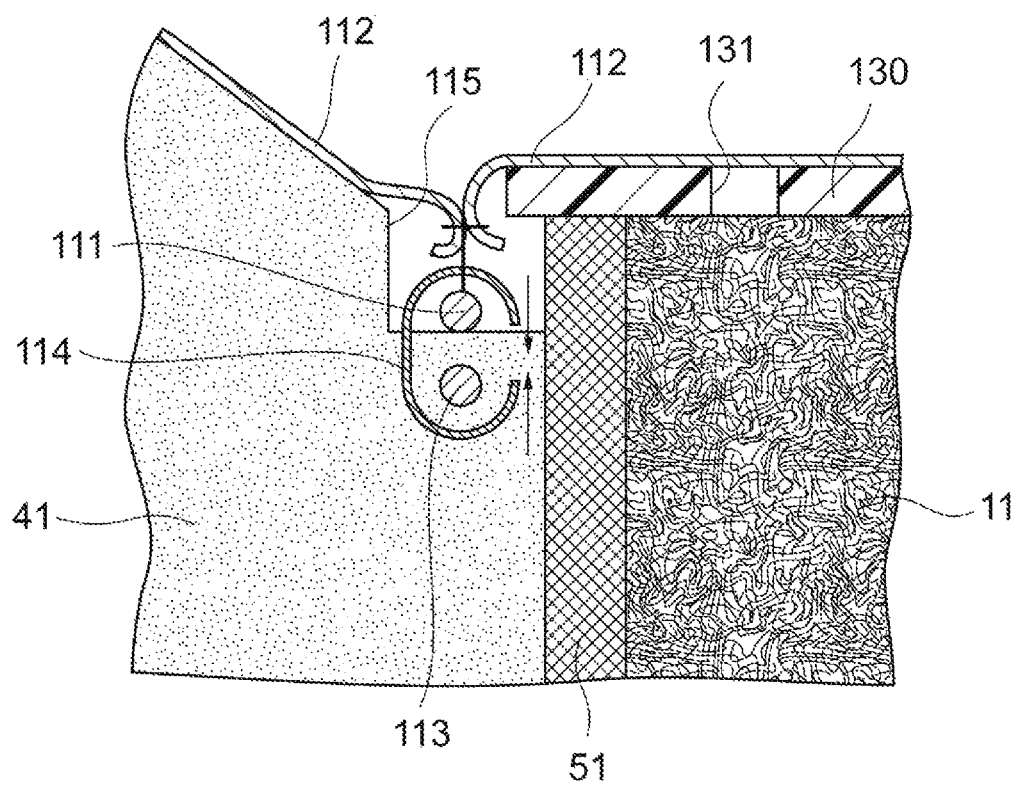
FIG. 29 is a sectional view showing a step of fixing the surface leather to the bonded body by clamping wires with C-rings at the concave in FIG. 28.

As shown in FIG. 29, when the surface leather 112 is attached onto the surface of the bonded body 160, the wires 111 below the surface leather 112 are inserted into the respective concaves 115 of the bonded body 160. The C-rings 114 are inserted from the outside of the foam section 41 having flexibility. The C-ring 114 is clamped to bundle the wire 113 enclosed beneath the concave 115 of the foam section 41 and the wire 111. Thus, the tensions are applied by the wires 111 and 113 enclosed in the wire introducers 110 and by C-rings 114 to the surface leather 112 not to be wrinkled. The air blowing section 140 is attached to the concave 116.

In this embodiment, the upper surface 15U of the three-dimensional network structure section 11 is covered with foam 130; ventilation pores 131 that allow air to flow therethrough are formed in the foam 130. Consequently, the flexibility of the upper surface 15U of the three-dimensional network structure section 11 can be improved while the breathability is maintained.

Third Embodiment

Figure 30:
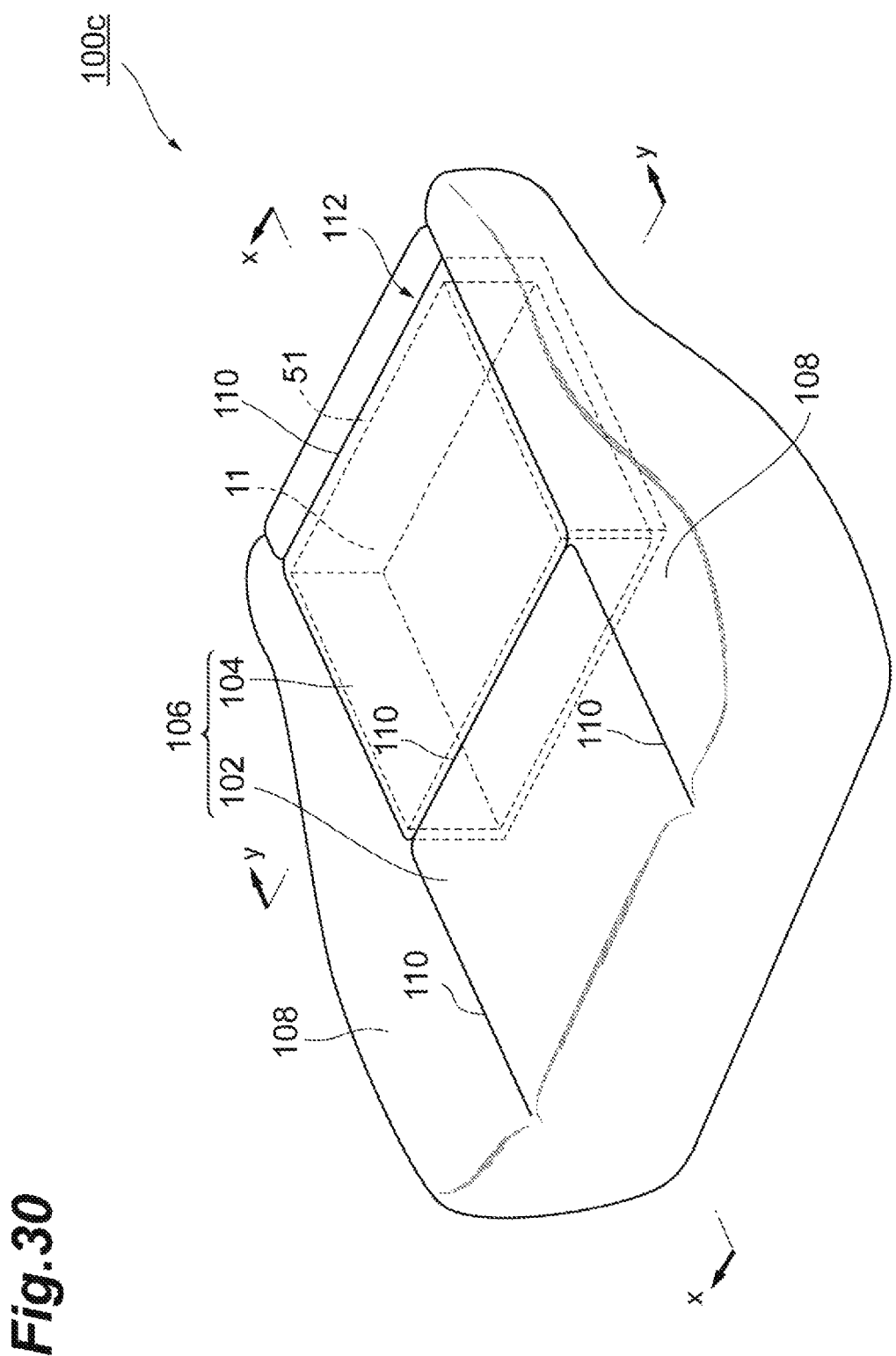
FIG. 30 is a perspective view showing a cushion structure of a third embodiment.
Figure 31:
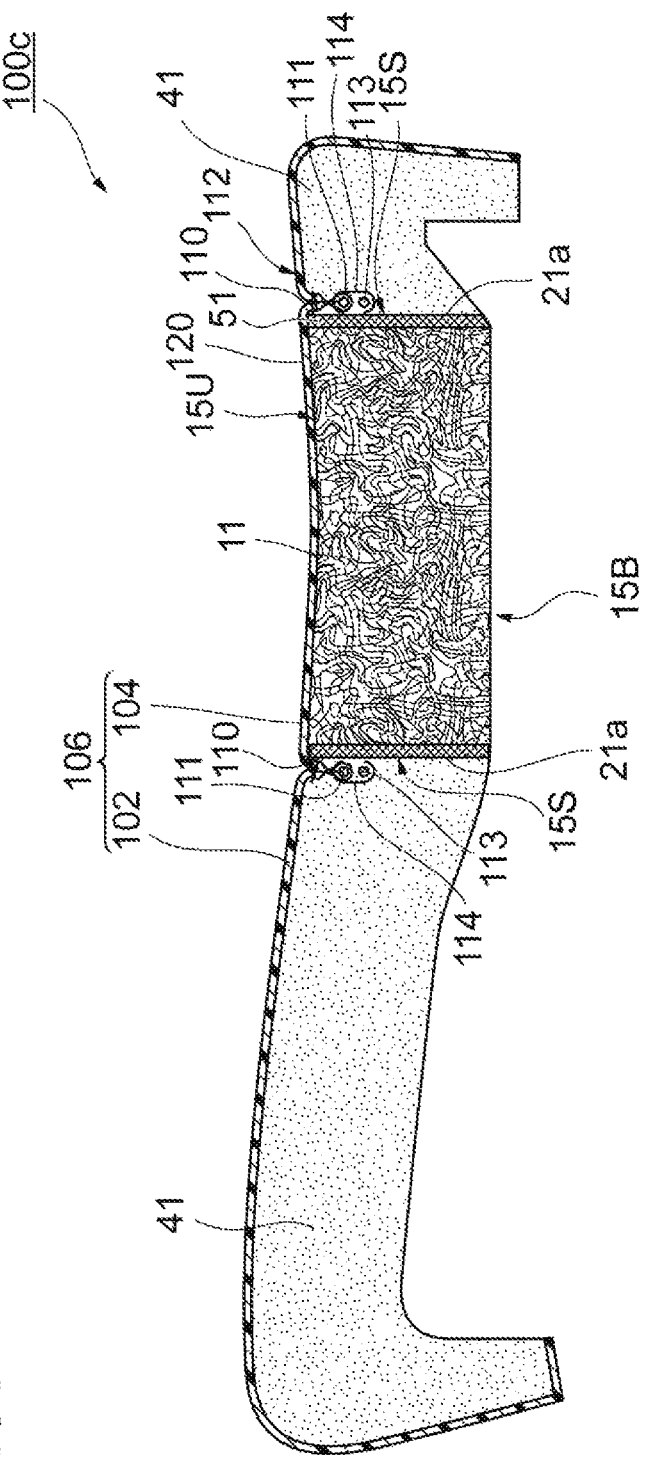
FIG. 31 is a sectional view taken along line x-x of FIG. 30.
Figure 32:
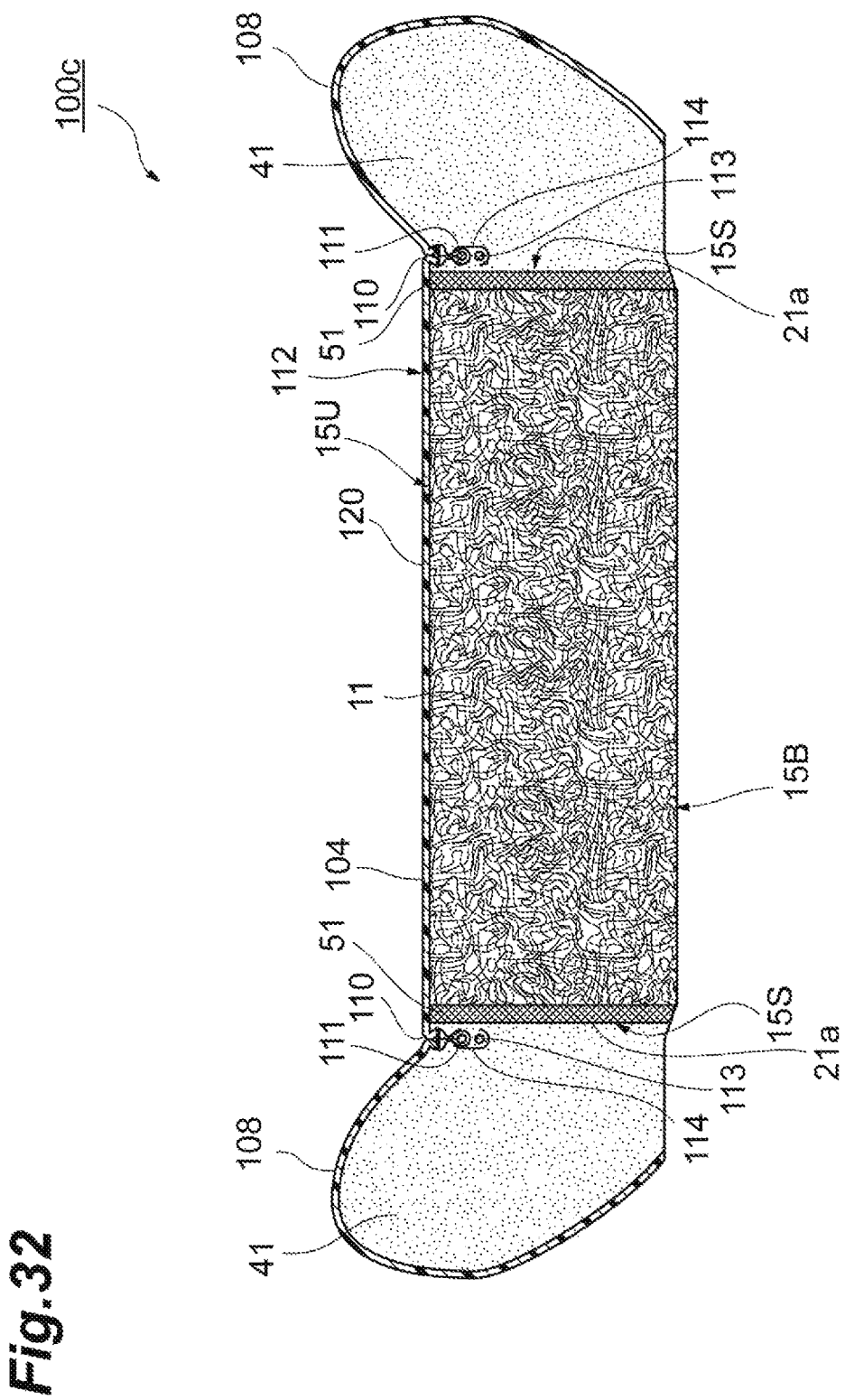
FIG. 32 is a sectional view taken along line y-y of FIG. 30.

A third embodiment of the present invention is hereinafter described. As shown in FIGS. 30, 31 and 32, the cushion structure 100c of this embodiment is different from the structures of the first and second embodiments in that the air blowing section 140 is not provided on the undersurface 15B of the three-dimensional network structure section 11. The impregnated section 51 is not formed on the undersurface 15B of the three-dimensional network structure section 11. The foam section 41 does not have the concave 116.

Figure 33:
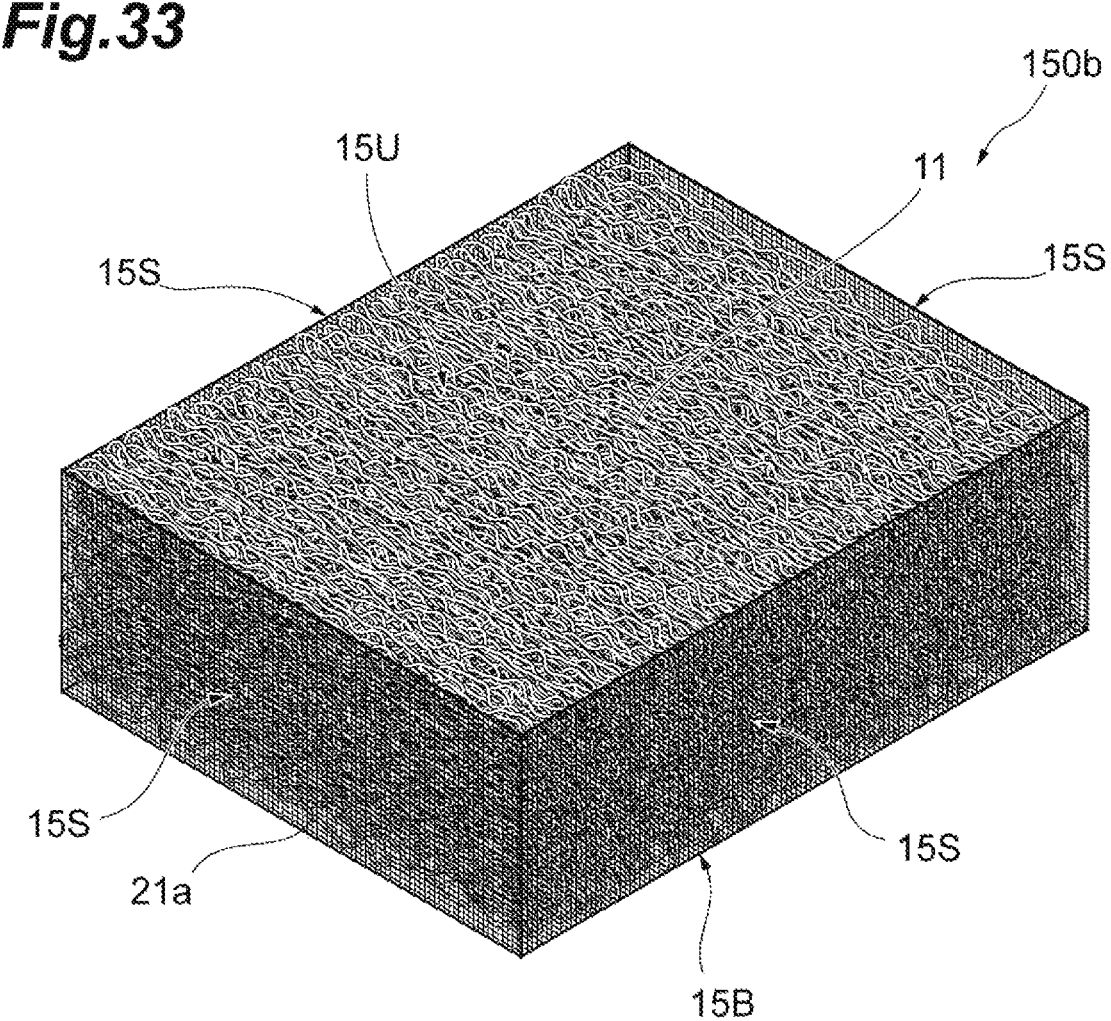
FIG. 33 is a perspective view showing the cushion structure component of the third embodiment where osmosis membranes are provided on the side surfaces of the three-dimensional network structure section of FIG. 4.

According to this embodiment, the cushion structure 100c is manufactured using a cushion structure component 150b as shown in FIG. 33. The cushion structure component 150b includes: the three-dimensional network structure section 11 described above; and the osmosis membrane 21a disposed to surround the side surfaces 15S of the three-dimensional network structure section 11. In this embodiment, the osmosis membranes 21b to 21g described above are applicable instead of the osmosis membrane 21a.

Figure 34:
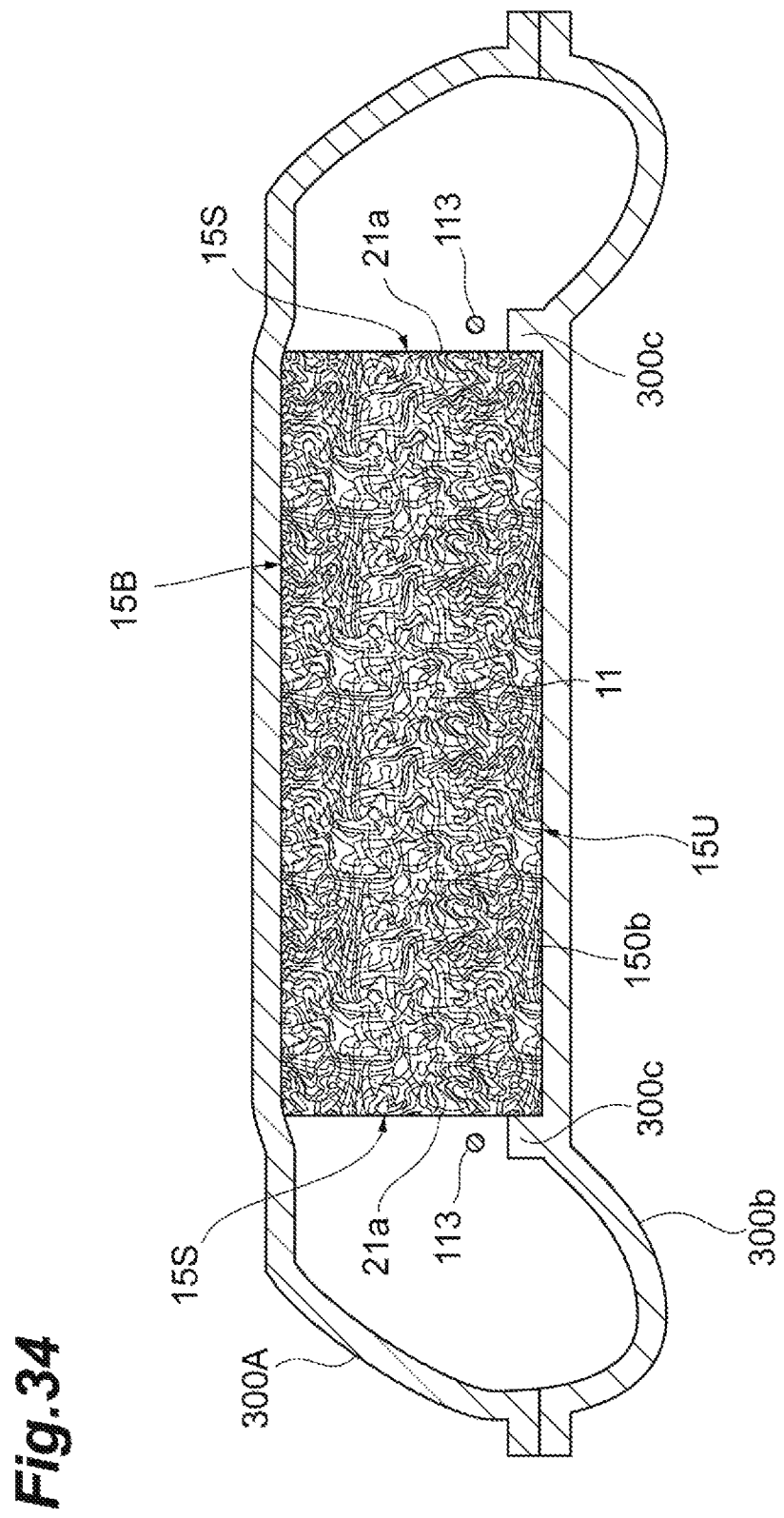
FIG. 34 is a sectional view showing a state where the cushion structure component in FIG. 33 is put between molds.

In the case of manufacturing the cushion structure 100c using the cushion structure component 150b, as shown in FIG. 34, the cushion structure component 150b inverted so that the upper surface 15U is oriented downward and the undersurface 15B is oriented upward is disposed in an upper mold 300A and a lower mold 300b that conform to the shape of the cushion structure 100c. In this embodiment, the protrusion 300d such as for the protrusion 300a of the first embodiment is not provided for the upper mold 300A.

After the cushion structure component 150b is disposed in the upper mold 300A and the lower mold 300b, the cushion structure 100c can be manufactured in a manner analogous to manners of the first and second embodiments. As with the first embodiment, the upper surface 15U of the three-dimensional network structure section 11 can be formed in a mode of being covered with the membraneless foam 120 stacked on the undersurface of the surface leather 112. As with the second embodiment, the upper surface 15U of the three-dimensional network structure section 11 can be formed in a mode of being covered with foam 130; ventilation pores 131 that allow air to flow therethrough are formed in the foam 130.

In this embodiment, the concave 116 made by hollowing the foam section 41 for allowing the air blowing section 140 to be disposed is not provided. However, even if the concave 116 is not provided, the air blowing section 140 is interposed between the foam section 41 and an S-shaped structural spring that supports the foam section 41 to thereby the air blowing section 140 to be disposed. Alternatively, the breathable nonwoven fabric using a fastener for mold allows the air blowing section 140 to be fixed.

Fourth Embodiment

Figure 35:
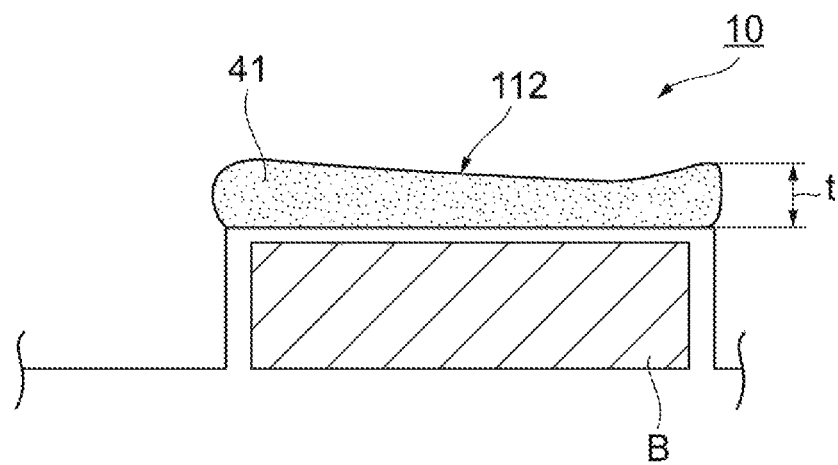
FIG. 35 is a sectional view showing a cushion structure having a reduced thickness.

A fourth embodiment of the present invention is hereinafter described. In recent years, hybrid vehicles and electric vehicles tend to use larger spaces below the floors of automobiles for mounting batteries and the like. To reduce the air resistance to an automobile, the height of the roof of the automobile is required to be small. Thus, as shown in FIG. 35, a battery B is disposed below a seat of an automobile in some cases. In such cases, the thickness t of the cushion structure 10 provided with the foam section 41 is not sufficiently secured in many cases.

Figure 36:
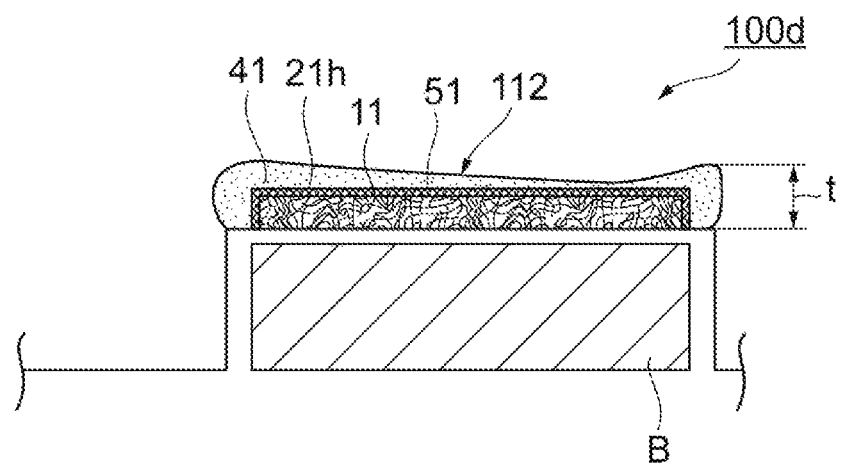
FIG. 36 is a sectional view showing a cushion structure of a fourth embodiment.

Thus, in this embodiment, as shown in FIG. 36, the foam section 41 having a small thickness t, and, inside the foam section 41, the cushion structure 100d that includes the three-dimensional network structure section 11 having a higher elasticity than the foam section 41, are applied as a seat. The cushion structure 100d includes an osmosis membrane 21h at the boundary between the three-dimensional network structure section 11 and the foam section 41. A typical nonwoven fabric is applied as the osmosis membrane 21h. As with the first to third embodiments, the osmosis membrane 21h allows the liquid foam material 40 to permeate therethrough. The three-dimensional network structure section 11 is impregnated with the liquid foam material 40 through the osmosis membrane 21h, and subsequently the foam material is solidified, which forms the impregnated section 51 and connects the three-dimensional network structure section 11 and the foam section 41 to each other.

However, in comparison with the osmosis membranes 21a to 21g, the foam material 40 permeating through the osmosis membrane 21h made of a typical nonwoven fabric hardens the impregnated section 51 to have a higher hardness. Consequently, the hardness of the impregnated section 51 can be increased and the thickness of the impregnated section 51 can be small. Even if the hardness of the impregnated section 51 is increased, the flexibility of the surface of the foam section 41 does not be degraded.

Figure 37:
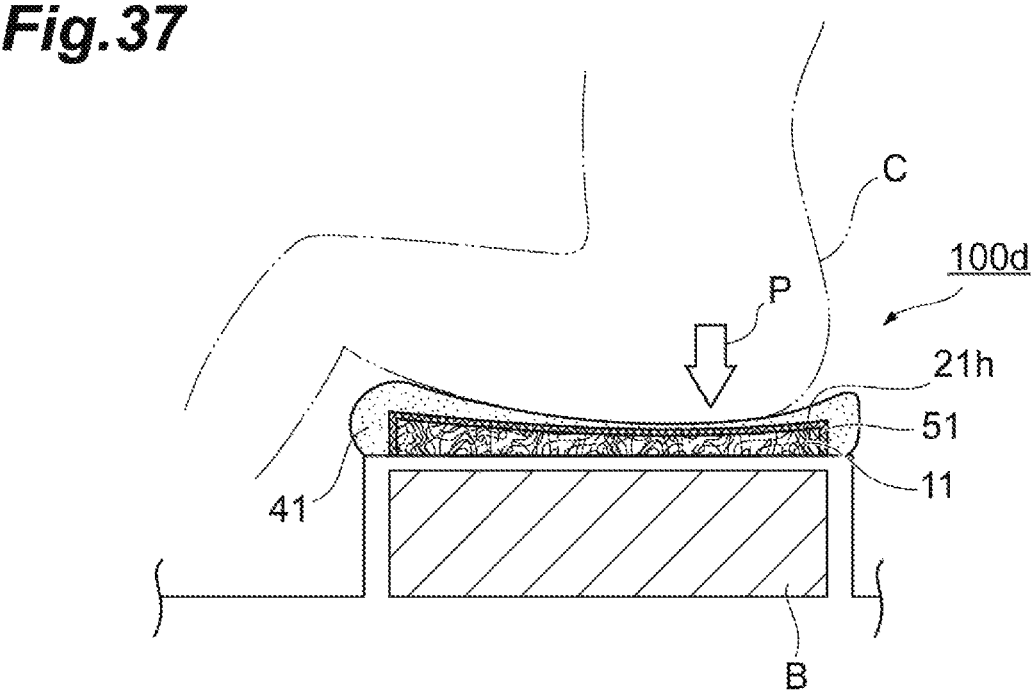
FIG. 37 is a sectional view showing a state where the load of a passenger is applied to the cushion structure in FIG. 36.

As shown in FIG. 37, when the passenger C is seated on the cushion structure 100d, the three-dimensional network structure section 11 having a strong elasticity allows the passenger C not to feel the small thickness t in comparison with the cushion structure 10 only including the foam section 41. The impregnated section 51 serves as a reinforcement floating in the foam section 41. Consequently, the local concentration of a load P under the buttocks of the passenger C can be distributed to the three-dimensional network structure section 11 and the foam section 41 therearound.

Fifth Embodiment

Figure 38:
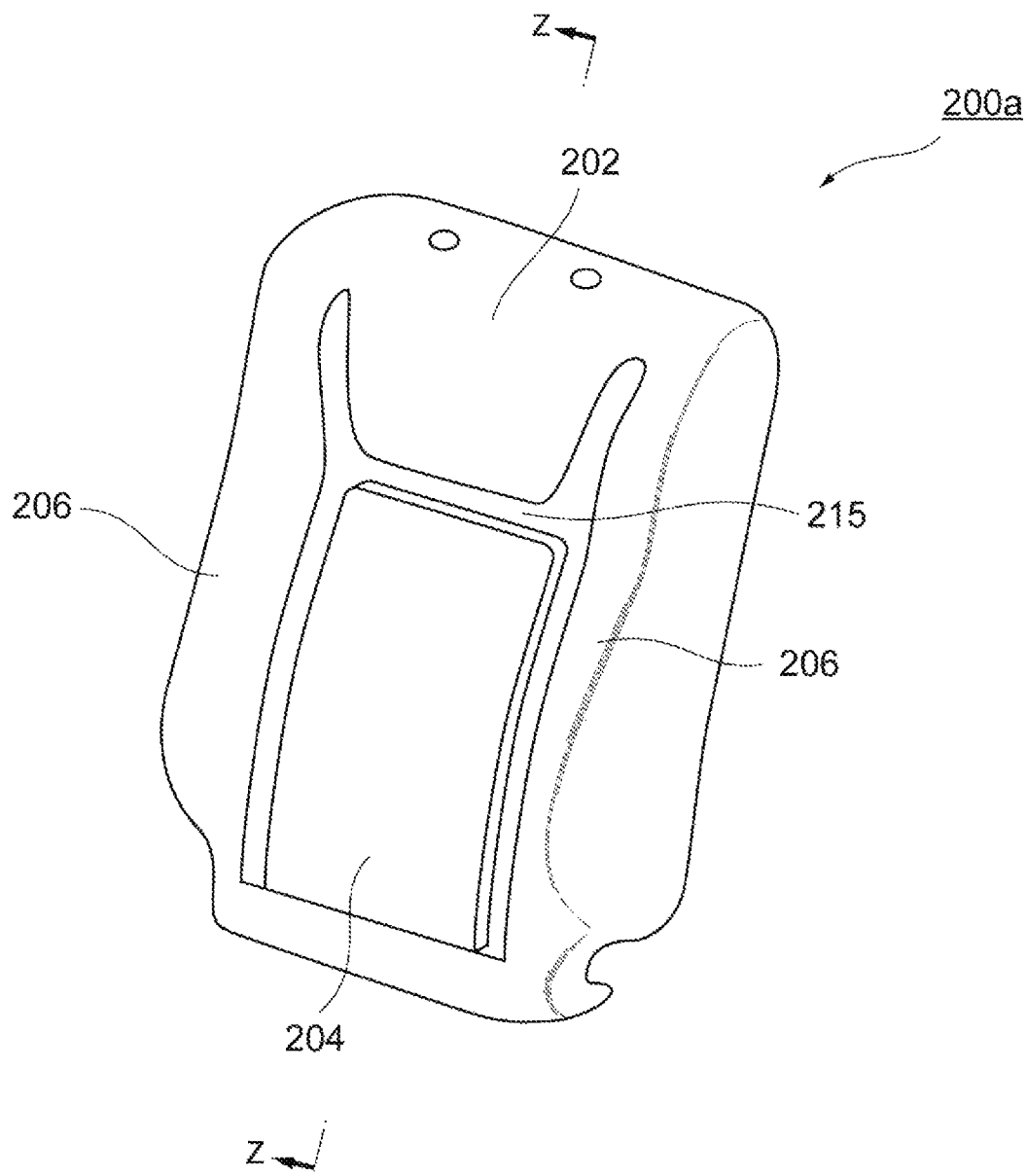
FIG. 38 is a perspective view showing a cushion structure of a fifth embodiment.

A fifth embodiment of the present invention is hereinafter described. As shown in FIG. 38, a cushion structure 200a according of this embodiment is applied to a seatback of an automobile. FIG. 38 shows a state where the surface has not been covered with the surface leather 112 yet. The cushion structure 200a includes a seatback upper section 202 at its upper part. The cushion structure 200a includes a seatback middle section 204 at its center part and lower than the seatback upper section 202. The cushion structure 200a includes seatback side sections 206 at the right and left of the seatback upper section 202 and the seatback middle section 204. The cushion structure 200a includes concaves 215 at the boundaries between the seatback upper section 202, the seatback middle section 204 and the seatback side sections 206. At the concaves 215, wire introducers 110 as with the first and second embodiments are formed.

Figure 39:
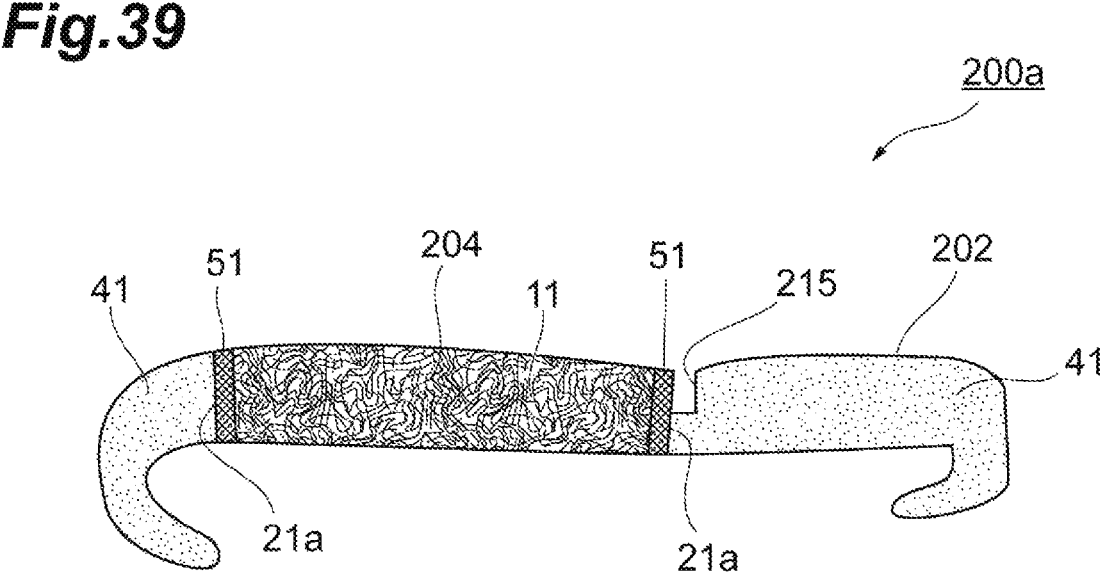
FIG. 39 is a sectional view taken along line Z-Z of FIG. 38.

As shown in FIG. 38 and FIG. 39 that is a sectional view taken along line Z-Z of FIG. 38, the cushion structure 200a includes the three-dimensional network structure section 11 in the seatback middle section 204. The cushion structure 200a includes the foam section 41 at the seatback upper section 202 and the seatback side sections 206. The cushion structure 200a includes an osmosis membrane 21a disposed at the boundary between the three-dimensional network structure section 11 and the foam section 41. In this embodiment, the osmosis membranes 21b to 21g described above is applicable instead of the osmosis membrane 21a.

As with the first to fourth embodiments, the impregnated sections 51 are formed at sites of impregnation with the liquid foam material for the foam section 41 through the osmosis membrane 21a and subsequent solidification of the material. As with the first to third embodiments, the impregnated section 51 is disposed in proximity with the concave 215. As with the first embodiment, the surface of the three-dimensional network structure section 11 can be formed in a mode of being covered with the membraneless foam 120 stacked on the undersurface of the surface leather 112. As with the second embodiment, the surface of the three-dimensional network structure section 11 can be formed in a mode of being covered with foam 130; the ventilation pores 131 that allow air to flow therethrough are formed in the foam 130.

When the cushion structure 200a is manufactured, the cushion structure component 150b analogous to that of the third embodiment is put into a mold that conforms to the shape of the seatback and subsequently a foaming step analogous to that of the third embodiment is performed, which can manufacture the cushion structure 200a.

As with the first to fourth embodiments, this embodiment can improve the strength, durability, feeling and breathability of the cushion structure 200a applied to the seatback.

Sixth Embodiment

Figure 40:
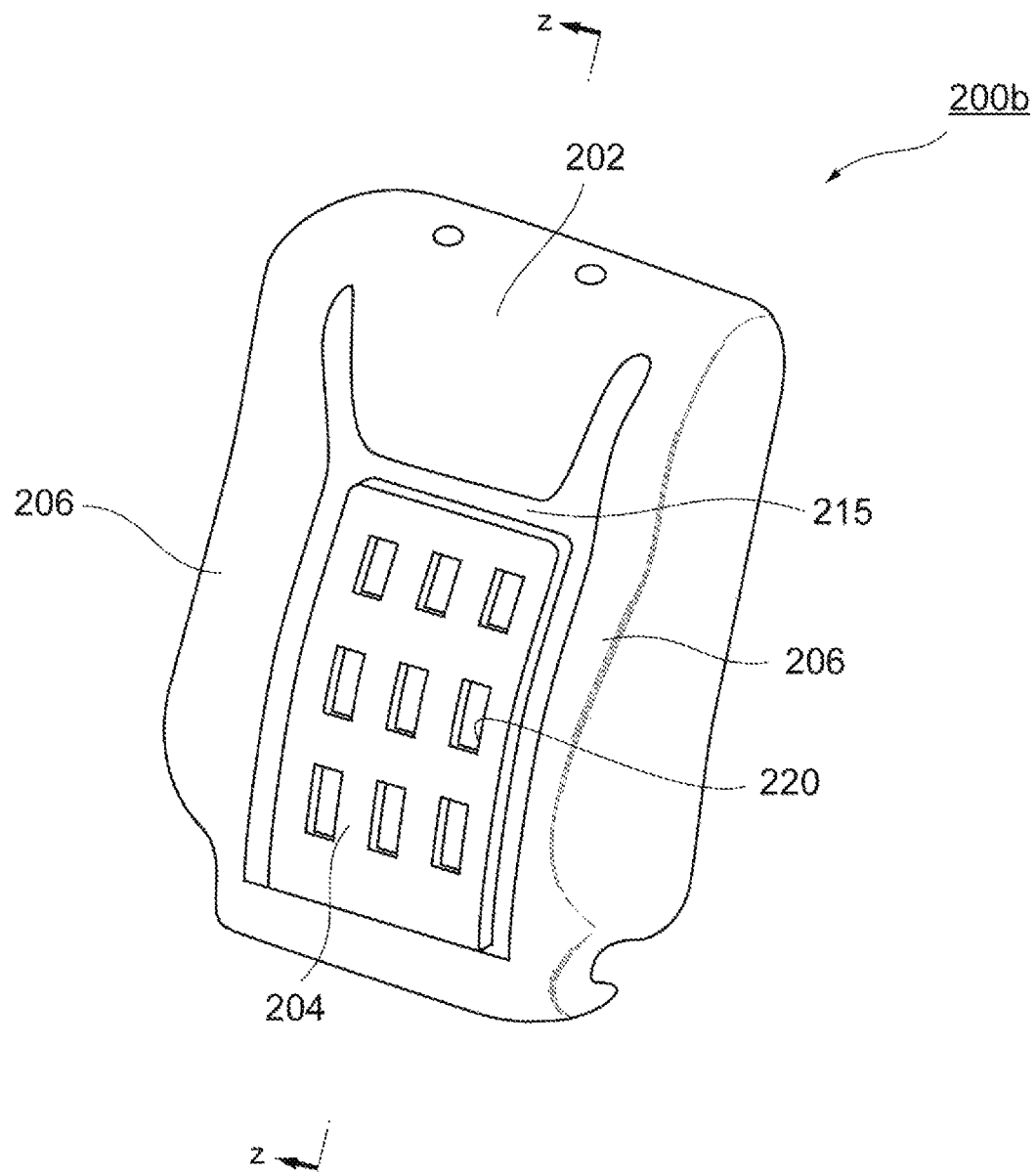
FIG. 40 is a perspective view showing a cushion structure of a sixth embodiment.
Figure 41:
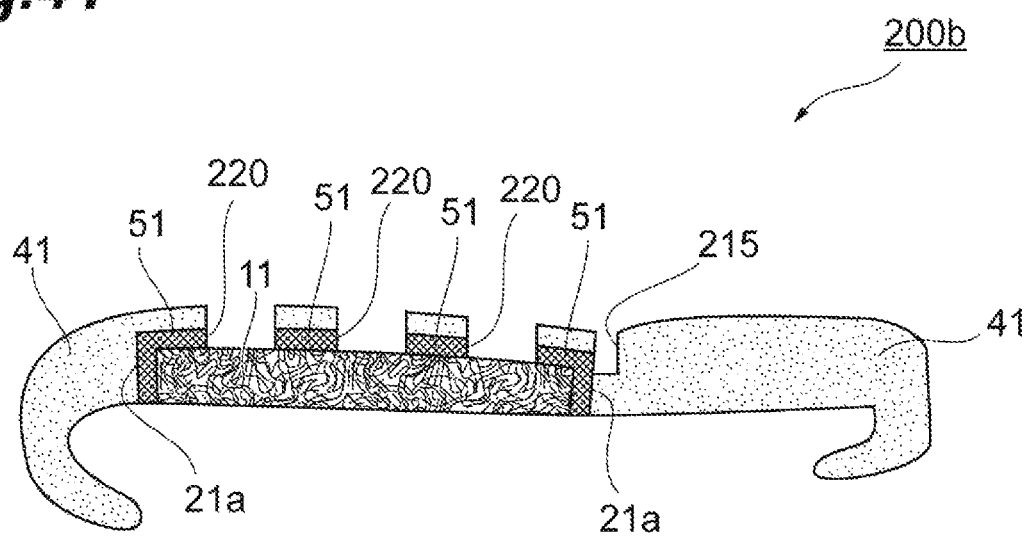
FIG. 41 is a sectional view taken along line z-z of FIG. 40.

A sixth embodiment of the present invention is hereinafter described. As shown in FIG. 40, the cushion structure 200b of this embodiment is different from the sixth embodiment in that openings 220 are provided in the seatback middle section 204. As shown in FIG. 40 and FIG. 41 that is a sectional view taken along line z-z of FIG. 40, the foam section 41, the impregnated section 51 and the osmosis membrane 21a are absent at the bottoms of the openings 220, and the three-dimensional network structure section 11 is exposed. The opening 220 can be formed in a manner analogous to that for the concave 116 of the cushion structure 100a of the first embodiment.

In this embodiment, the opening 220 can further improve the breathability of the cushion structure 200b applied to the seatback.

Seventh Embodiment

Figure 42:
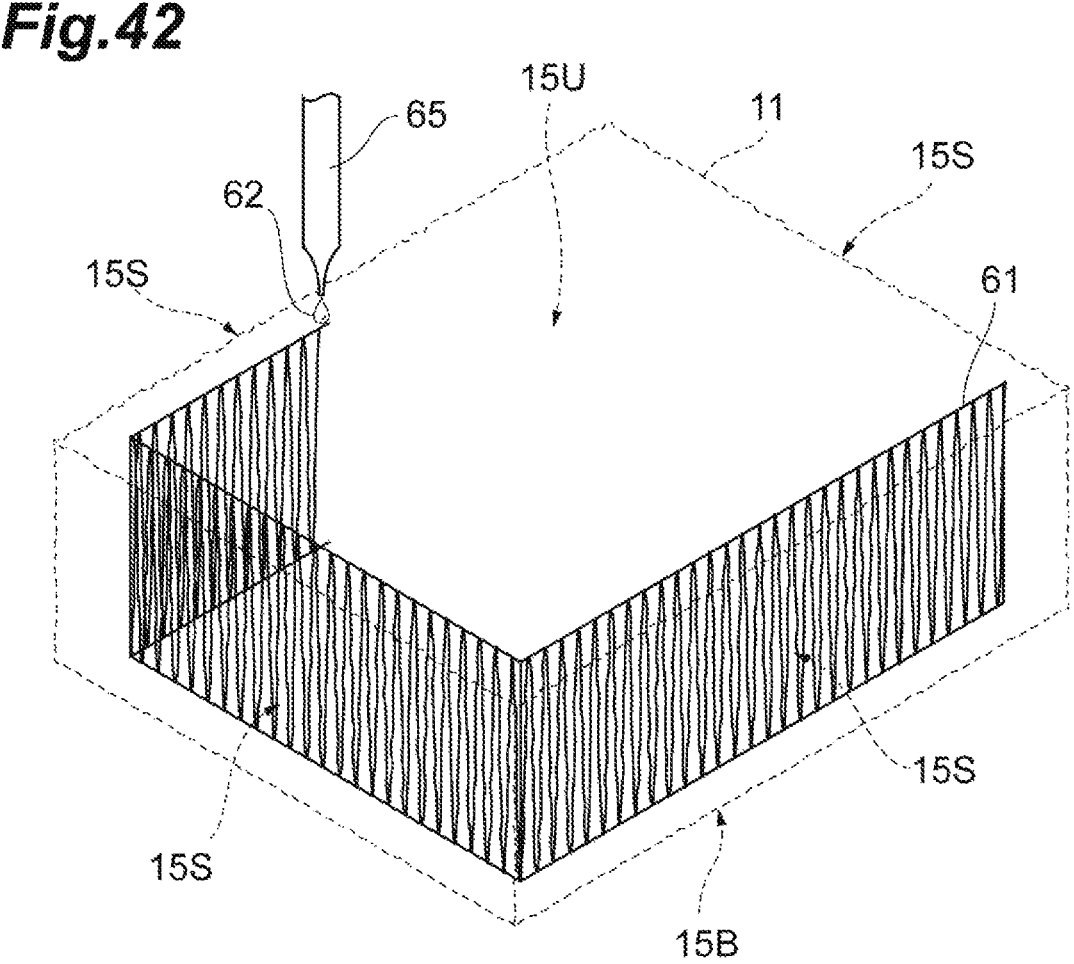
FIG. 42 is a perspective view showing a step of forming an impregnation prevention membrane in the three-dimensional network structure section by trickling down a gel material for prevention membrane from a nozzle into the three-dimensional network structure section in a seventh embodiment.

A seventh embodiment of the present invention is hereinafter described. In the first to sixth embodiments, the amount of impregnation that is the thickness of the impregnated section 51 is configured by setting the amounts of the foam materials 40 permeating the respective osmosis membranes 21a to 21g. As shown in FIG. 42, in this embodiment, the amount of impregnation is set by forming an impregnation prevention membrane 61 through which the foam material 40 cannot permeate into the three-dimensional network structure section 11. At the end of a desired impregnated section 51 in the three-dimensional network structure section 11, gel material 62 for prevention membrane that has been adjusted to have a freely selected viscosity trickles down from a nozzle 65. The gel material 62 for prevention membrane may be any of thermoreversible elastomer, volatile gel, and photocurable resin. At the position corresponding to the amount of impregnation that is the requisite minimum for connecting the foam section 41 to the three-dimensional network structure section 11, the impregnation prevention membrane 61 to which the foam material 40 is impermeable is formed, thereby exerting advantageous effects analogous to those in the cases of disposing the osmosis membranes 21a to 21g of the first embodiment.

Figure 43:
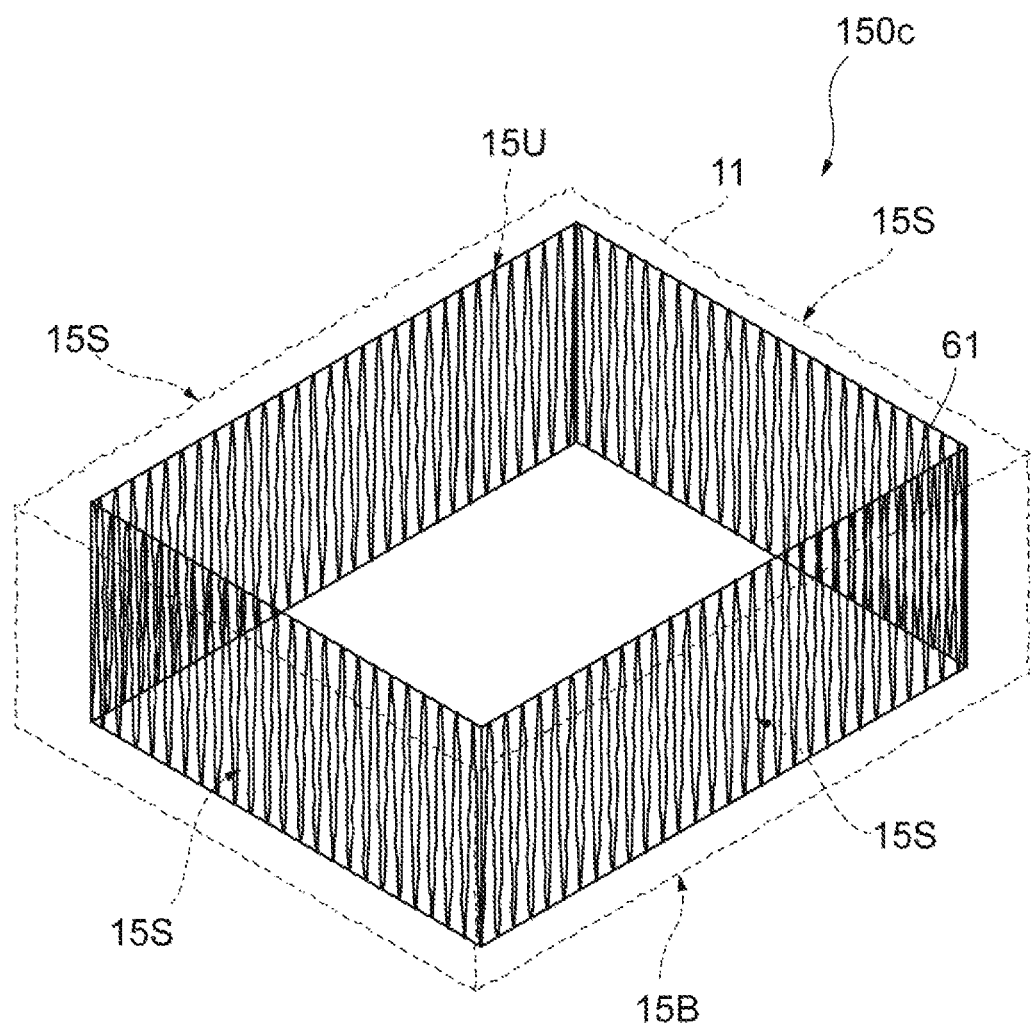
FIG. 43 is a perspective view showing a cushion structure component of the seventh embodiment where an impregnation prevention membrane is formed in the three-dimensional network structure section in the step in FIG. 42.

As shown in FIG. 43, by means of each side surface 15S of the three-dimensional network structure section 11, a cushion structure component 150c where the impregnation prevention membrane 61 is formed at the position corresponding to the amount of requisite minimum impregnation is manufactured. The cushion structure component 150c allows the cushion structure 100c to be manufactured through use in a manner analogous to that of the cushion structure component 150b of the third embodiment.

Eighth Embodiment

Figure 44:
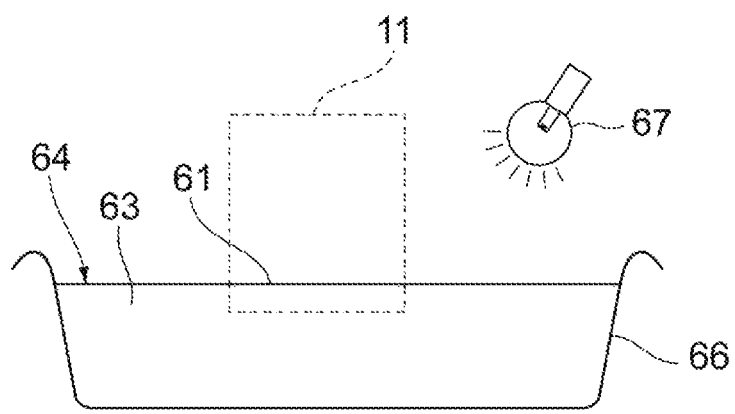
FIG. 44 is a perspective view showing a step of forming an impregnation prevention membrane in the three-dimensional network structure section by immerging the three-dimensional network structure section with photo-curable solution and by irradiating the solution surface with light in an eighth embodiment.

An eighth embodiment of the present invention is hereinafter described. In this embodiment, as shown in FIG. 44, the three-dimensional network structure section 11 is immerged in photo-curable solution 63 in a solution bath 66 to the depth of a desired amount of impregnation. In a state where the three-dimensional network structure section 11 is immerged in the photo-curable solution 63, the solution surface 64 is irradiated with light from a light source 67, thereby curing only the solution surface 64. Consequently, in the three-dimensional network structure section 11, the impregnation prevention membrane 61 can be formed. Alternatively, the three-dimensional network structure section 11 is immerged to the desired depth of the amount of impregnation in calcium lactate aqueous solution instead of the photo-curable solution 63, and the surface of the calcium lactate aqueous solution is sprayed with sodium alginate aqueous solution or the like, thereby also allowing the impregnation prevention membrane 61 to be formed in the three-dimensional network structure section 11.

Figure 45:
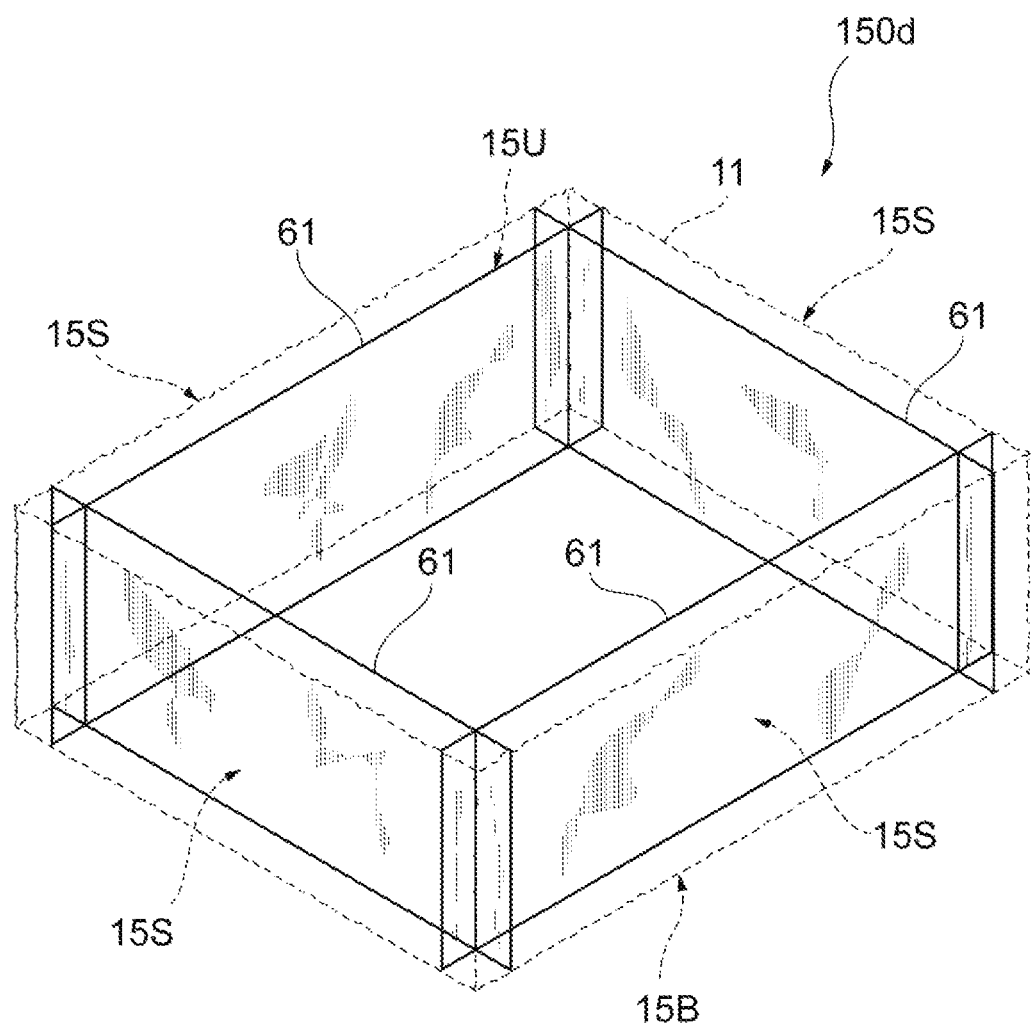
FIG. 45 is a perspective view showing a cushion structure component of the eighth embodiment where an impregnation prevention membrane is formed in the three-dimensional network structure section in the step in FIG. 44.

As shown in FIG. 45, by means of each side surface 15S of the three-dimensional network structure section 11, a cushion structure component 150d is manufactured where the impregnation prevention membrane 61 is formed at the position corresponding to the amount of requisite minimum impregnation. The cushion structure component 150d allows the cushion structure 100c to be manufactured through use in a manner analogous to that of the cushion structure component 150b of the third embodiment.

Ninth Embodiment

A ninth embodiment of the present invention is hereinafter described. The hardness of the impregnated section 51 is higher than addition of the hardness of the three-dimensional network structure section 11 and the hardness of the foam section 41 because the parts of network resin of the three-dimensional network structure section 11 are cross-linked to each other by the foam section 41. To reduce the difference between the hardness of the impregnated section 51 and the hardness of the three-dimensional network structure section 11 and the foam section 41, a low hardness section 16 having lower hardness than the entire hardness of the three-dimensional network structure section 11 can be formed, at the site where the impregnated section 51 of the three-dimensional network structure section 11 is formed, as shown in FIG. 46.

The low hardness section 16 can be formed by changing the nozzle to be used for molding at the part of the low hardness section 16 and reducing the diameter of the resin wire ejected from the nozzle while the three-dimensional network structure section 11 is manufactured. In the case where the three-dimensional network structure section 11 is manufactured as a whole by ejecting hollow resin wires from nozzles used for molding, the nozzles used for molding are changed at the part of the low hardness section 16, and resin wires that are not hollow and have smaller diameters than those for parts other than the low hardness section 16 are ejected, which can form the low hardness section 16.

The material for the three-dimensional network structure section 11 is the same for the low hardness section 16 and for parts other than the low hardness section 16. Consequently, the connection force between the three-dimensional network structure section 11 and the foam section 41 is not reduced. By making the low hardness section 16 as the impregnated section 51, the difference between the hardness of the impregnated section 51 and the hardness of the three-dimensional network structure section 11 and the foam section 41 can be reduced.

Figure 46:
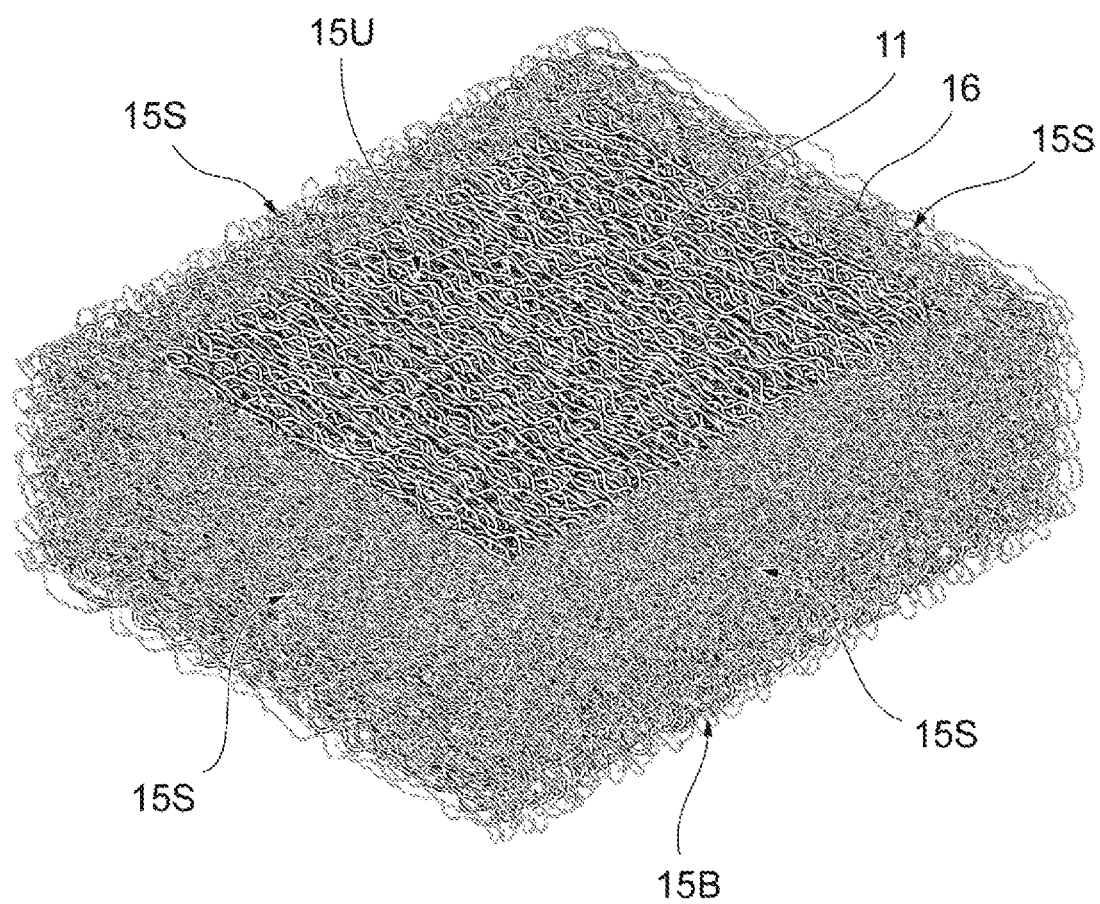
FIG. 46 is a perspective view showing a three-dimensional network structure section where a low hardness section is formed in a ninth embodiment.
Figure 47:
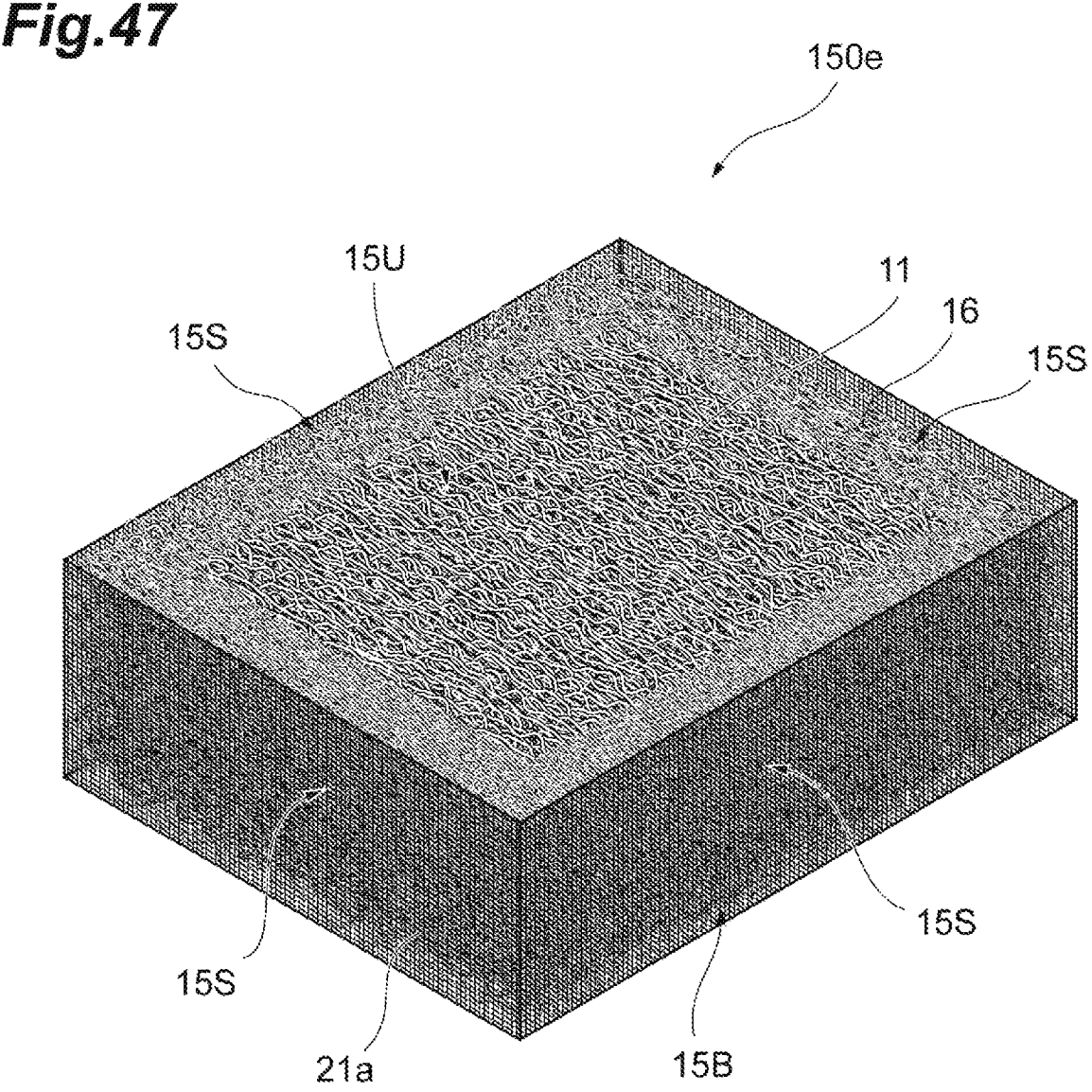
FIG. 47 is a perspective view showing the cushion structure component of the ninth embodiment where osmosis membranes are provided on the side surfaces of the three-dimensional network structure section of FIG. 46.
Figure 48:
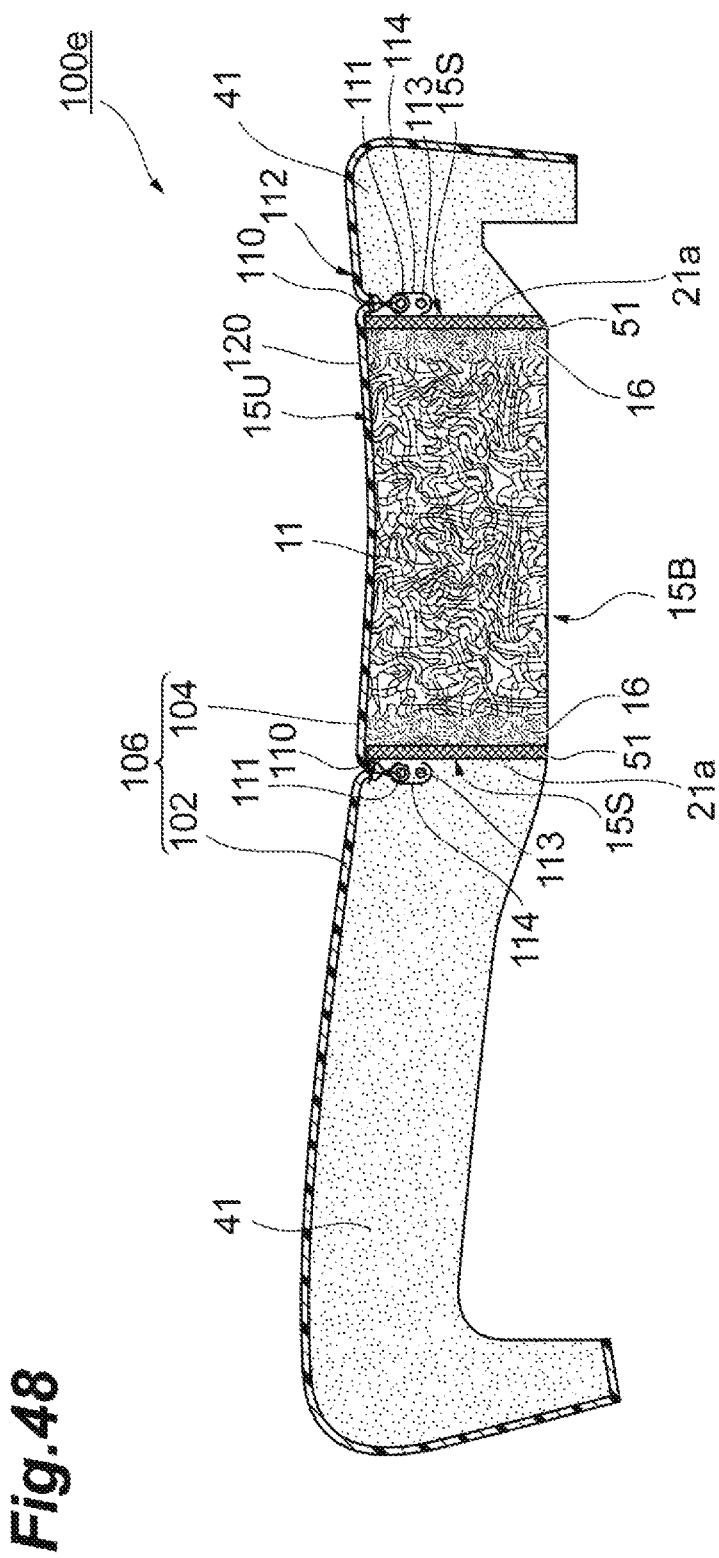
FIG. 48 is a diagram corresponding to a sectional view taken along line x-x of FIG. 30 of the cushion structure manufactured using the cushion structure component in FIG. 47.
Figure 49:
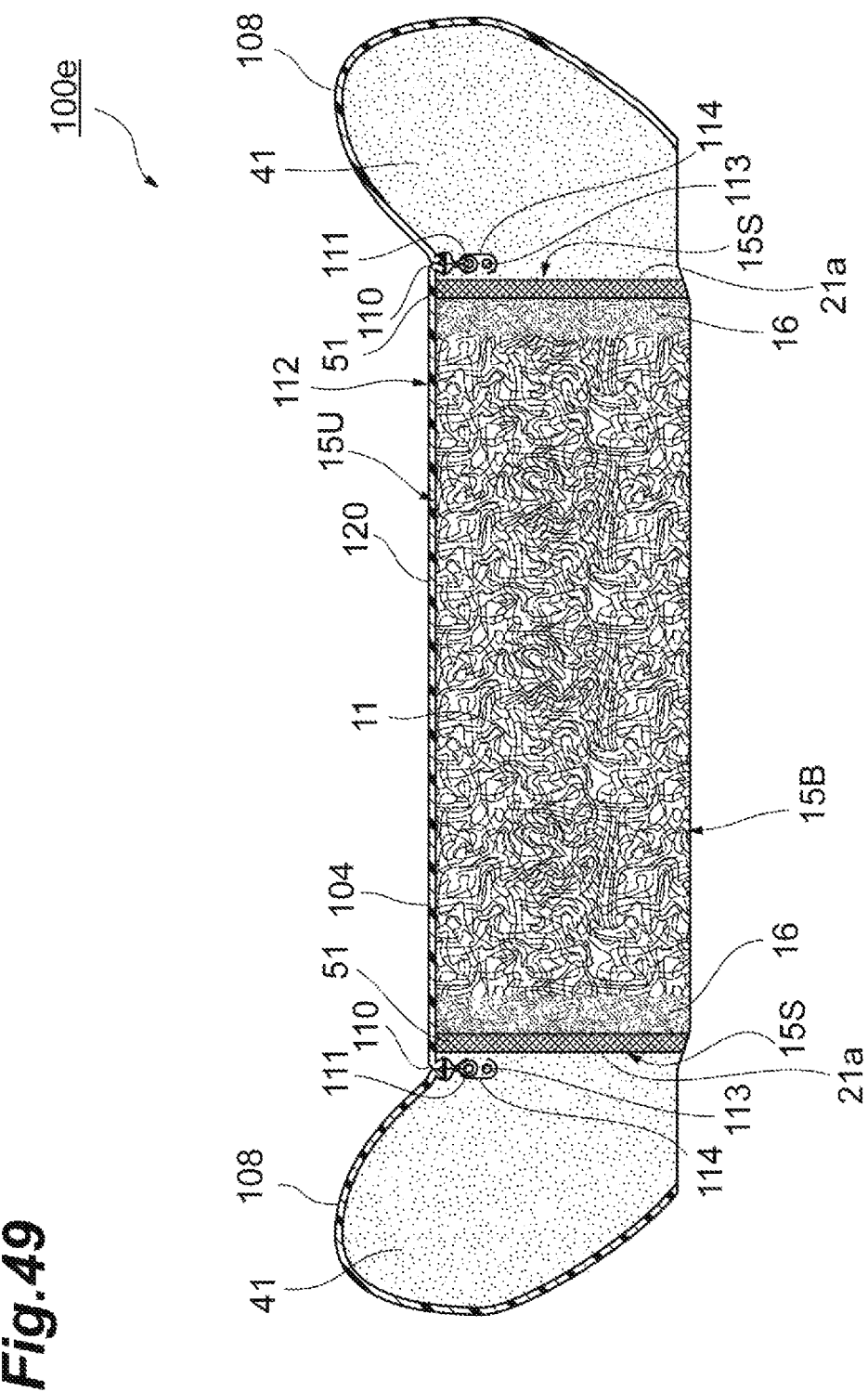
FIG. 49 is a diagram corresponding to a sectional view taken along line y-y of FIG. 30 of the cushion structure manufactured using the cushion structure component in FIG. 47.

As shown in FIG. 47, each side surface 15S of the three-dimensional network structure section 11 in FIG. 46 is covered with the osmosis membrane 21a, thereby manufacturing the cushion structure component 150e. In this embodiment, the osmosis membranes 21b to 21g described above are applicable instead of the osmosis membrane 21a. The cushion structure component 150e allows the cushion structure 100e as shown in FIGS. 48 and 49 to be manufactured through use in a manner analogous to that of the cushion structure component 150b of the third embodiment. In the cushion structure 100e, the impregnated section 51 is formed at the low hardness section 16. Consequently, the feeling of the passenger on a foreign matter due to increase in hardness because of impregnation of the impregnated section 51 with the foam material 40 can be reduced.

Tenth Embodiment

Figure 50:
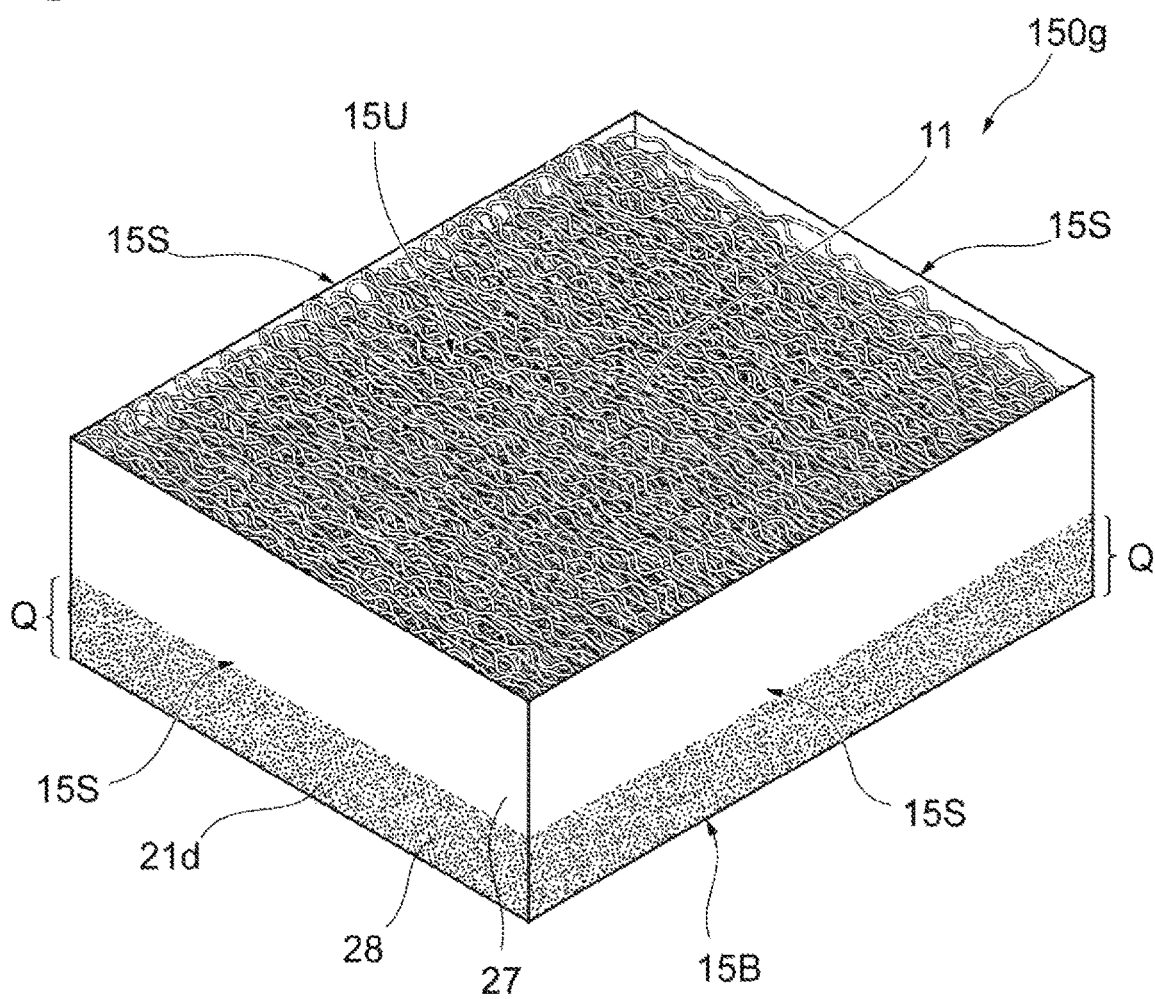
FIG. 50 is a perspective view showing a cushion structure component of a tenth embodiment.

A tenth embodiment of the present invention is hereinafter described. As shown in FIG. 50, in the cushion structure component 150g of this embodiment, each side surface 15S of the three-dimensional network structure section 11 in FIG. 4 is covered with the osmosis membrane 21d that is the resin film 27 having pores 28 through which the foam material 40 can permeate. The osmosis membrane 21d is provided with the pores 28 only in a pore region Q at a lower part of each side surface 15S. Consequently, the foam material 40 is permeable only at the lower part of each side surface 15S. The foam material 40 is impermeable at an upper part of each side surface 15S. The osmosis membrane 21d allows the foam material 40 to permeate only through a part of each side surface 15S. The size of the pore region Q may be appropriately configured in a freely selected range.

Figure 51:
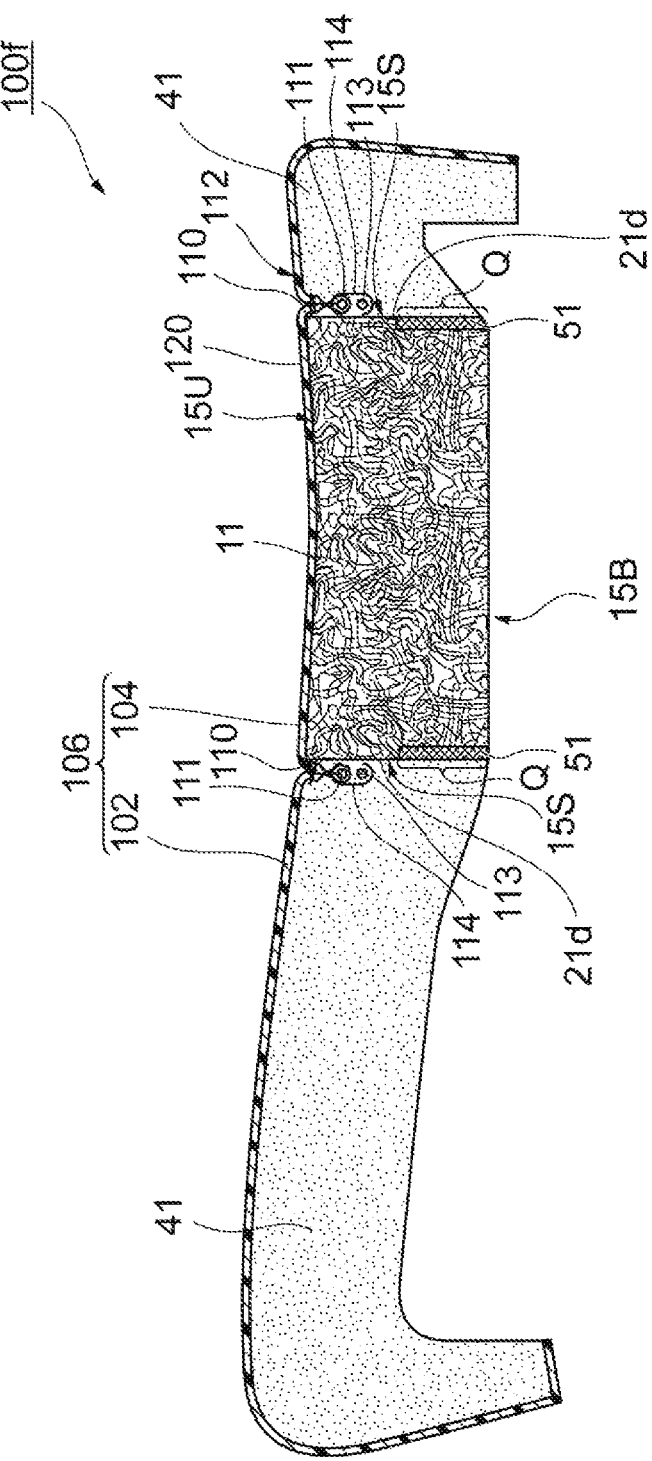
FIG. 51 is a diagram corresponding to a sectional view taken along line x-x of FIG. 30 of the cushion structure manufactured using the cushion structure component in FIG. 50.
Figure 52:
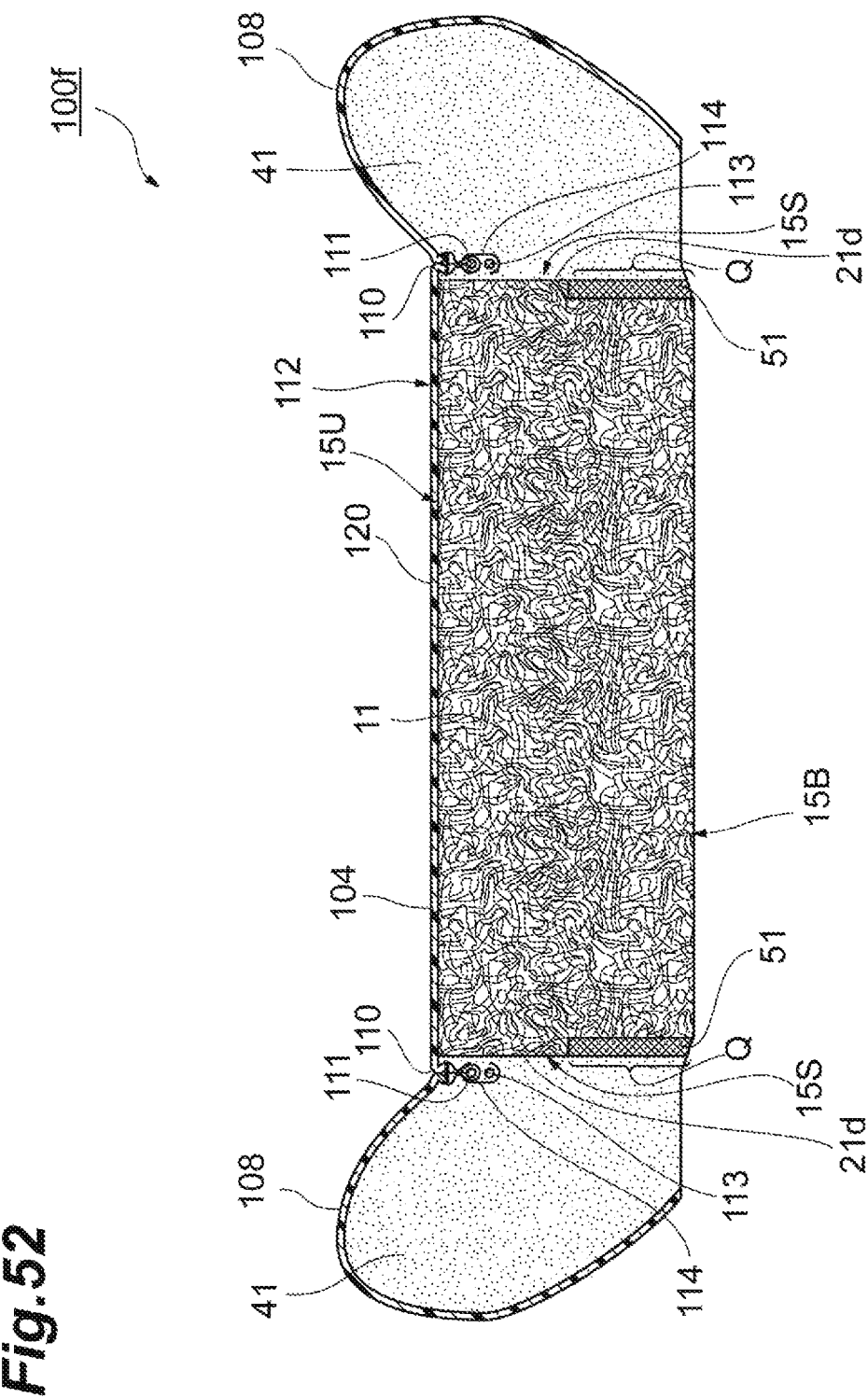
FIG. 52 is a diagram corresponding to a sectional view taken along line y-y of FIG. 30 of the cushion structure manufactured using the cushion structure component in FIG. 50.

The cushion structure component 150g allows the cushion structure 100f as shown in FIGS. 51 and 52 to be manufactured through use in a manner analogous to that of the cushion structure component 150b of the third embodiment. In the cushion structure 100f, the impregnated section 51 is formed only in the pore region Q at the lower part of the three-dimensional network structure section 11. In this embodiment, the impregnated section 51 is formed only at the lower part of the three-dimensional network structure section 11, and the impregnated section 51 is not formed at the upper part of the three-dimensional network structure section 11 nearer to the passenger C when the passenger C is seated. Consequently, impregnation of the foam material 40 can reduce the feeling of the passenger C on a foreign matter due to the impregnated section 51 having the increased hardness.

Eleventh Embodiment

Figure 53:
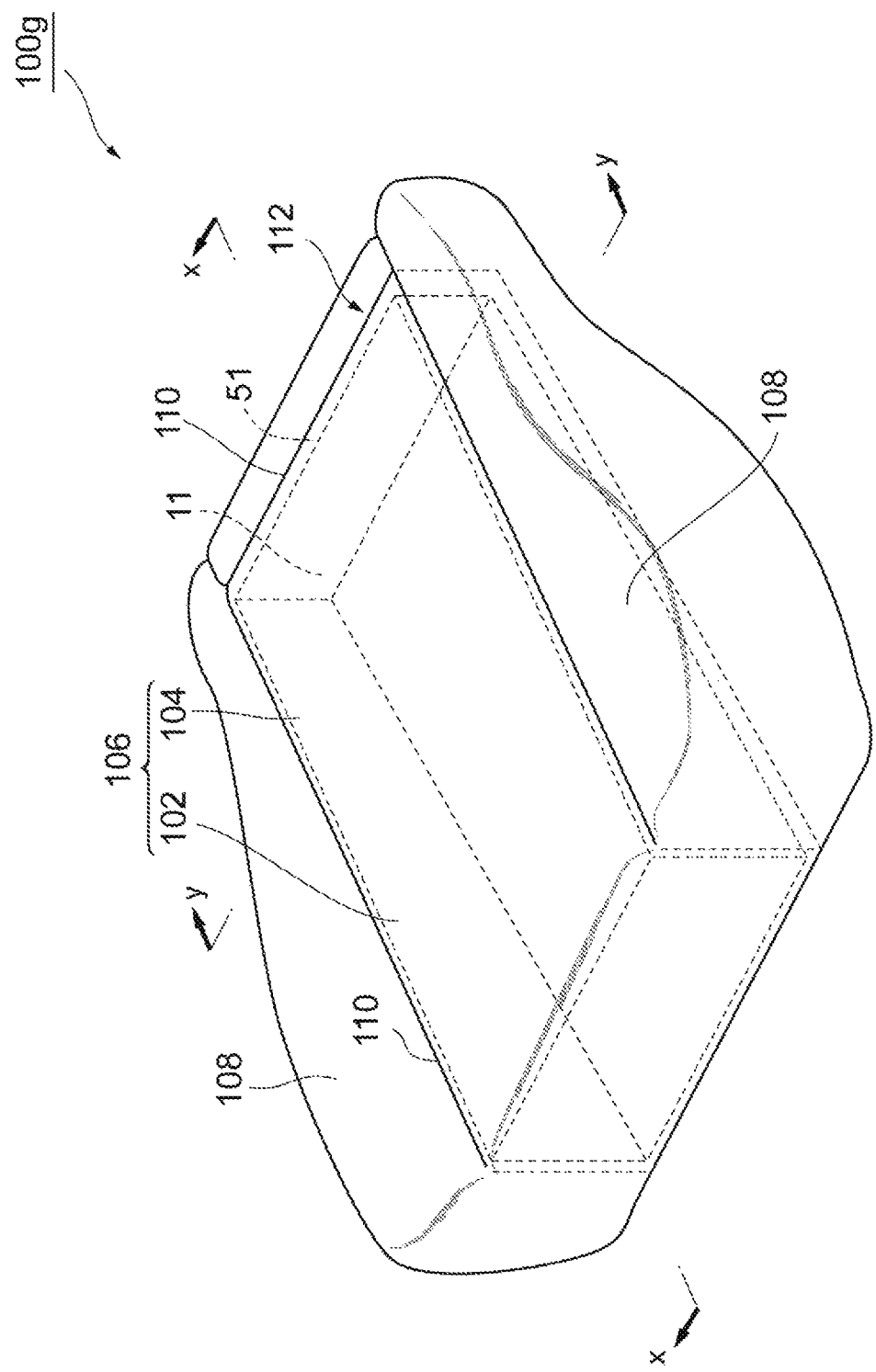
FIG. 53 is a perspective view showing a cushion structure of an eleventh embodiment.
Figure 54:
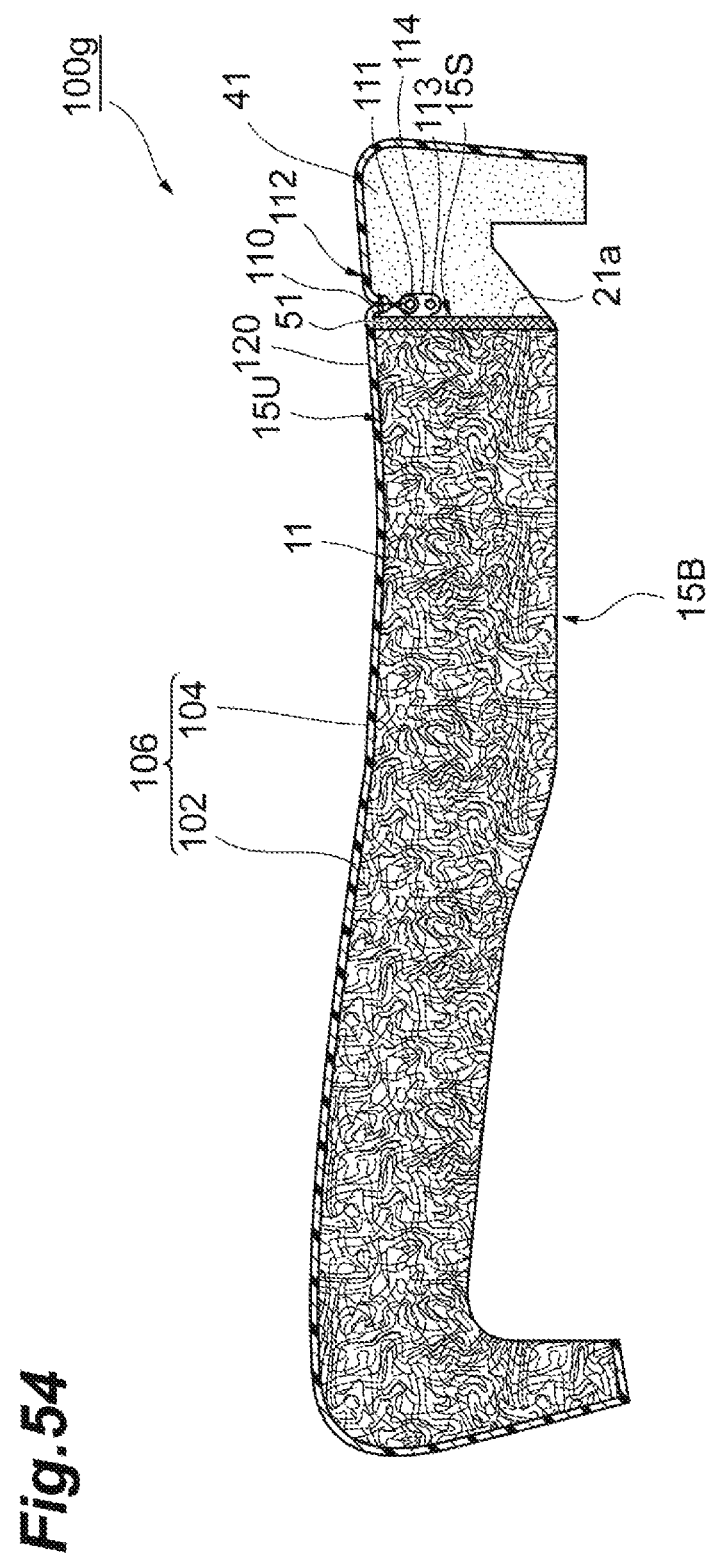
FIG. 54 is a sectional view taken along line x-x of FIG. 53.

An eleventh embodiment of the present invention is hereinafter described. As shown in FIG. 53 and FIG. 54 that is a sectional view taken along line x-x of FIG. 53, the cushion structure 100g of this embodiment includes the three-dimensional network structure section 11 over the entire cushion front section 102 in addition to the cushion rear section 104. The impregnated section 51 is formed at the boundary between the three-dimensional network structure section 11 in the cushion center section 106 and the cushion side section 108. As shown in FIG. 54, the impregnated section 51 is formed at the boundary between the three-dimensional network structure section 11 and the foam section 41 in the cushion rear section 104. A sectional view taken along line y-y of FIG. 53 is analogous to that of FIG. 32, described above. Consequently, illustration of the view is omitted. In manufacturing of the cushion structure 100g, the aforementioned osmosis membranes 21a to 21i and the cushion structure component where the impregnation prevention membrane 61 is formed are applicable to three side surfaces 15S of the three-dimensional network structure section 11 in FIG. 4.

In this embodiment, the entire cushion front section 102 with which the undersurfaces of thighs of the passenger C are in contact includes the three-dimensional network structure section 11 when the passenger C is seated. Consequently, at the undersurfaces of thighs of the passenger C, the breathability is significantly improved, which improves the refreshing effect on the passenger C.

Twelfth Embodiment

Figure 55:
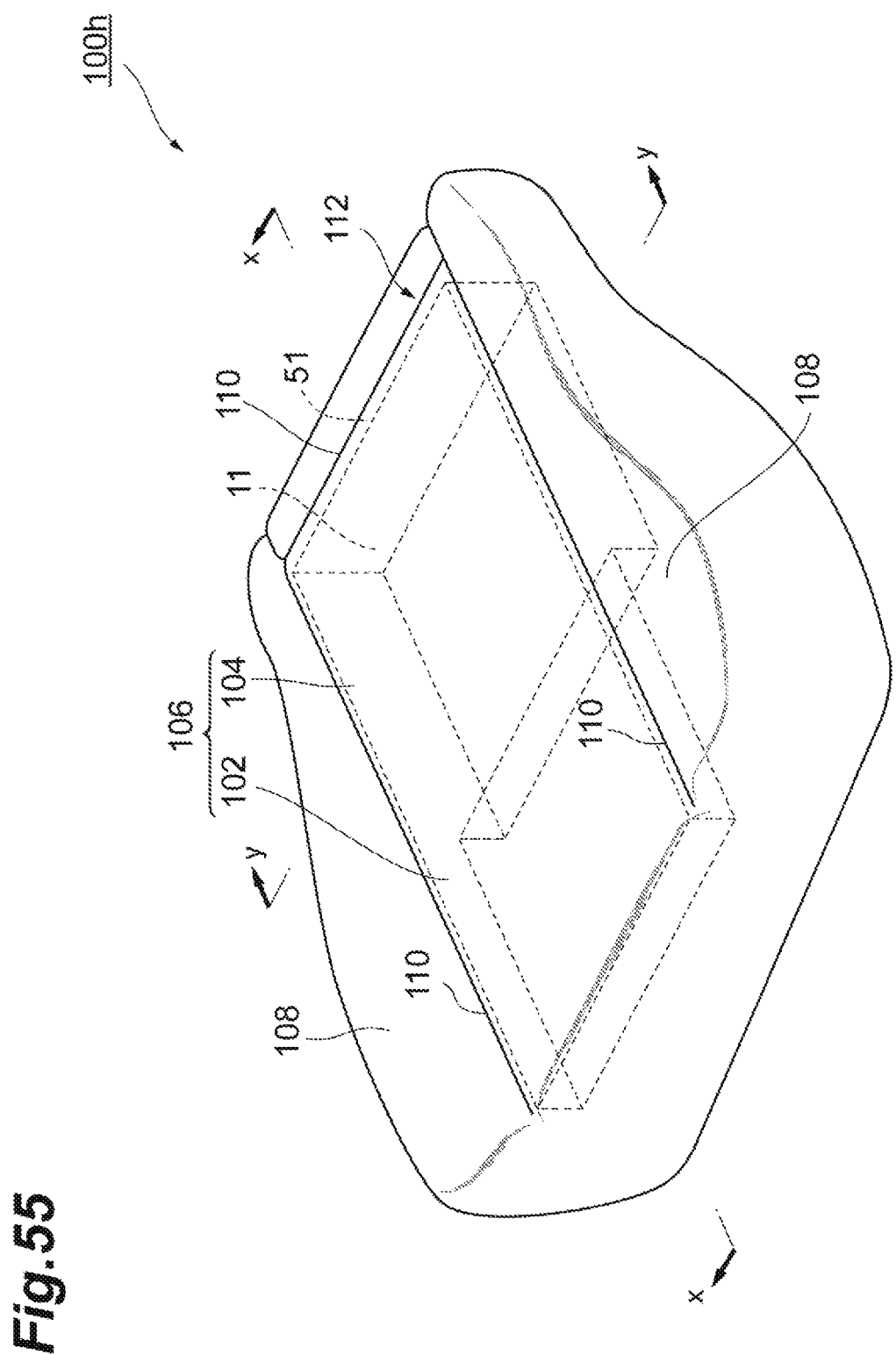
FIG. 55 is a perspective view showing a cushion structure of a twelfth embodiment.
Figure 56:
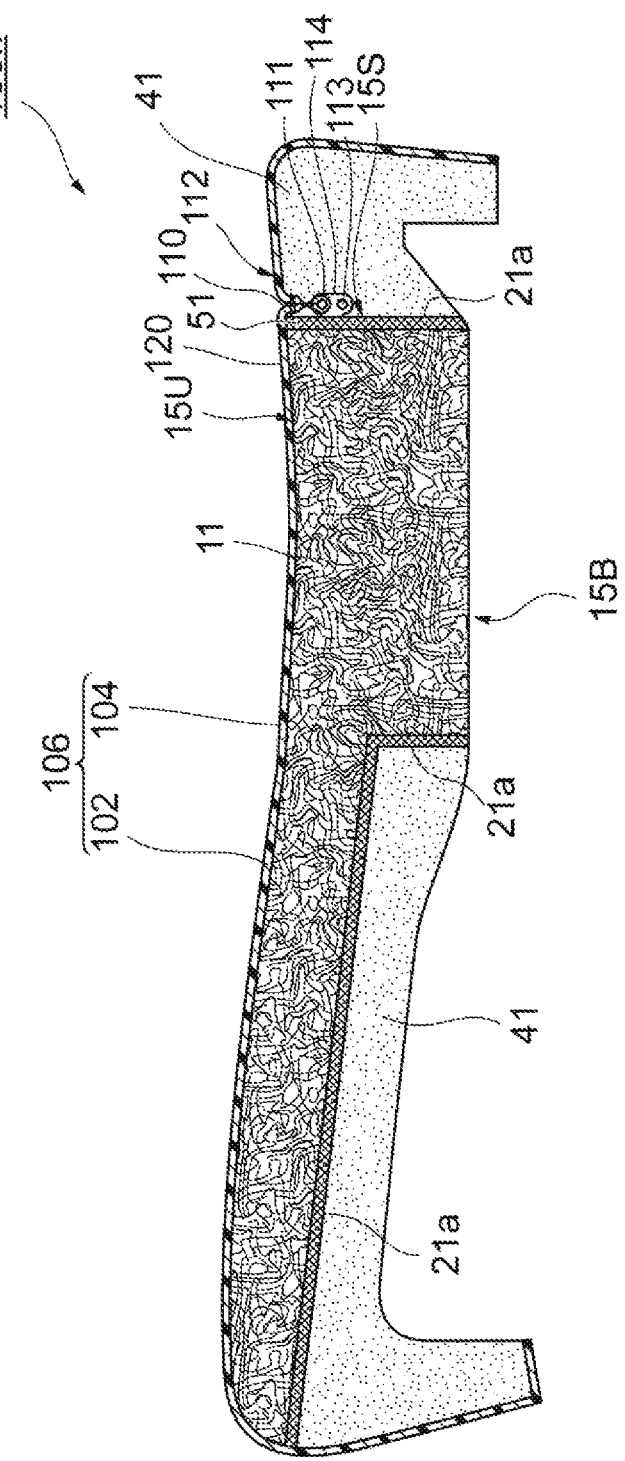
FIG. 56 is a sectional view taken along line x-x of FIG. 55.

A twelfth embodiment of the present invention is hereinafter described. As shown in FIG. 55 and FIG. 56 that is a sectional view taken along line x-x of FIG. 55, a cushion structure 100h of this embodiment includes the three-dimensional network structure section 11 at an upper part of the cushion front section 102 in addition to the cushion rear section 104. The lower part of the cushion front section 102 includes the foam section 41 as with the case of the third embodiment.

The impregnated section 51 is formed at the boundary between the three-dimensional network structure section 11 in the cushion center section 106 and the cushion side section 108. As shown in FIG. 56, the impregnated section 51 is formed at the boundary between the three-dimensional network structure section 11 and the foam section 41 in the cushion rear section 104. The impregnated section 51 is formed at the boundary between the three-dimensional network structure section 11 in the cushion rear section 104 and the foam section 41 in the lower part of the cushion front section 102. The impregnated section 51 is formed at the boundary between the three-dimensional network structure section 11 in the upper part of the cushion front section 102 and the foam section 41 in the lower part of the cushion front section 102. A sectional view taken along line y-y of FIG. 53 is analogous to that of FIG. 32, described above. Consequently, illustration of the view is omitted.

The aforementioned osmosis membranes 21a to 21i and cushion structure component where the impregnation prevention membrane 61 is formed are applicable to the upper part of the cushion front section 102 and the surface that is the boundary of the three-dimensional network structure section 11 formed to have the shape of the cushion rear section 104 with the foam section 41.

In this embodiment, the upper part of the cushion front section 102 with which the undersurfaces of thighs of the passenger C are in contact includes the three-dimensional network structure section 11 when the passenger C is seated. Consequently, at the undersurfaces of thighs of the passenger C, the breathability is improved, which improves the refreshing effect on the passenger C. The lower part of the cushion front section 102 includes the foam section 41. Consequently, the uncomfortableness of the passenger C during being seated is reduced.

Thirteenth Embodiment

Figure 57:
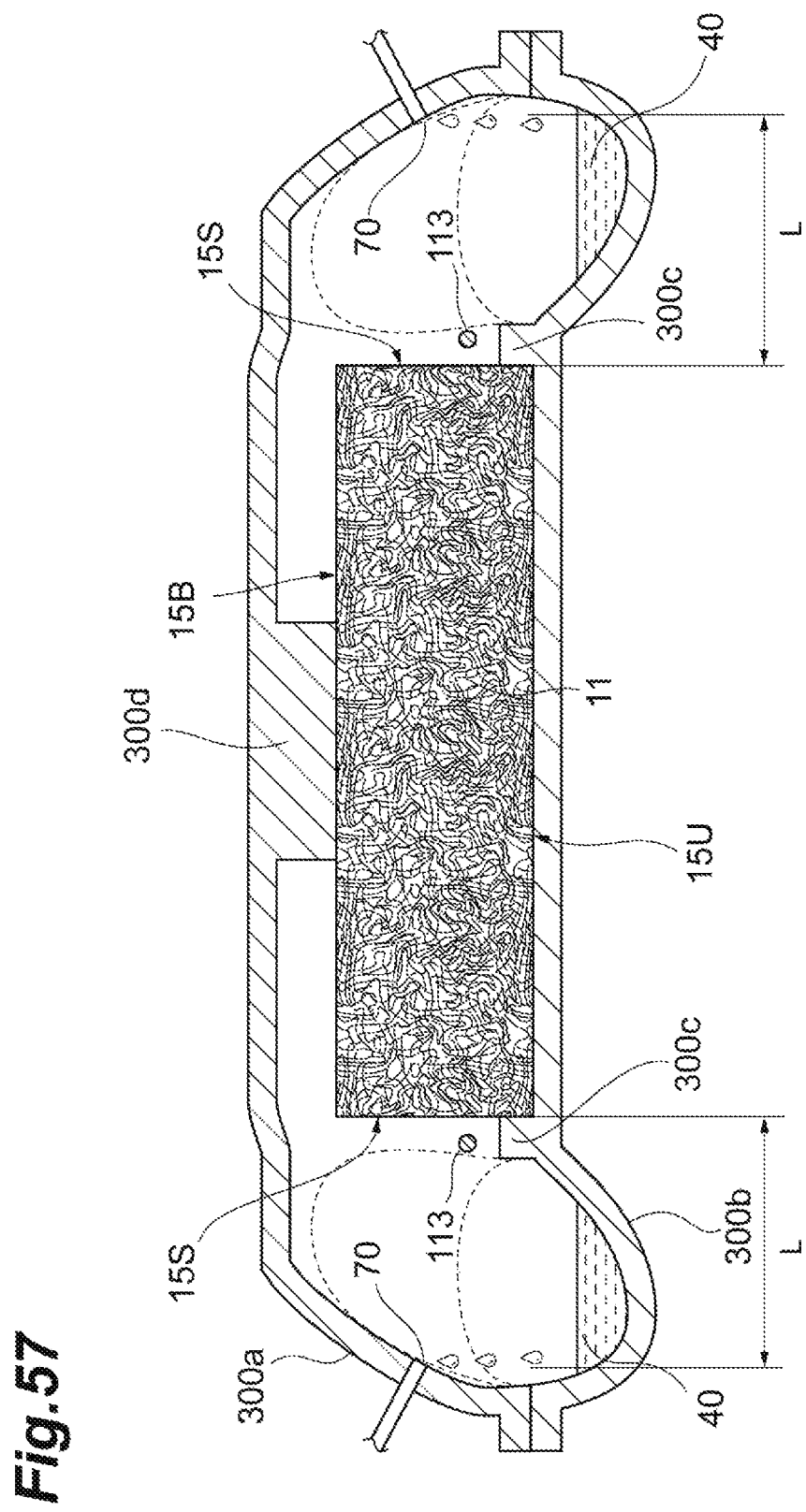
FIG. 57 is a sectional view showing a cushion structure manufacturing method of a thirteenth embodiment.

A thirteenth embodiment of the present invention is hereinafter described. As shown in FIG. 57, in this embodiment, without use of the osmosis membranes 21a to 21i in the first embodiment and the impregnation prevention membrane 61 in the second and third embodiments, the arrangement distance L between the three-dimensional network structure section 11 and the foam material 40 is changed to control the amount of impregnation. For example, the position where the foam material 40 is discharged from the nozzle 70 into the upper mold 300a and the lower mold 300b is configured to a position farthest from the three-dimensional network structure section 11 in the upper mold 300a and the lower mold 300b. Thus, as indicated by broken lines in FIG. 57, the surface viscosity of the foam material 40 in a process of foaming is increased before the material reaches the three-dimensional network structure section 11, thereby allowing the amount of impregnation to be controlled to be constant and to the minimum. The manufacturing method of this embodiment is also applicable to cases of using the osmosis membranes 21a to 21i in the first embodiment.

Fourteenth Embodiment

Figure 58:
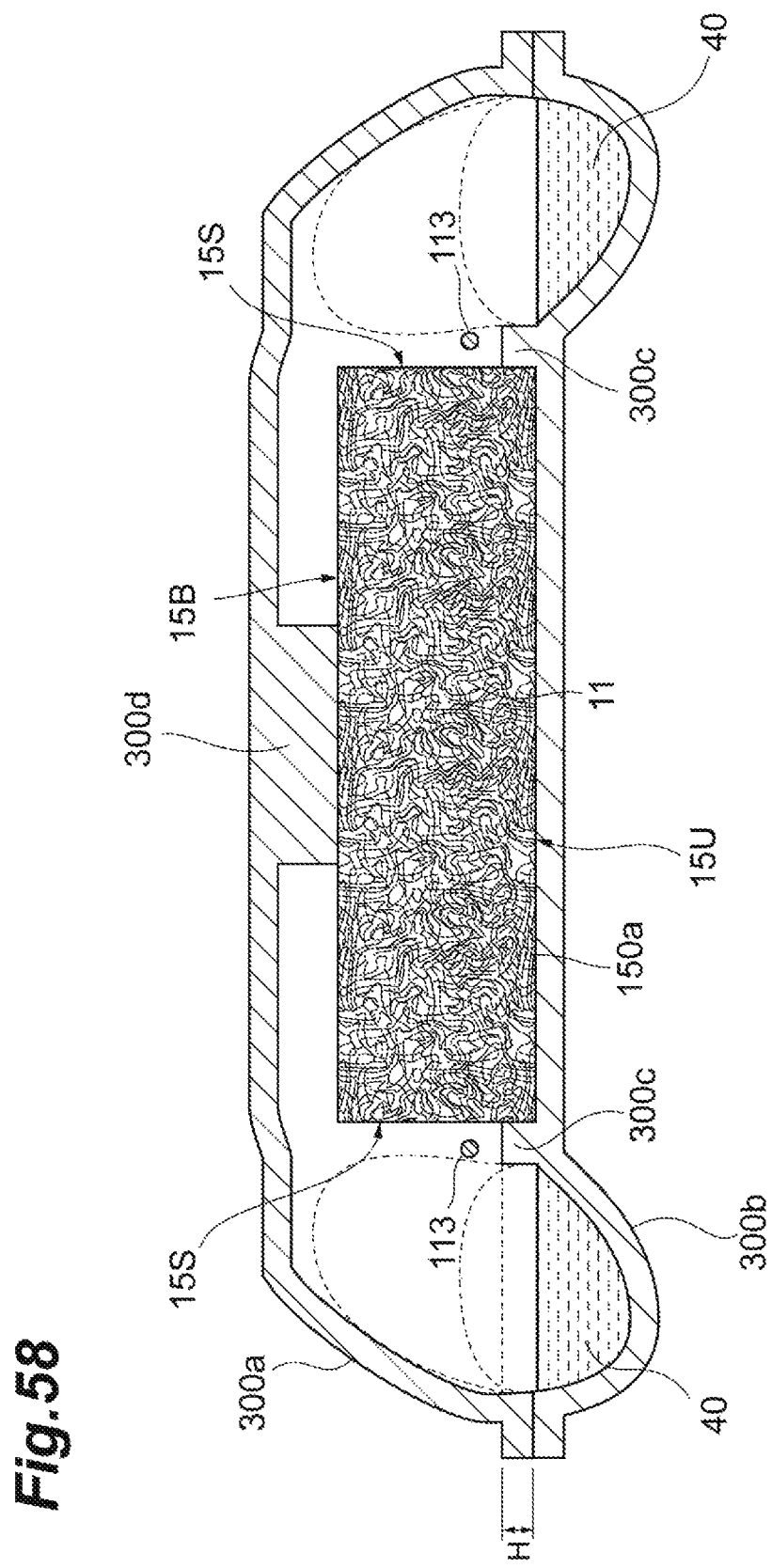
FIG. 58 is a sectional view showing a cushion structure manufacturing method of a fourteenth embodiment.

A fourteenth embodiment of the present invention is hereinafter described. As shown in FIG. 58, in this embodiment, without use of the osmosis membranes 21a to 21i in the first embodiment and the impregnation prevention membrane 61 in the second and third embodiments, the height H of the protrusion 300c provided between the three-dimensional network structure section 11 and the foam material 40 in the lower mold 300b is changed to control the amount of impregnation. The protrusion 300c is in contact with the lower end of the three-dimensional network structure section 11 in the lower mold 300b and supports this section. The height H from the lower end of the three-dimensional network structure section 11 to the upper end of the protrusion 300c is configured to range from 1 to 50 mm. The protrusion 300c prevents the foam material 40 having not foamed yet from flowing into the three-dimensional network structure section 11.

As indicated by broken lines in FIG. 58, the foam material 40 is prevented from foaming in the horizontal direction to progress foaming in the vertical direction before the three-dimensional network structure section 11 is impregnated, and after the space between the upper mold 300a and the lower mold 300b is filled, the three-dimensional network structure section 11 is impregnated with a residual amount of foam, thereby allowing the amount of impregnation to be controlled to be constant and to the minimum only through adjustment of the amount of charge of the foam material 40. The manufacturing method of this embodiment is also applicable to cases of using the osmosis membranes 21a to 21i in the first embodiment.

Fifteenth Embodiment

Figure 59:
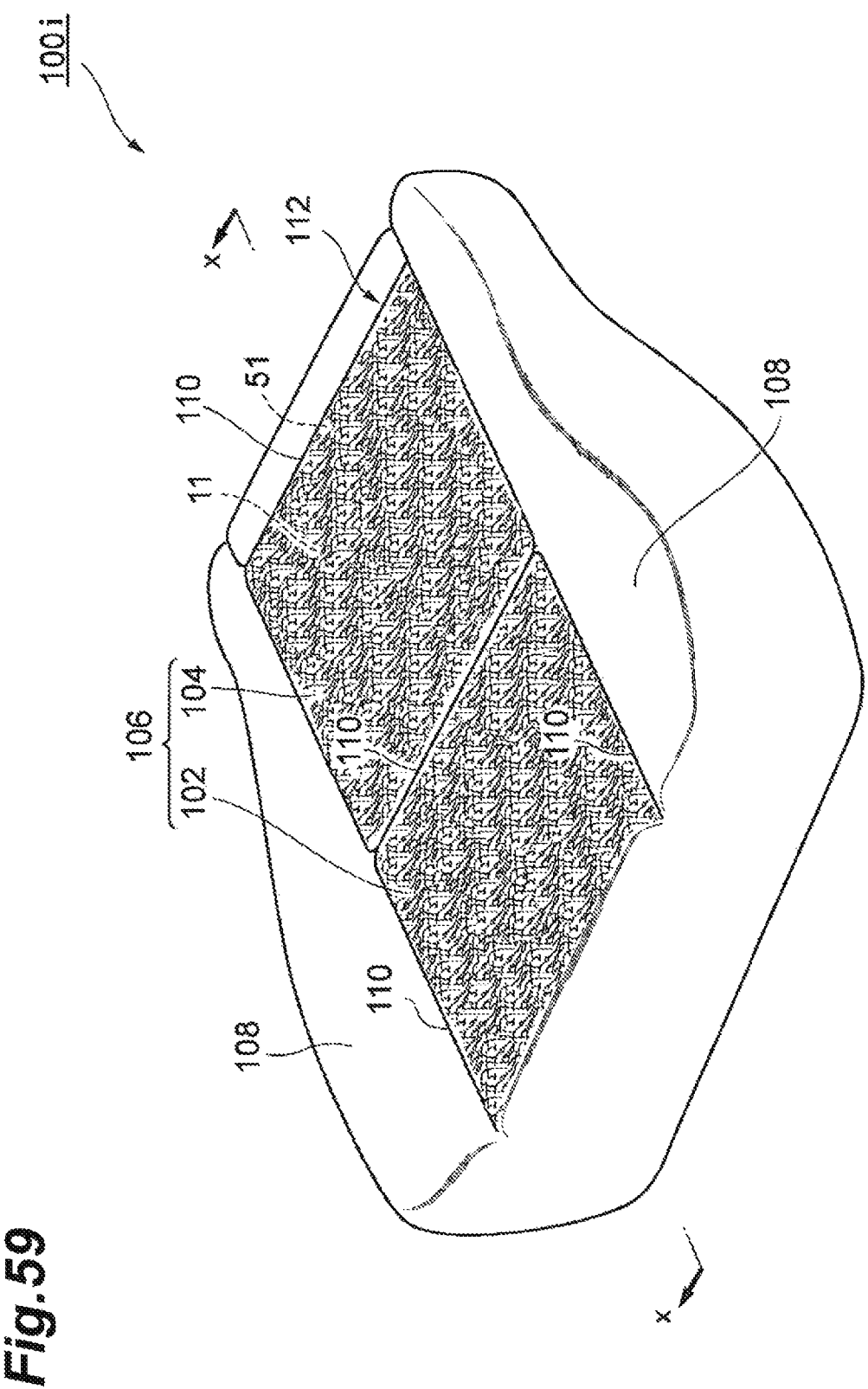
FIG. 59 is a perspective view showing a cushion structure used for a seat of an automobile of a fifteenth embodiment.
Figure 60:
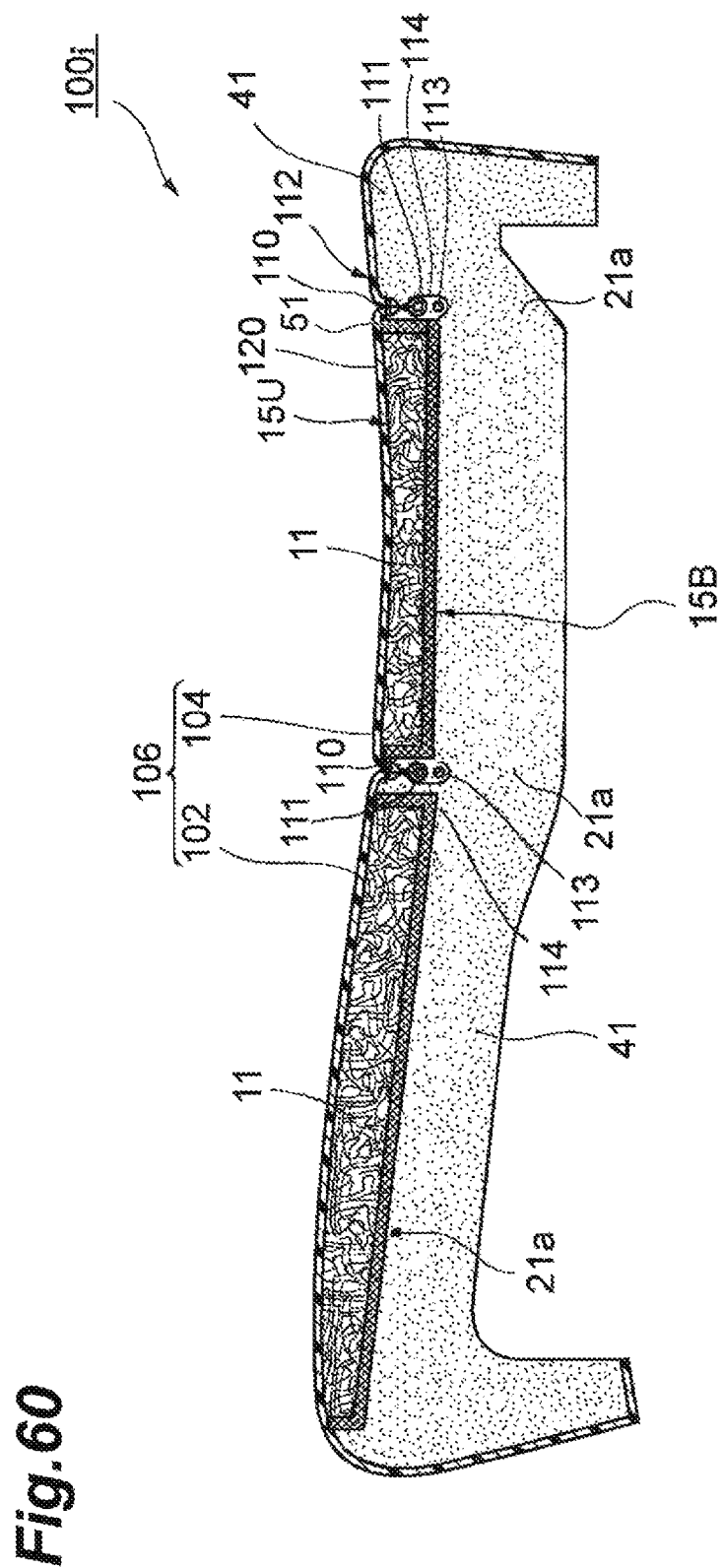
FIG. 60 is a sectional view taken along line x-x of FIG. 59.
Figure 61:
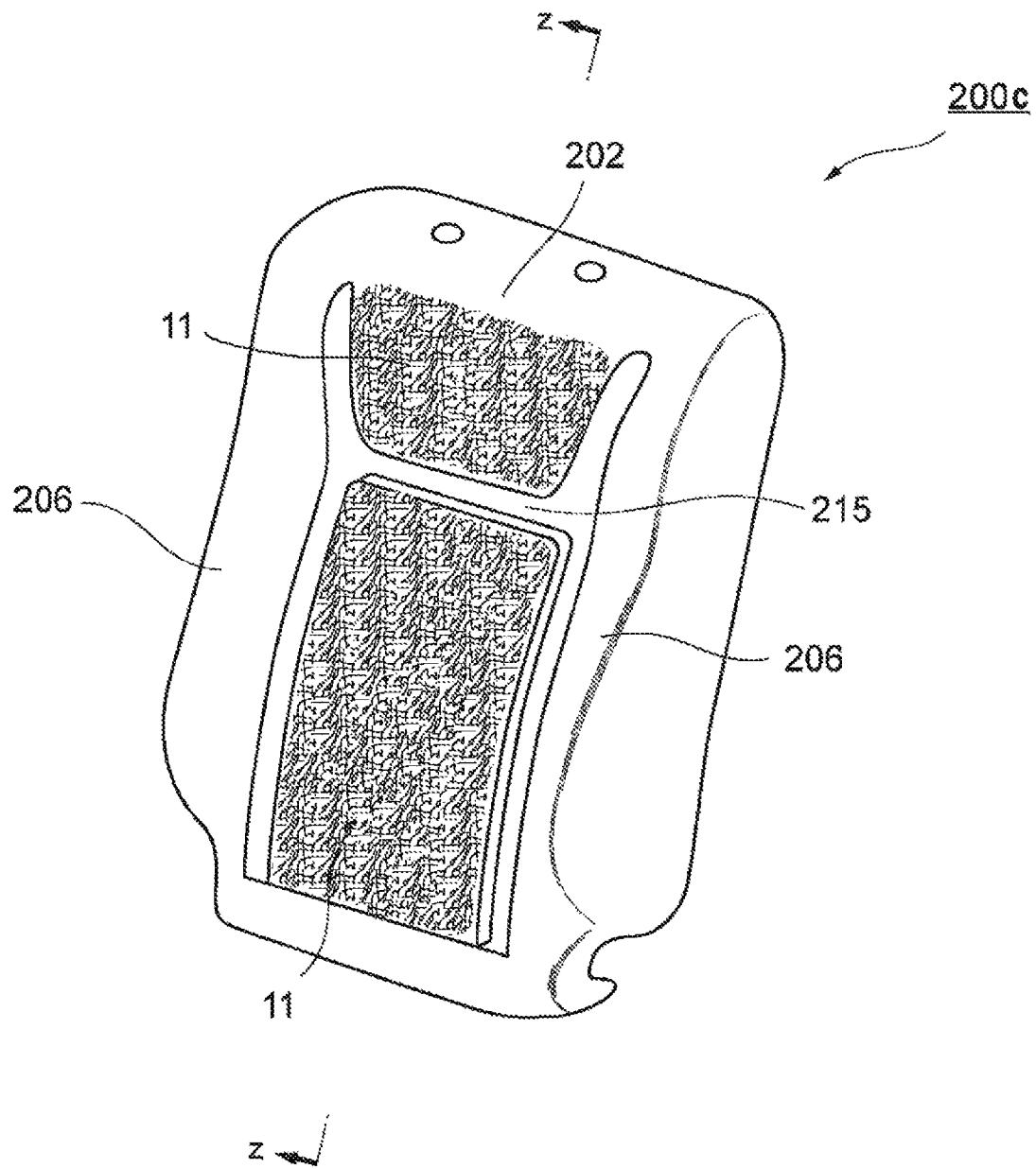
FIG. 61 is a perspective view showing a cushion structure used for a seatback of the automobile of a fifteenth embodiment.
Figure 62:
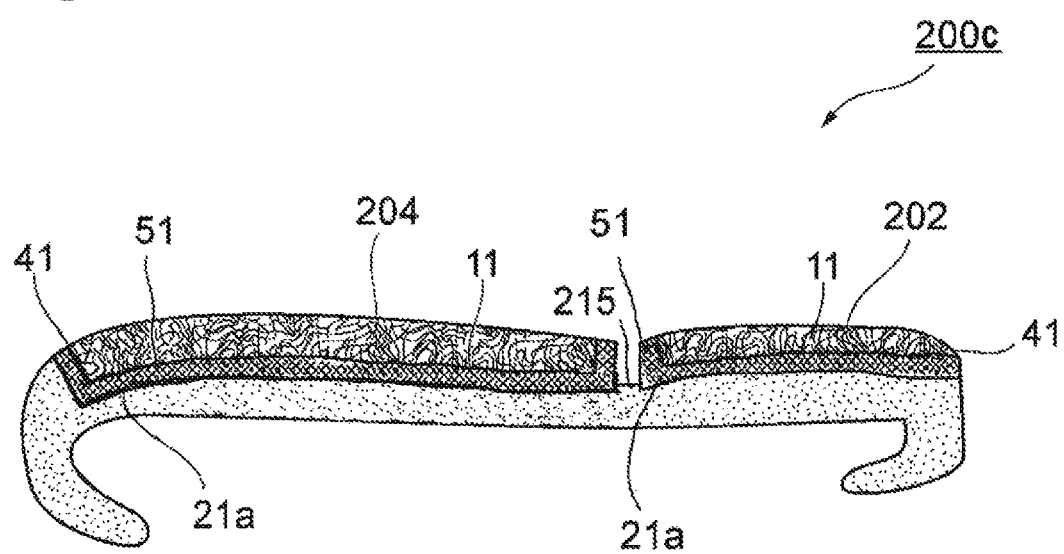
FIG. 62 is a sectional view taken along line z-z of FIG. 61.

A fifteenth embodiment of the present invention is hereinafter described. As shown in FIG. 59, FIG. 60 that is a sectional view taken along line x-x of FIG. 59, FIG. 61, and FIG. 62 that is a sectional view taken along line z-z of FIG. 61, a cushion structure 100i adopted in a seat of an automobile and a cushion structure 200c adopted in a seatback of an automobile according to this embodiment include the three-dimensional network structure section 11 over the entire area of being in contact with a human body. FIGS. 59, 61 and 62 show a state where a part of or the entire surface has not been covered with the surface leather 112 yet. The three-dimensional network structure section 11 arranged in the fifteenth embodiment has a small thickness of 50 mm or less, which allows this section to be curved along the design surface of the cushion and negates the need of a special forming process. As shown in FIGS. 60 and 62, the impregnated section 51 is formed at the boundary between the three-dimensional network structure section 11 and the foam section 41. In manufacturing of the cushion structure 100i and the cushion structure 200c, the aforementioned osmosis membranes 21a to 21i and the cushion structure component where the impregnation prevention membrane 61 is formed are applicable to three side surfaces 15S of the three-dimensional network structure section 11 in FIG. 4.

In this embodiment, the mode in FIG. 60 includes the three-dimensional network structure section 11 over the entire areas of the cushion front section 102 with which the undersurfaces of the buttocks and thighs of the passenger C are in contact when the passenger C is seated and the cushion rear section 104. The mode in FIG. 62 includes the entire three-dimensional network structure section 11 in the seatback upper section 202 with which back of the passenger C is in contact when the passenger C is seated and the seatback middle section 204. Consequently, the breathability of the undersurfaces of the buttocks and thighs and the entire back of the passenger C is improved, which in turn improves the refreshing effect on the passenger C. Although the method of applying a breathable material to the surface of a cushion has been conventionally known, this structure can reduce the processing cost due to adhesion and the like, and improve the productivity and connection strength.

The cushion structure, the cushion structure component, and the cushion structure manufacturing method according to the embodiments of the present invention are not limited to the embodiments described above. It is a matter of course that various changes may be applied in a range without departing from the gist of the embodiments of the present invention. For example, in the embodiments, the description has been made mainly on the cushion structures used for the seats or seatbacks of automobiles. Alternatively, the cushion structure, the cushion structure component, and the cushion structure manufacturing method according to the embodiments are applicable to other articles that use elasticity, such as a chair, a bed, and a pillow.

INDUSTRIAL APPLICABILITY

The cushion structure, the cushion structure component, and the cushion structure manufacturing method according to the embodiments of the present invention can provide the cushion structure having the improved connection strength between the three-dimensional network structure section and the foam section.

REFERENCE SIGNS LIST

10 . . . cushion structure, 11 . . . three-dimensional network structure section, 12 . . . resin wire, 13 . . . adhesion point, 15U . . . upper surface, 15S . . . side surface, 15B . . . undersurface, 16 . . . low hardness section, 17 . . . opening, 21a-21i . . . osmosis membrane, 22 . . . fibers, 23 . . . resin cover, 24 . . . cavity, 25 . . . nonwoven fabric, 26 . . . monofilament fibers, 27 . . . resin film, 28 . . . pore, 29a-29c . . . slit, 29p . . . top, 40 . . . foam material, 41 . . . foam section, 51 . . . impregnated section, 61 . . . impregnation prevention membrane, 62 . . . gel material for prevention membrane, 63 . . . photo-curable solution, 64 . . . solution surface, 65 . . . nozzle, 66 . . . solution bath, 67 . . . light source, 70 . . . nozzle, 100a-100i . . . cushion structure, 102 . . . cushion front section, 104 . . . cushion rear section, 106 . . . cushion center section, 108 . . . cushion side section, 110 . . . wire introducer, 111,113 . . . wire, 112 . . . surface leather, 114 . . . C-ring, 115,116 . . . concave, 120 . . . membraneless foam, 121 . . . cell wall, 122 . . . cell membrane removal section, 130 . . . foam, 131 . . . ventilation pores, 140 . . . air blowing section, 150a-150e . . . cushion structure component, 160 . . . bonded body, 200a-200c . . . cushion structure, 202 . . . seatback upper section, 204 . . . seatback middle section, 206 . . . seatback side section, 215 . . . concave, 220 . . . opening, 300a, 300A . . . upper mold, 300b . . . lower mold, 300c . . . protrusion, 300d . . . protrusion, D . . . direction, C . . . passenger, P . . . load, t . . . thickness, B . . . battery, Q . . . pore region, L . . . distance, and H . . . height.

The invention claimed is:

1. A cushion structure, comprising:
a three-dimensional network structure section formed by causing resin wires having elasticity to adhere to each other at adhesion points, the wires being curved and entangled with each other;
a foam section that is disposed to surround side surfaces of the three-dimensional network structure section, and is formed by foaming and solidifying a liquid foam material; and
an osmosis membrane disposed at a boundary between the three-dimensional network structure section and the foam section,
wherein the osmosis membrane allows the liquid foam material to permeate, and the three-dimensional network structure section is impregnated with the liquid foam material through the osmosis membrane, and subsequently the foam material is solidified to connect the three-dimensional network structure section and the foam section to each other.

2. The cushion structure according to claim 1,
wherein the osmosis membrane is cloth formed of fibers, and
wherein the fibers forming the cloth are covered with resin not to expose surfaces of the fibers.

3. The cushion structure according to claim 1, wherein the osmosis membrane is nonwoven fabric formed of monofilament fibers.

4. The cushion structure according to claim 1, wherein the osmosis membrane is a resin film having any of pores or slits.

5. The cushion structure according to claim 1,
wherein the osmosis membrane is a resin film having a plurality of slits bent at respective tops, and
wherein a pair of the slits among the plurality of the slits are bent in directions opposite to each other, and are disposed to cause the tops to face each other.

6. The cushion structure according to claim 1,
wherein the osmosis membrane is a resin film having a plurality of slits bent at respective tops, and
wherein a pair of the slits among the plurality of the slits are bent in an identical direction, and are disposed to cause the tops to be oriented in an identical direction.

7. The cushion structure according to claim 1, wherein an upper surface of the three-dimensional network structure section is covered with a membraneless foam from which membranes of bubbles of foam are removed.

8. The cushion structure according to claim 1, wherein an upper surface of the three-dimensional network structure section is covered with foam where ventilation pores allowing air to flow therethrough are formed.

9. The cushion structure according to claim 1, further comprising a blowing section that can blow air in any of directions from a lower part to an upper part and from the upper part to the lower part of the three-dimensional network structure section, below the three-dimensional network structure section.

10. A cushion structure, comprising:
a three-dimensional network structure section formed by causing resin wires having elasticity to adhere to each other at adhesion points, the wires being curved and entangled with each other; and
a foam section that is disposed to surround side surfaces of the three-dimensional network structure section, and is formed by foaming and solidifying a liquid foam material; and
an impregnation prevention membrane disposed in the three-dimensional network structure section,
wherein the impregnation prevention membrane makes the liquid foam material impermeable, and a site of the three-dimensional network structure section that is not made impermeable by the impregnation prevention membrane is impregnated with the foam material, and subsequently the foam material is solidified to form an impregnated section in the three-dimensional network structure section and connect the three-dimensional network structure section and the foam section to each other.

11. The cushion structure according to claim 10, wherein an upper surface of the three-dimensional network structure section is covered with a membraneless foam from which membranes of bubbles of foam are removed.

12. The cushion structure according to claim 10, wherein an upper surface of the three-dimensional network structure section is covered with foam where ventilation pores allowing air to flow therethrough are formed.

13. The cushion structure according to claim 10, further comprising a blowing section that can blow air in any of directions from a lower part to an upper part and from the upper part to the lower part of the three-dimensional network structure section, below the three-dimensional network structure section.

* * * * *